United States Patent [19]
Tatami et al.

[11] 4,287,529
[45] Sep. 1, 1981

[54] TIME BASE ERROR CORRECTING APPARATUS

[75] Inventors: Mitsushige Tatami, Ebina; Kazunobu Tsujikawa, Yokohama, both of Japan

[73] Assignee: Sony Corporation, Tokyo, Japan

[21] Appl. No.: 32,508

[22] Filed: Apr. 23, 1979

[30] Foreign Application Priority Data

Apr. 28, 1978 [JP] Japan ................................. 53-51821

[51] Int. Cl.³ ...................... H04N 5/76; H04N 5/78; H04N 5/34
[52] U.S. Cl. ........................................ 358/8; 360/36; 360/38; 358/163
[58] Field of Search .................. 358/8, 127, 128, 163; 360/36, 38

[56] References Cited

U.S. PATENT DOCUMENTS

| | | | |
|---|---|---|---|
| 3,949,416 | 4/1976 | Stalley et al. ............................ | 358/8 |
| 3,994,013 | 11/1976 | Lemoine et al. ........................ | 358/8 |
| 4,041,453 | 8/1977 | Umeda et al. ....................... | 360/38 X |
| 4,053,926 | 10/1977 | Lemoine et al. ........................ | 358/8 |
| 4,054,903 | 10/1977 | Ninomiya ................................ | 358/8 |
| 4,054,921 | 9/1977 | Tatami ............................... | 360/36 X |
| 4,069,499 | 1/1978 | Ninomiya ................................ | 358/8 |
| 4,081,826 | 3/1978 | Ninomiya ................................ | 358/8 |
| 4,165,524 | 8/1979 | Ninomiya ................................ | 360/36 |

*Primary Examiner*—Bernard Konick
*Assistant Examiner*—Aristotelis M. Psitos
*Attorney, Agent, or Firm*—Lewis H. Eslinger; Alvin Sinderbrand

[57] ABSTRACT

Improved time base error correcting apparatus of the type wherein time base errors in a video signal, such as a video signal reproduced by a video signal playback device, are corrected. The apparatus includes a main memory into which picture elements contained in each line interval of the video signal are written at a write-in rate that is synchronized with the time base information contained in that video signal, and from which the picture elements are read out at a reference rate. A drop-out detector detects drop-out conditions which may occur in the video information and synchronizing information portions of the video signal. Drop-out indications are stored in a drop-out condition memory so as to represent the positions within a line interval that drop-out has occurred. These drop-out indications are written into and read out of the drop-out condition memory in synchronism with the writing in and reading out of picture elements from the main memory. Each picture element read out from the main memory is supplied to a drop-out compensator which is responsive to a read out drop-out indication to replace a dropped out picture element that is read out from the main memory with the picture element which had been in the same relative position in the immediately preceding line interval. A velocity error correcting device also is provided in order to correct velocity errors which may be present in each line interval. In the event that a velocity error cannot be detected, for example, because drop-out has occurred in the synchronizing portion of a line interval, the velocity error which had been detected for the previous line interval is used again in this and then the next-following interval, i.e., for a total of three consecutive line intervals. An offset voltage is added to the velocity error correcting operation for this third line interval, except that this offset voltage is subtracted during a drop-out compensating operation in that third line interval.

25 Claims, 70 Drawing Figures

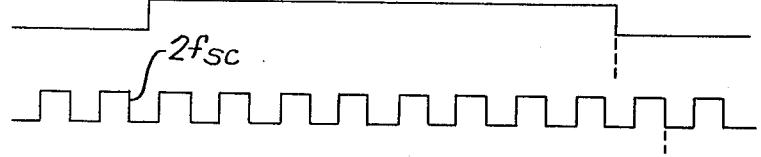
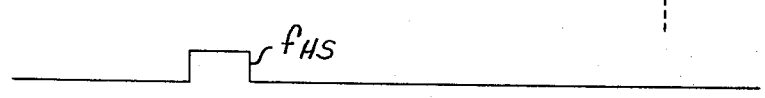
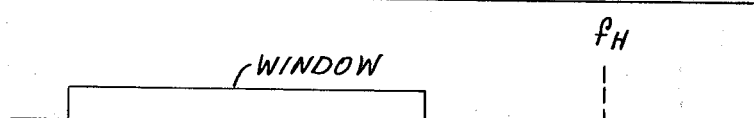
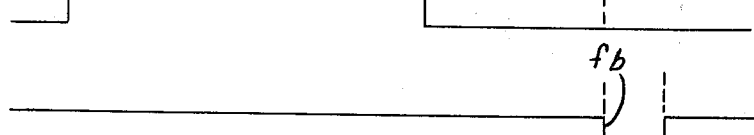
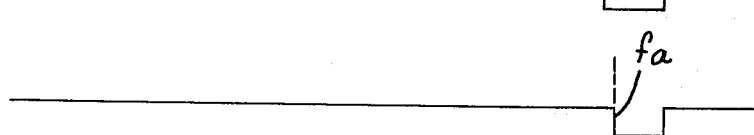
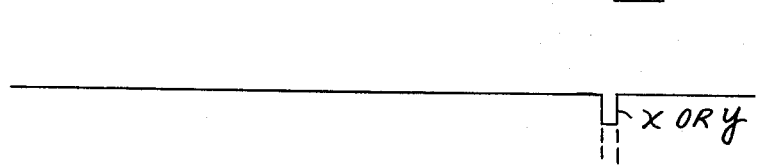

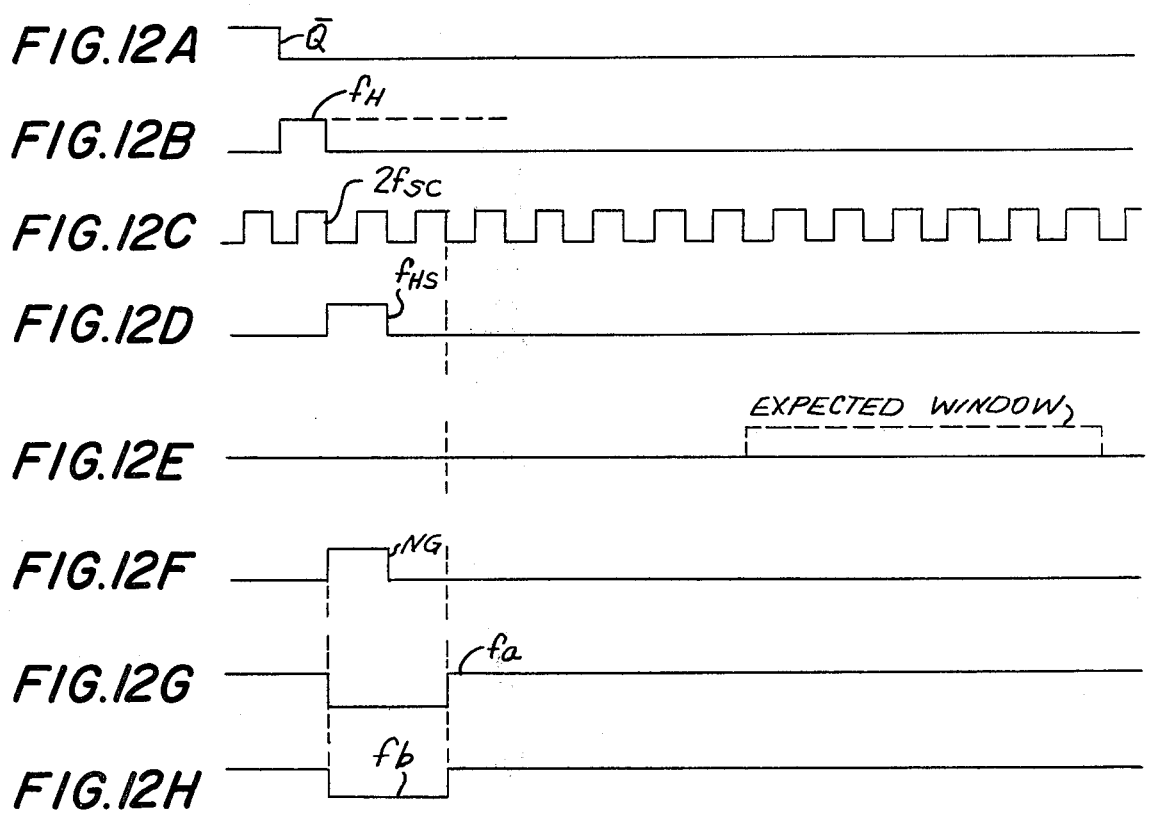

FIG.13B

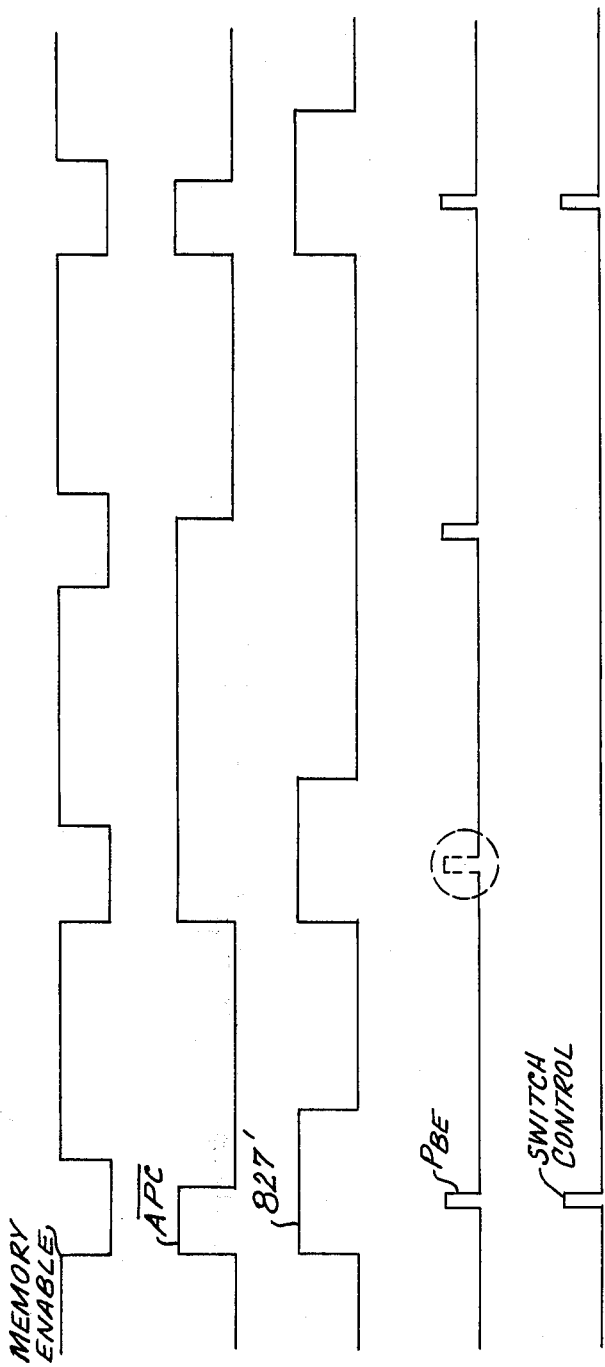

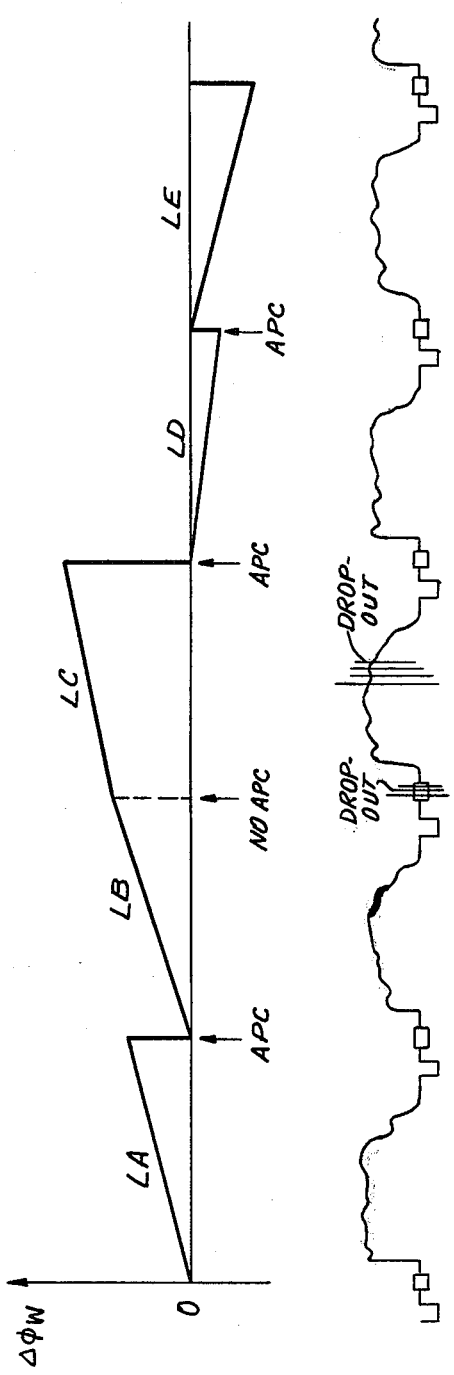
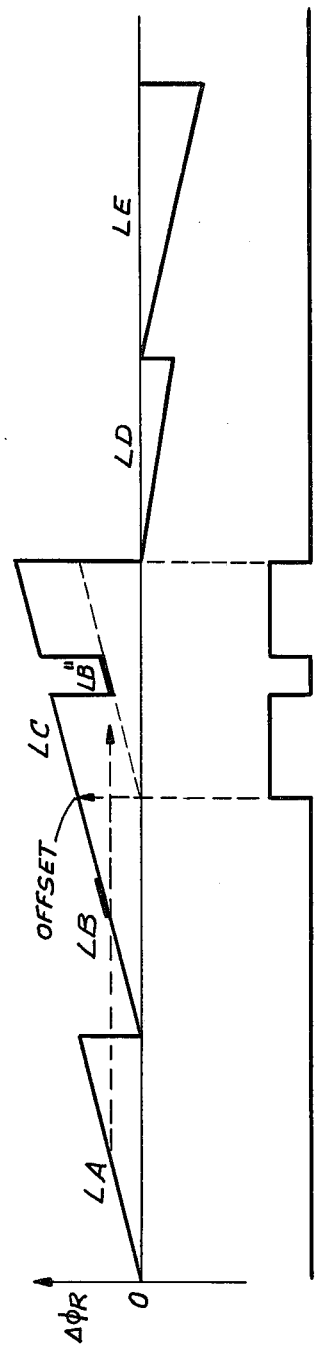
FIG.18A  FIG.18B  FIG.18C  FIG.18D

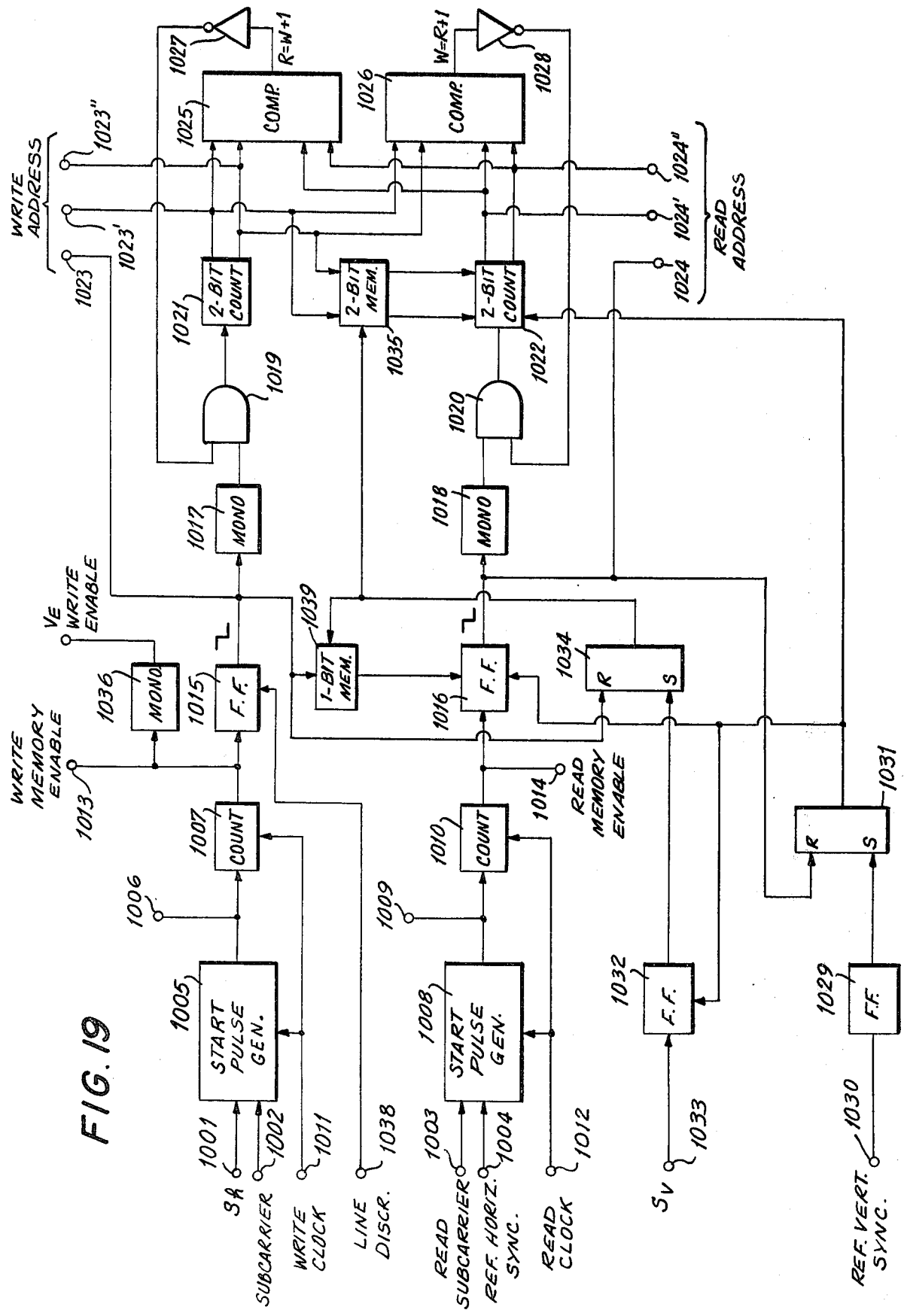

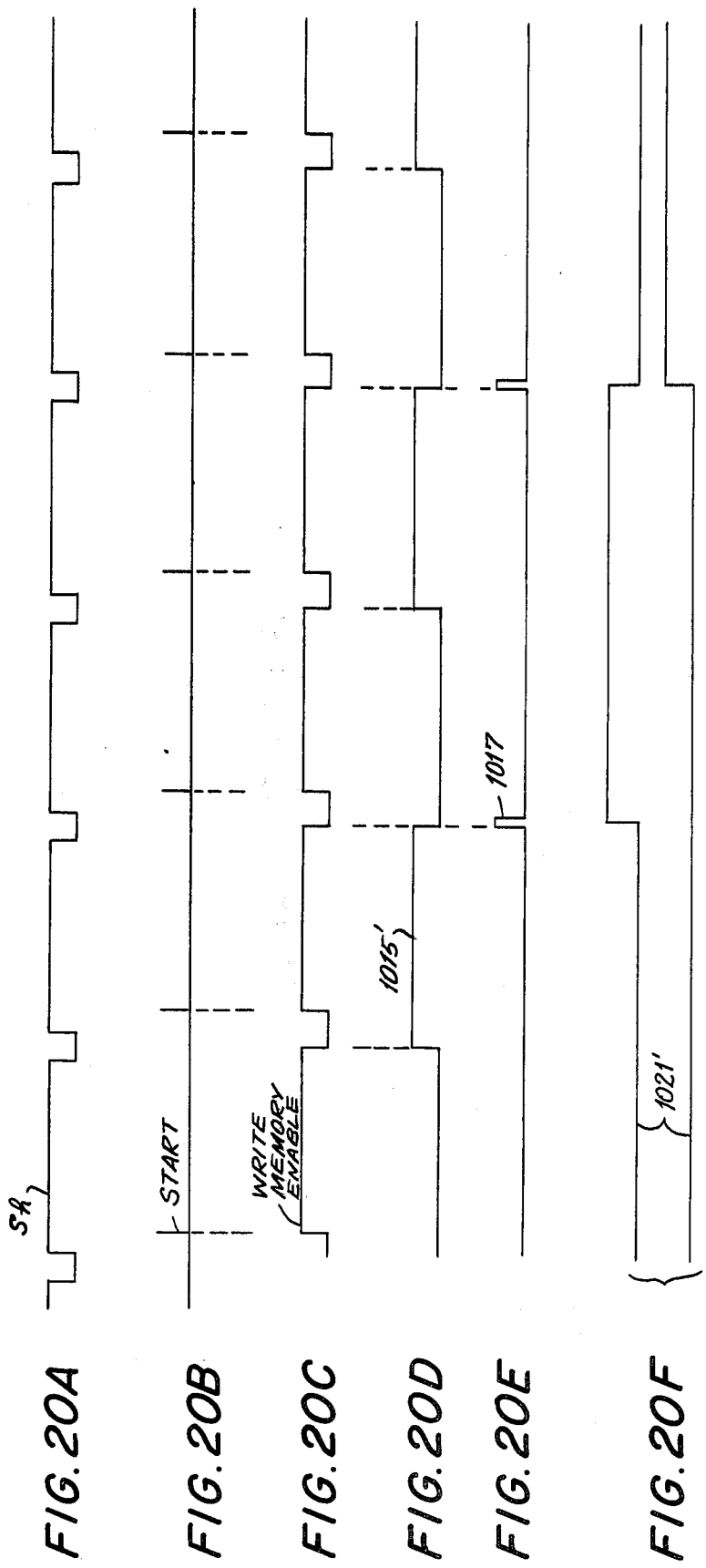

TIME BASE ERROR CORRECTING APPARATUS

BACKGROUND OF THE INVENTION

This invention relates to time base error correcting apparatus and, more particularly, to such apparatus wherein, in the event of a dropped out picture element, a substitution therefor is made by replacing the dropped out element with a picture element disposed in the same relative location in the immediately preceding line interval.

When video signals are recorded on a magnetic medium, such as magnetic tape by a VTR, time base, or frequency and/or phase errors may be introduced into the video signals during playback because of various factors. For example, the record medium may expand or contract after the video signals have been recorded thereon. Also, the speed with which the record medium is transported in the playback device may differ slightly from its speed during recording. Similarly, there may be a slight variation between the rotary speed at which the heads scan the record medium during a signal recording operation and during a signal playback operation. All of these possible variations result in time base errors which appear as undesired effects in the ultimately reproduced video picture. These observable effects are perceived as jitter, brightness distortion, improper color display and the like. If the video signal which is played back from, for example, a VTR, is to be used in connection with the transmission of a television broadcast, or is to be merged with "live" broadcast information, it is important that these time base errors be corrected.

One example of a time base corrector for use with video signals is described in U.S. Pat. No. b 3,860,952. In this time base corrector, incoming video signals are converted from analog form into digital form and are temporarily stored in a digital memory. The digitized video signals are written into the memory at a write-in clock rate which varies in accordance with detected time base errors. The stored, digitized video signals are read out at a standard, fixed read-out clock rate, whereby the read out video signals are generally free of significant time base errors. Then, the read out digitized video signals are reconverted back into analog form.

In the time base correctors of the aforementioned type, if a drop-out condition is detected in the video signal that is written into the memory, the dropped out portion is replaced by a similar portion that had been present in the video signal two line intervals prior to the line interval containing the drop-out condition. This two-line interval delay (referred to herein as a 2H delay, where H is equal to one horizontal line interval) had been thought necessary because of the inherent characteristics of the NTSC color video signal. That is, the phase of the chrominance subcarrier during each odd line interval is opposite to the phase of the chrominance subcarrier during each even line interval. In order to maintain a proper phase relation in the event that a dropped out portion of a line interval is replaced by a previous, non-dropped out portion, the replacing portion should have the same subcarrier phase as the replaced portion. Hence, the replacing portion had been obtained from the line interval that occurred at the 2H delayed time. Unfortunately, the information contained in the replacing portion at the earlier 2H time may represent a completely different picture content than represented by the portion which it is replacing. This can result in a degradation of the video picture ultimately reproduced from this drop-out compensated video signal.

Another disadvantage of time base correctors of the aforementioned type is that they do not necessarily take velocity errors into account. The velocity error of a video signal is the time base error which may exist over a substantial portion of a horizontal line interval, which error is not detected until the completion of that line interval and, thus, may not be taken into account, or corrected, during that line interval. That is, in typical time base error correcting systems, the write-in clock signal has its frequency synchronized with the actual horizontal synchronizing pulse that is included in the played back video signal, and its phase is synchronized with the phase of the burst signal which also is included in the played back video signal. In accordance with the NTSC standard for television signals, both the horizontal synchronizing pulse and the burst signal are provided at the beginning of a horizontal line interval. Consequently, the synchronizing of the write-in clock signals to the incoming horizontal synchronizing and burst signals necessarily is achieved at the beginning of the horizontal line interval. Of course, if there is a time base error, or velocity error, in the video information portion of the horizontal line interval, there will be a phase shift between the write-in clock signals and the video signals. Since the digitized video signals are read out from the memory in the time base corrector at a standard, fixed read-out clock rate, the aforementioned phase shift during the write-in operation is not compensated during the read-out operation because of the use of such a fixed read-out clock rate. Consequently, the resultant video signal which is read out from the memory in the time base corrector may include velocity errors which are not compensated.

Although there have been proposals to detect and correct for velocity errors in time base correctors, such proposals still carry out drop-out compensation on the basis of substituting a portion of the video signal, delayed by 2H from the line interval containing the drop-out. For example, in copending Application Ser. No. 817,662, assigned to the assignee of the present invention, a time base corrector is disclosed which includes a velocity error detector and a velocity error correcting circuit. The velocity error is detected by comparing the phase of the write clock pulses, that is, the clock pulses which are used to write the digitized video signal into the memory of the time base corrector, to the phase of the burst signals which are played back from the VTR. Any phase differential therebetween represents the shift in phase during a horizontal line itnerval of the played back video signal. This phase shift representation is the velocity error and is stored in a velocity error memory device at a storage location corresponding to the storage location in the memory at which the line of video signals which includes such velocity error is stored. When the stored line of video signals is read out from the memory at the constant read-out rate, the velocity error which is associated with that line of video signals also is read out of the velocity error memory. This read out velocity error signal is integrated over a line interval so as to represent a linearly changing velocity error over that line interval. The integrated velocity error signal then is used to phase modulate the read-out clock pulses, whereby the line of video signals is read out of the memory at a phase-modulated rate. It is thought that this phase modulation of the read-out clock pulses is a close approximation of the velocity error which had been included in that line of video signals originally; and, therefore, compensates for this velocity error.

Another example of a time base corrector including velocity error compensating circuitry is described in U.S. Pat. No. 4,065,787. In this patent, the velocity error signal is determined by subtracting the difference between the control voltage which is applied to a voltage-controlled oscillator in the write-in clock generator phase-lock loop when one line of video signals is received from the control voltage which had been applied to the voltage-controlled oscillator when the preceding line was received. This difference is stored in a velocity error memory location corresponding to the location in the memory at which the presently received line of video signals is stored, and is read out when that line of video signals also is read out. Here too, the read out velocity error signal is integrated so as to approximate the actual velocity error as a linear function. A similar velocity error compensating arrangement is described in the paper "Digital Time Base Correction" by Kitson, Fletcher and Spencer, International Broadcasting Convention Technical Paper, September 1974.

An improved technique for compensating velocity errors is described in copending U.S. application Ser. No. 911,286, filed May 31, 1978 now U.S. Pat. No. 4,165,524. In this improvement, the velocity error is assumed to vary in a non-linear manner throughout a line interval. This non-linear variation is approximated by interpolating the velocity errors which have been detected for the present, immediately preceding and immediately succeeding line intervals.

In the aforementioned velocity error compensators, since velocity error detection is based upon sensing the burst signals that are included in each line interval, this detection cannot be attained if drop-out occurs during the horizontal blanking interval, i.e., during the synchronizing information portion of a line interval. Consequently, the velocity error of two successive line intervals may not be corrected because the velocity error of the line interval that preceded the drop-out occurrence as well as the velocity error of the line interval that followed the drop-out occurrence cannot be detected. Furthermore, if a line interval whose velocity error cannot be corrected also contains drop-out in the video information portion thereof, drop-out compensation therefor may be less than satisfactory because the velocity error compensation that is attempted for the replacing portion will be based upon the velocity error of the replaced portion which generally differs from the velocity error of the replacing portion (i.e., the portion that was present 2H delayed time ago).

OBJECTS OF THE INVENTION

Therefore, it is an object of the present invention to provide an improved time base error correcting apparatus that avoids the problems attending the prior art apparatus.

Another object of this invention is to provide time base error correcting apparatus wherein, in the event of a drop-out occurring during the video information portion of a line interval, the dropped out portion is replaced by a similarly located portion that was present in the immediately preceding line interval.

A further object of this invention is to provide improved time base error correcting apparatus of the aforementioned type which is particularly adapted for use with an NTSC color video signal and wherein phase matching is maintained during a drop-out compensating operation even though the phase of the chrominance subcarrier of an immediately preceding line interval is opposite to the phase of the chrominance subcarrier in the line interval containing the drop-out.

An additional object of this invention is to provide improved time-base correcting apparatus of the aforementioned type wherein velocity error correction is achieved even if drop-out occurs during the synchronizing information portion of a line interval.

Still another object of this invention is to provide improved time base error correcting apparatus wherein velocity error compensation is carried out, and wherein the velocity error signal which is produced for one line interval is used during the second and third following line intervals in the event that the velocity error for the second, and thus the third, line interval cannot be detected, such as because of drop-out.

A still further object of this invention is to provide time base error correcting apparatus wherein the velocity error signal detected during a first line interval is used to correct for velocity errors during the next following second and third line intervals in the event that the actual velocity errors of these following line intervals cannot be detected, whereby an offset voltage is added to the velocity error signal for velocity error correction during the third line interval, except that this offset voltage is removed in the event that a drop-out compensation operation is carried out during this third line interval.

Various other objects, advantages and features of the present invention will become readily apparent from the ensuing detailed description, and the novel features will be particularly pointed out in the appended claims.

SUMMARY OF THE INVENTION

In accordance with this invention, time base error correcting apparatus is provided wherein successive picture elements contained in a line interval of a video signal, such as a video signal reproduced by a video signal playback device, is written into a main memory at a write-in rate that is synchronized with the time base information included in the video signal, these picture elements subsequently being read out of the main memory at a substantially fixed read-out rate. A drop-out detector detects drop-out conditions which may occur during the video information portion of each line interval and which occur during the synchronizing information portion of each line interval. In the event that drop-out is detected in the video information portion of a line interval currently read out of the main memory, the dropped-out element is replaced by a picture element in the same relative location in the immediately preceding line interval. A velocity error detector also is provided for detecting a velocity error in each line interval so as to produce a velocity error signal unless a drop-out has occurred in the synchronizing information portion of that or the immediately following line interval. In the event that velocity error cannot be detected for a line interval, a velocity error signal which has been used for the preceding line interval is used again. Velocity error compensation is achieved by integrating the velocity error signal to produce an integrated signal that returns to an initial level at the start of each read out line interval, the integrated signal being used to phase-modulate the rate at which the picture elements are read out of the main memory. The integrated signal is prevented from returning to its initial level when drop-out has been detected in the synchronizing information portion of the read out line interval. The latter integrated signal is modified if drop-out compensation is carried out for the picture information portion for the line interval, whereby the velocity error compensation matches that which had been used for the preceding line interval.

BRIEF DESCRIPTION OF THE DRAWINGS

The following detailed description, given by way of example, will best be understood in conjunction with the accompanying drawings in which:

FIGS. 10A–10B are waveform diagrams which are useful in understanding the operation of a portion of the circuit shown in FIG. 9;

FIGS. 11A–11I are timing diagrams which are helpful in understanding the operation of the circuit shown in FIG. 9;

FIGS. 12A–12H are timing diagrams which are helpful in understanding one type of operation of the circuit shown in FIG. 9;

FIGS. 13A–13I are timing diagrams which are helpful in understanding another operation of the circuit shown in FIG. 9;

FIGS. 16A–16E are waveform diagrams which are helpful in understanding the velocity error detection operation of the circuit shown in FIG. 14 in the presence of drop-out during the synchronizing information portion of a video signal;

FIGS. 18A–18D are waveform diagrams which are helpful in understanding the velocity error compensating operation in the event of drop-out in the synchronizing information portion of the video signal, in accordance with the present invention;

FIG. 19 is a block diagram of the control circuit used in the illustrated time base error corrector; and FIGS. 20A–20F are timing waveforms which are useful in understanding the operation of a portion of the illustrated control circuit.

DETAILED DESCRIPTION OF A PREFERRED EMBODIMENT

Figure 1:
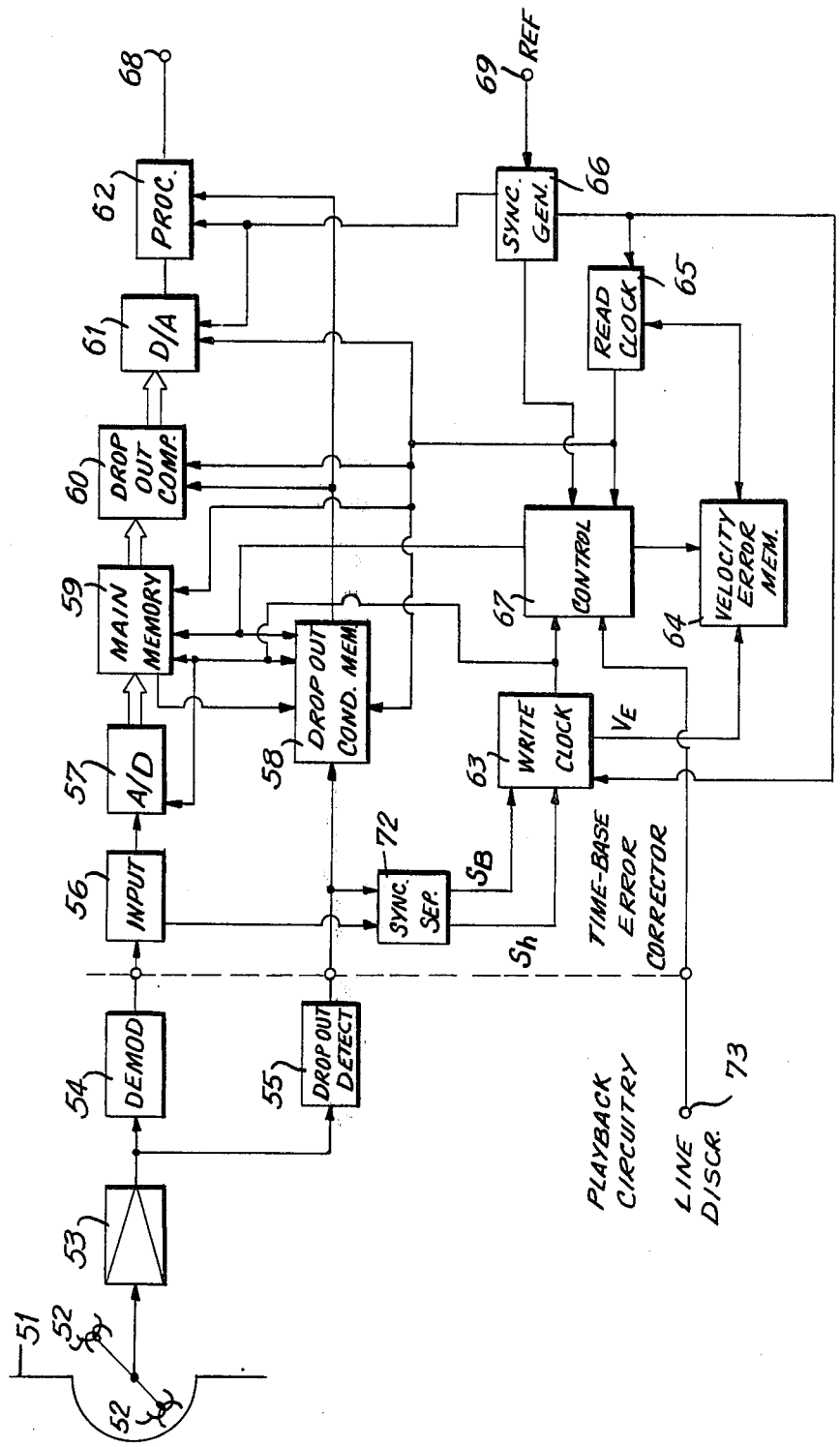
FIG. 1 is a block diagram of a time base error corrector in accordance with the present invention.

Referring now to the drawings, and in particular to FIG. 1, there is illustrated a block diagram of one embodiment of time base error correcting apparatus in accordance with the present invention. This time base error correcting apparatus will be described for use with a video recorder/playback device, such as a VTR; however, it should be appreciated that other periodic signals having signal repetition intervals analogous to line and field intervals can be time-base corrected with this invention and, furthermore, that this invention need not be limited for use solely with video signal playback devices. In FIG. 1, only portions of the playback circuitry of a VTR are illustrated; and a magnetic tape 51 is shown as being scanned by one of two rotary heads 52 which scan alternate skewed tracks across tape 51. Heads 52, which reproduce the video signals which had been recorded on tape 51, are connected via an amplifier 53 to a demodulator 54. The VTR with which the time base error correcting apparatus is used preferably is of the broadcast-quality tape and, therefore, may be the so-called FM direct recorder or the so-called heterodyne recorder. In the FM direct recorder, a composite color video signal, for example, of the NTSC type, is recorded in frequency modulation format. In order to recover this frequency modulated color video signal, demodulator 54 is a compatible FM demodulator. The output of this demodulator thus would be a conventional NTSC color video signal $S_V$. In the heterodyne recorder, an original composite color video signal is separated into its luminance and chrominance components and, during recording, the luminance component is used to frequency modulate a carrier while the chrominance component is frequency converted down to a much lower frequency range. The FM luminance signal and frequency-converted chrominance signal then are combined and recorded. Hence, in the heterodyne type of VTR, demodulator 54 includes compatible luminance and chrominance channels whereby the FM luminance signal is demodulated and the chrominance component is frequency reconverted back to its original frequency band. Then, the demodulated luminance and recovered chrominance components are combined so as to re-form the NTSC color video signal $S_V$.

Amplifier 53 of the VTR, in addition to being coupled to demodulator 54, is coupled to a drop-out detector 55. The drop-out detector is a conventional circuit which is adapted to detect drop-outs in the signal which is reproduced from tape 51. As is shown, a drop-out is the absence of a signal which may be due to an imperfection in the tape or some interference which is present during signal reproduction, such as dust, a scratch, or the like. In any event, drop-out detector 55 is adapted to produce a suitable signal which represents the presence of drop-out in the reproduced video signal.

Although the playback circuitry off the VTR has been described as being capable of reproducing a composite color video signal which had been recorded on tape 51, it should be appreciated that this circuitry also is well-adapted to reproduce a monochrome, or black-and-white, video signal from the tape.

Demodulator 54 and drop-out detector 55 in the VTR are connected to the time base error correcting apparatus. In the illustrated embodiment, the time base error correcting apparatus includes an input stage 56, an analog-to-digital (A/D) converter 57, a main memory 59, a drop-out condition memory 58, a digital-to-analog (D/A) converter 61 and an output processing stage 62. In addition, the illustrated apparatus includes a synchronizing separator 72, a write clock generator 63, a read clock generator 65 and a synchronizing signal generator 66. Furthermore, the time base error correcting apparatus is provided with a control unit 67 and a velocity error memory 64. Input stage 56 is coupled to demodulator 54 and is adapted to establish a proper amplitude level for the video signal $S_v$ applied thereto and, in addition, to provide a time or phase adjustment in the video signal to account for certain inherent phase delays in the control signal circuitry, to be described. Furthermore, input stage 56 serves to limit the frequency band of the video signals passed therethrough so as to eliminate unwwanted higher frequencies and thereby remove noise. One output of the input stage is coupled to synchronizing separator 72, and another output of the input stage is coupled to A/D converter 57.

The A/D converter is adapted to digitize the analog video signal which passes through input stage 56. To this effect, A/D converter 57 includes a sample-and-hold circuit for sampling the analog video signal to produce a series of successive samples, or picture elements, and a digitizing circuit for converting each sample to a multi-bit digital word. As an example, each line interval, or horizontal line, hereafter referred to merely as a line of video signals, is sampled 640 times, and each sample, or picture element, is converted into a digitized picture element formed as an 8-bit word. Thus, $640 \times 8$ bits are produced during each line. As shown, write clock generator 63 is coupled to A/D converter 57 for supplying sampling and digitizing clock signals thereto. The main memory is comprised of a plurality of memory units, each being adapted to store at least one line of digitized video signals therein. The memory units are addressed successively so that successive lines of video signals can be written therein and, concurrently, the memory units also are addressed successively such that the stored lines of video signals are read out. Main memory 59 is coupled to write clock generator 63 and to read clock generator 65 to receive the write clock and read clock signals therefrom, respectively, and the output of the main memory is coupled to drop-out compensator 69. While a line of video signals is written into one memory unit from A/D counter 57, the line of video signals which are stored in another memory unit are read out therefrom to drop-out compensator 60. Thus, although video signals are concurrently written into and read out of the main memory, the very same memory unit is not addressed concurrently for the simultaneous writing and reading of video signals. To this effect, control unit 67 monitors the write-in and read-out operations to insure that a common memory unit is not addressed to have video signals written in and read out therefrom at the same time, and thus to avoid obliterating a line of video signals.

It may be appreciated that if the video signals are written into main memory 59 at a write clock rate which is synchronized with the time base errors which may be present in the video signals played back ffrom the VTR, then such time base errors are substantially removed from the video signals. That is, frequency and/or phase shifts which may be present in the incoming video signal are taken into account when such video signals are written into the main memory. Then, if the stored, digitized video signals are read out of the main memory at a substantially constant, fixed read clock rate, these read out video signals will be substantially free of time base errors. Thus, main memory 59 serves as a buffer memory of retiming the played back video signals. This re-timing serves to eliminate the time base errors therefrom.

Drop-out compensator 60, which receives the digitized picture elements in each line read out thereto from main memory 59, is adapted to replace those picture elements which have dropped out with corresponding picture elements disposed in the same relative location of the immediately preceding line interval. Consequently, the video signal transmitted by the drop-out compensator will be free of drop-out. Drop-out compensator 60 operates in synchronism with the read-out rate of the main memory, and is coupled to read clock generator 65 to receive the read clock signals therefrom. The drop-out compensator also is coupled to drop-out condition memory 58 to receive indications that a particular word supplied thereto by main memory 59 actually is a dropped-out representation and, therefore, should be replaced, or compensated.

Drop-out condition memory 58 includes a plurality of memory units equal in number to the memory units of main memory 59. The memory units of the drop-out condition memory are addressed concurrently with the addressing of the main memory so that write-in and read-out operations are performed on corresponding memory units in both memory devices. For this reason, the same control, write clock and read clock signals that are supplied to the main memory are supplied to drop-out condition memory 58. Also, the output of drop-out detector 55 is coupled to the drop-out condition memory to supply drop-out indications thereto for storage in the memory unit addressed for a write-in operation. Hence, the drop-out condition memory stores, in each memory unit therein, drop-out indications, which may for example be represented by a binary "1", at locations corresponding to the locations in the line whereat drop-out occurred. As the contents of a memory unit are read out therefrom in synchronism with the reading out of the contents of a corresponding memory unit in main memory 59, the presence of a drop-out indication operates drop-out compensator 60 to substitute a digitized picture element in the immediately preceding line read out from the main memory for the digitized (dropped out) picture element then being read out.

The drop-out condition memory also stores indications of drop-out conditions that are present during the synchronizing information portion of each line. To this effect, each memory unit included in the drop-out condition memory may be provided with a separate section to store such drop-out indications. As will be described, a velocity error for a line cannot be detected if drop-out occurs during the synchronizing information portion, and particularly the burst signal interval, of that line or the next following line. In accordance with the present invention, an approximate velocity error compensation is carried out in the event of this type of drop-out. The drop-out indications stored in the separate sections of the memory units in drop-out condition memory are used for this approximate velocity error compensation. The output of drop-out compensator 60 is coupled to D/A converter 61, the latter circuit functioning to reconvert the digitized video signals back into an analog signal. The D/A converter also is adapted to establish a proper pedestal and synchronizing signal level to the reconverted analog video signal. Hence, D/A converter 61 is coupled to read clock 65 and, in addition, to synchronizing signal generator 66 so as to be synchronized with the read clock signals which are used to read out the digitized video signals from main memory 59 and from the drop-out compensator; and with the blanking signals which are inserted into the reconverted analog video signal. The output of D/A converter 60 is coupled to output processing stage 62, this stage also being coupled to synchronizing signal generator 66 and to drop-out condition memory 58. The purpose of the output processing stage is to reinsert a proper burst signal into the reconverted video signal, and also to insert the usual horizontal and vertical synchronizing signals, as well as the equalizing signals into this video signal. Furthermore, in the event that the VTR with which the time base error correcting apparatus is used is operated in a special mode, for example, in a slow motion mode, a still mode or a fast mode, output processing stage 62 is adapted to insure that the reproduced video signal, and particularly the chrominance component thereof, and the inserted burst signal are in the proper phase relation, even in the event of detected drop-out during this special mode. An embodiment of output processing stage 11 is described in greater detail below.

Synchronizing separator 72, which is coupled to input stage 56 and to drop-out detector 55, is adapted to separate the horizontal synchronizing signal, the burst signal and the vertical synchronizing signal from the incoming video signal which is supplied thereto by the VTR. To this effect, the synchronizing separator is adapted to clamp the incoming video signal to a predetermined clamping level and then, once the video signal is so clamped, to detect the horizontal synchronizing signal. This detected horizontal synchronizing signal then is supplied to write clock generator 63 and, in addition, to a burst signal detector which is included within synchronizing separator 72. The burst signal detector is adapted to detect the burst signal included in the incoming video signal, and to supply this burst signal also to the write clock generator.

Write clcok generator 63, described in greater detail below, is adapted to generate a write clock signal which is synchronized with the horizontal synchronizing signal and with the burst signal which are separated from the incoming video signal by synchronizing separator 72. To this effect, the write clock generator includes an automatic frequency control (AFC) circuit and an automatic phase control (APC) circuit. The AFC circuit functions to generate a write clock signal of a relatively high repetition rate, synchronized to the incoming horizontal synchronizing signal. The APC circuit functions to synchronize the phase of the write clock signal with the incoming burst signal. With this frequency and phase control over the write clock signal, the digitized incoming video signal is written into main memory 59 at a proper rate whereby time base errors in the incoming video signal are removed.

Write clock generator 63 also is adapted to detect the velocity error $V_E$ included in the incoming video signal. The velocity error represents the amount of phase error that is present between the write clock signal and the video signal at the end of a line interval. That is, and as will be described in greater detail below, since the write clock signal is synchronized in frequency and phase with the horizontal and burst signals, and since the horizontal and burst signals occur only at the beginning of a line interval, then it is possible that if a time base error exists throughout an entire line interval, the phase of the video signal at the end of that line interval may not be identical to the phase thereof at the beginning of that line interval. Hence, since the phase of the video signal may drift, or differ, from the burst signal which is furnished at the beginning of that line interval, it follows that the phase of the video signal at the end of the line interval may differ from the write clock signal which had been synchronized with the burst signal. The velocity error $V_E$ is an indication of this phase differential. This velocity error $V_E$ is supplied to and stored in velocity error memory 64.

Read clcok generator 65 is coupled to synchronizing signal generator 66 and is adapted to generate read clock signals at a substantially constant rate. These read clock signals are, of course, used to read out the digitized video signals from main memory 59 and from drop-out compensator 60, and to control D/A converter 61 for reconverting the read out digitized video signals into analog form. In addition, the velocity error $V_E$ which is stored in velocity error memory 64 is supplied to read clock generator 65 for modulating the phase of the read clock signals as a function of the velocity error. In this manner, velocity errors which may be present in the read out digitized video signals are compensated by the phase modulated read clock signals which are used to read out the stored, digitized video signals. That is, velocity errors which may be present in the video signals that are written into the main memory are compensated by reading such video signals out of the main memory in accordance with such velocity errors. As will be described in greater detail below, in the event of drop-out in the synchronizing information portion of a line of video signals which would impede velocity error detection, a velocity error signal nevertheless is produced that is a close approximation of an actual velocity error. The velocity error signal also is used to control the subcarrier signal of the read out and reconverted video signals.

Synchronizing signal generator 66 is adapted to be supplied with a reference clock signal which, for example, may be generated by a system clock (not shown). Typical horizontal, vertical, equalizing and burst signals are derived from this reference signal for insertion into the reconverted analog video signal so as to re-form a proper composite color video signal, such as an NTSC video signal.

Control unit 67 is coupled to write clock generator 63, read clock generator 65, synchronizing signal generator 66 and to an input terminal 73 to receive a line discriminating signal from, for example, the VTR. As will be described in greater detail below, control unit 67 is adapted to establish a write memory enable signal and a read memory enable signal so as to selectively control main memory 59 and drop-out condition memory 58 for write-in operations and read-out operations, respectively. Furthermore, control unit 67 generates write and read addresses which are used to select the respective memory units within the main memory and the drop-out condition memory into which digitized video signals and drop-out indications are written and out of which digitized video signals and drop-out indications are read. The control unit also detects when a write-in and a read-out operation may overlap, that is, when the very same memory unit may be selected to have a video signal written therein and read out therefrom. Control unit 67 additionally is coupled to velocity error memory 64 for controlling the writing in and reading out of velocity error signals. As will be shown below, the velocity error signal which is associated with a particular line of video signals is stored in a storage compartment which corresponds with the memory unit in which that associated line of video signals is stored in main memory 59. Hence, and under the control of control unit 67, when that line of video signals is read out from the memory unit, the associated velocity error signal, which is stored in a corresponding storage compartment, also is read out. In this way, the velocity error of a particular line of video signals is corrected appropriately.

The operation of the apparatus illustrated in FIG. 1 now will be summarized. Video signals which had been recorded on tape 51 are reproduced therefrom by playback heads 52, amplified by amplifier 53 and demodulated by demodulator 54. If the reproduced video signals are accompanied by drop-out, such drop-out is detected by drop-out detector 55. The resultant, reproduced video signals, which are accompanied by time base errors, are supplied to input stage 56 wherein the timing, or interleaving, of the chrominance and luminance components is adjusted in the event that the video signals are reproduced from a heterodynetype VTR. The adjusted video signal is supplied to A/D converter 57 and also to synchronizing separator 72.

The synchronizing separator separates the horizontal synchronizing pulse $S_h$ and the burst signal $S_b$ from the incoming video signal. Synchronizing separator 72 additionally is supplied with a drop-out indication from drop-out detector 55. In the event of drop-out, synchronizing separator 72 is prevented from erroneously interpreting noise as a horizontal synchronizing pulse. The horizontal synchronizing pulse $S_h$ and the burst signal $S_B$ are supplied to write clock generator 63 wherein a write clock signal WCK is frequency and phase synchronized with the horizontal synchronizing pulse and the burst signal which are separated from the incoming video signal. Thus, write clock pulses WCK exhibit the same time base errors as are included in the separated horizontal synchronizing pulse and the separated burst signal.

The write clock pulses WCK are supplied to control unit 67 and, in addition, are supplied as clock pulses to A/D converter 57, drop-out condition memory 58 and main memory 59. A/D converter 57 samples the incoming video signal in response to the write clock pulses WCK and supplies an 8-bit signal to main memory 59 representing each video sample. As each video sample is supplied to the main memory, an indication of whether that sample represents a video picture element or is a dropped-out signal is supplied to drop-out condition memory 58. Hence, the drop-out condition memory stores indications of whether the corresponding picture elements stored in the main memory are drop-out signals. As each digitized sample is read out of the main memory, an associated drop-out indication is read out to drop-out compensator 60 which replaces a dropped out picture element with a stored picture element of similar position in the immediately preceding line in response to a drop-out indication. Thus, an erroneous drop-out sample, although stored in main memory 59, is replaced by a close approximation, i.e., a similar sample from the preceding line, prior to being transmitted to D/A converter 61.

A reference clock signal from a suitable system clock source (not shown) is supplied to reference input 69 and is applied therefrom to synchronizing signal generator 66. The synchronizing signal generator generates the usual horizontal and vertical synchronizing pulses, equalizing pulses and a burst signal, all at substantially constant rates. Synchronizing signal generator 66 also drives read clock generator 65 to generate read clock pulses which are supplied to main memory 59, to drop-out compensator 60 and to D/A converter 61.

Control unit 67 is responsive to various synchronizing signals which are supplied thereto by synchronizing separator 72 and by synchronizing signal generator 66. The control unit additionally is responsive to the write clock pulses and the read clock pulses which are generated by write clock generator 63 and read clock generator 65. In response to these respective signals, control unit 67 produces write and read memory enable signals which are applied to main memory 59 and to drop-out condition memory 58 for selectively enabling the write and read operations whereby digitized video signals are written into the main memory, stored, and then read out therefrom, while drop-out indications concurrently are written into the drop-out condition memory, stored, and then read out therefrom. Control unit 67 also is responsive to the horizontal synchronizing pulses supplied by synchronizing separator 72 to generate write memory addresses for addressing successive memory units in main memory 59 into which respective lines of video signals are written. Similarly, the control unit is responsive to horizontal synchronizing pulses supplied by synchronizing signal generator 66 to generate read memory addresses for addressing other memory units in the main memory from which respective lines of stored video signals are read. Control unit 67 additionally monitors the respective write and read addressing operations so as to make certain that a common memory unit is not simultaneously addressed to have video signals written therein and read thereout.

In one embodiment, main memory 59 includes a plurality of memory units, for example, a minimum of three memory units and, preferably, four such units, each being adapted to store two lines of video signals. While one memory unit is addressed for the writing in of digitized video signals, another unit is addressed for reading out the video signals which had been stored therein. Thus, a write-in operation can be carried out simultaneously with a read-out operation. However, control unit 67 prevents a common memory unit from being simultaneously addressed for both a write-in and a read-out operation. Each digitized sample is written into main memory 59 under the control of a write clock pulse WCK which, it is recognized, is synchronized to the horizontal synchronizing pulse and burst signal included in the incoming video signal. Thus, the digitized video samples are written into the main memory in synchronism with the time base errors which may be present in the video signals which are reproduced from tape 51. Subsequent to the storing of two full lines of video signals in main memory 59, the memory unit in which such lines are stored will be addressed, and the stored, digitized video samples are read out at the read clock rate. Since the video signals are written into the main memory in synchronism with the time base errors, but are read out therefrom at a substantially constant, fixed rate, the read out video signals are free of time base errors.

The read out digitized video signals, after passing through drop-out compensator 60, are reconverted back to analog form by D/A converter 61; and the recovered analog video signals are supplied to output processing stage 62 wherein the usual horizontal and vertical synchronizing pulses, equalizing pulses and burst signals are reinserted. Thus, the reconstituted video signal, which now is free of time base errors, is supplied to output terminal 68.

Although the write clock pulses WCK are synchronized with the separated horizontal synchronizing pulse $S_h$ and the separated burst signal $S_B$, a velocity error still may be present in the digitized video signals which are written into main memory 59. It is recalled that this velocity error is equal to the phase shift of the video signals at the end of a line interval relative to the phase of the video signals at the beginning of that line interval. Since the horizontal synchronizing pulse and the burst signal occur at the beginning of a line interval, write clock pulses WCK are accurately synchronized to the video signals only at the beginning of that line interval. The phase of the video signals may change throughout the remainder of the line interval, but the phase of the write clock pulses WCK will remain fixed. Of course, the amount of phase variation which occurs throughout a complete line interval is ascertained by comparing the phase of the write clock pulses WCK with the phase of the burst signal $S_B$ at the beginning of the next line interval. This phase differential represents the amount by which the phase of the video signals has varied from the beginning of the preceding line interval. It is this phase differential which is used as an indication of velocity error; and write clock generator 63 produces a velocity error signal $V_E$ which is a function of this phase differential. After a line of video signals is stored in main memory 59, the velocity error signal $V_E$ associated with that line is determined and is stored in a storage location in velocity error memory 64 which corresponds to the storage location in the main memory into which the associated line of video signals had been written. Control unit 67 determines the correct storage location in the velocity error memory and determines when the velocity error signal $V_E$ should be written therein.

When a line of video signals is read out from main memory 59, the associated velocity error signal $V_E$ is read out of the corresponding storage location in velocity error memory 64. This velocity error signal is utilized in read clock generator 65 to phase modulated the read clock pulses in a manner which compensates the original velocity errors which accompanied the incoming video signals. Thus, the video signals which are stored in main memory 59 are read out therefrom at a rate which is phase modulated in accordance with a close approximation of the velocity error which was included in the line of video signals which had been written into the main memory. This eliminates the effects of velocity errors in the original, incoming video signals. In the event of drop-out in the synchronizing portion of a line interval, velocity error detection cannot be achieved. Nevertheless, the velocity error signal which had been used for the preceding line interval is used again for the following two consecutive line intervals, i.e., the minimum length of time until velocity error next can be detected. In the second of these following line intervals, if drop-out occurs in the video information portion, it is appreciated that the amount of velocity error compensation for the dropped-out portion differs from the velocity error compensation of the replacing portion, the latter having been obtained from the preceding line interval (i.e., the first of these following line intervals). Accordingly, velocity error memory 64 adjusts the velocity error compensation for the dropout compensation duration to be equal to the velocity error compensation of the preceding (first following) line interval.

Various ones of the elements shown in FIG. 1 by respective blocks now will be described in greater detail.

Input Stage 56

Figure 2:
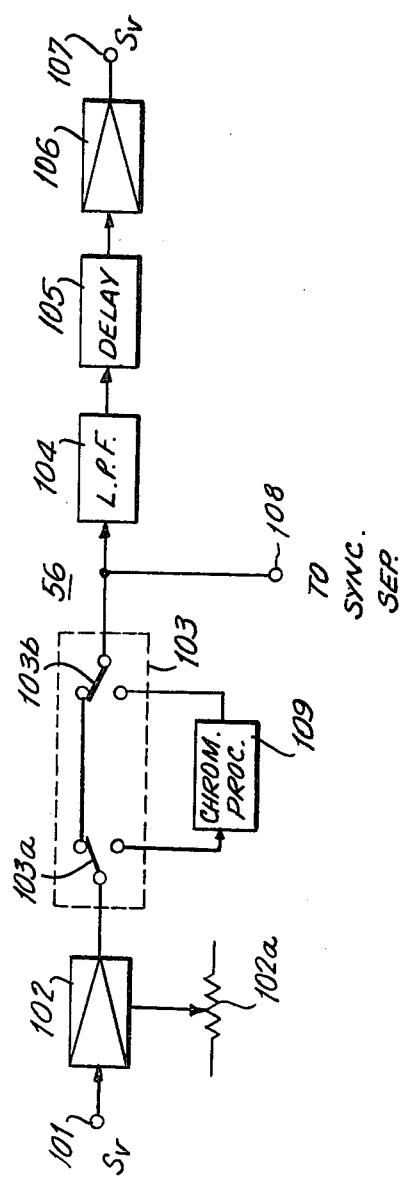
FIG. 2 is a block diagram of the input stage of the illustrated time base error corrector.

A block diagram of input stage 56 is illustrated in FIG. 2 as comprising an input amplifier 102, a switching circuit 103, a low pass filter 104 and a delay circuit 105. In addition, a chrominance processing circuit 109 is coupled to switching circuit 103. Amplifier 102 is coupled to input terminal 101 and is adapted to receive the incoming video signal supplied thereto by the playback circuitry of the VTR. Amplifier 102 preferably is a gain-adjustable amplifier and is illustrated as being coupled to an adjustable resistor 102a for this purpose. The output of amplifier 102 is coupled to switching circuit 103 which includes change-over switches 103a and 103b which are selectively operable in accordance with the type of VTR with which the time base error correcting apparatus is used. That is, if the VTR is of the so-called FM recording type, then switches 103a and 103b exhibit their illustrated positions so as to couple amplifier 102 directly to low pass filter 104. However, if the VTR is of the so-called heterodyne type, then switches 103a and 103b are switched so as to couple amplifier 102 to low pass filter 104 via chrominance processing circuit 109.

Low pass filter 104 is adapted to limit the frequencies of the video signal and, therefore, to remove an unwanted, higher frequency band. The low pass filter thus functions to filter out higher frequency noise components from the video signal. The output of the low pass filter is coupled through delay circuit 105 to output amplifier 106 and thence to output terminal 107. The delay circuit is adapted to equalize the timing of the video signal $S_v$ which is supplied from amplifier 106 to A/D converter 57 with the write clock pulses WCK which are generated by write clock generator 63. That is, synchronizing separatur 72 and write clock generator 63 exhibit an inherent time delay which, if not compensated, would result in a phase lagging relation of the write clock pulses with respect to the video signal. This phase lagging relation is eliminated by delaying the video signal $S_v$ by delay circuit 105 for an amount of time which is equal to, and thus compensates, the inherent time delay of the synchronizing separator and the write clock generator. Thus, video signal $S_v$ at output terminal 107 will be in proper phase relation with respect to the write clock pulses WCK.

The output of switching circuit 103 also is coupled to an output terminal 108 for supplying the video signal to synchronizing separator 72.

When the entire composite color video signal is recorded as a frequency modulated signal, as by an FM recording VTR, the time base errors which are present in the chrominance component generally are equal to the time base errors which are present in the luminance component. However, when the composite color video signal is recorded by a heterodyne-type VTR, then the time base errors in the luminance component may not be equal to the time base errors in the chrominance component. The playback circuitry included in the heterodyne-type VTR generally is provided with an AFC loop and with an APC loop for synchronizing a local subcarrier to the reproduced horizontal synchronizing pulses, that is, to the time base error of the luminance component. This means that, although the time-base error of the luminance component is inserted into the chrominance component, the time base error now inserted into the chrominance component lags the luminance component by one horizontal line interval. This distorts the interleaving relationship between the luminance and chrominance components. The purpose of chrominance processing circuit 109 is to restore the proper interleaving relationship between the luminance and chrominance components in the event that the incoming video signal is reproduced by a heterodyne-type VTR. As an example, the chrominance processing circuit may be of the type described in copending U.S. Application Ser. No. 777,542, assigned to the assignee of the present invention.

Thus, it is seen that the video signal $S_v$ which is provided at output terminal 107 is a time-adjusted video signal which is synchronized with write clock pulses WCK. Furthermore, the video signal provided at output terminal 108 includes horizontal synchronizing pulses $S_h$ and burst signals $S_B$ which exhibit a proper interleaved relation.

Main Memory 59

Figure 3:
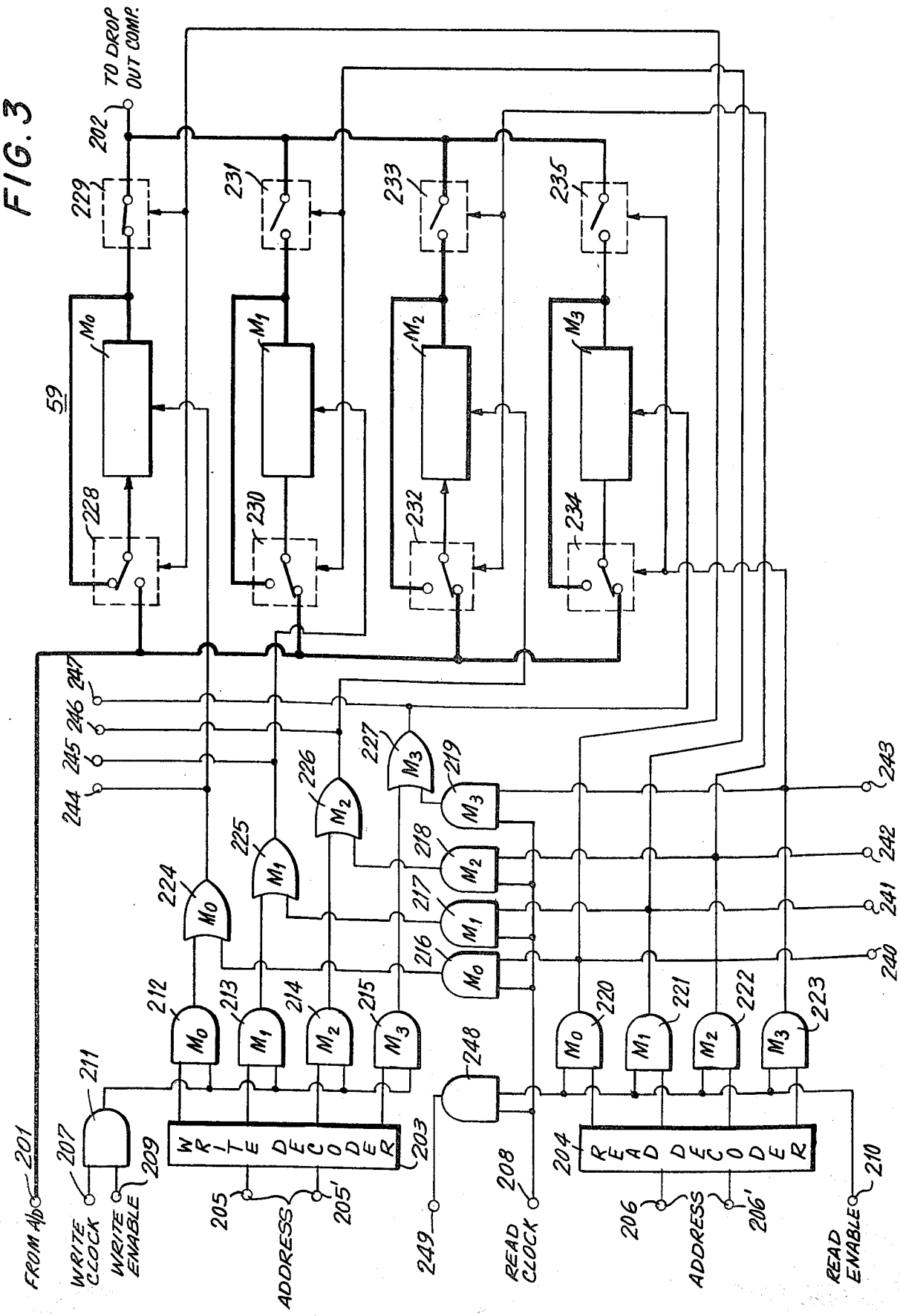
FIG. 3 is a logic diagram of the main memory which is used in the illustrated time base error corrector.

Referring now to FIG. 3, a logic diagram of a preferred embodiment of main memory 59 is illustrated. The main memory is comprised of four memory units $M_0$, $M_1$, $M_2$ and $M_3$, each memory unit having a capacity to store two lines of digitized samples of video signals. Each digitized sample is formed of 8 bits, and 640 samples per line are obtained. A given memory unit is adapted to be addressed either for a write-in or a read-out operation; but both operations cannot be carried on simultaneously with the same memory unit. Of course, different memory units can be addressed for the writing in and reading out of data, respectively. An input terminal 201 is coupled via switches 228, 230, 232 and 234 to memory units $M_0$, $M_1$, $M_2$ and $M_3$, respectively. Input terminal 201 is coupled to the output of A/D converter 57 for receiving the digitized samples therefrom. The outputs of memory units $M_0$, $M_1$, $M_2$ and $M_3$ are coupled via switches 229, 231, 233 and 235, respectively, to output terminal 202.

A write address decoder 203 is coupled to input terminals 205 and 205' for receiving a 2-bit write address which is supplied thereto by control unit 67. It is appreciated that four separate combinations can be formed of two bits. Hence, the two bits supplied to input terminals 205 and 205' represent a one-out-of-four address, this address being decoded by write address decoder 203. The write address decoder includes four separate outputs which are coupled to AND gates 212, 213, 214 and 215, respectively. The remaining input of each of these AND gates is connected in common to the output of an AND gate 211, this latter AND gate having inputs coupled to input terminals 207 and 209 to receive write clock pulses WCK and the WRITE ENABLE signal, respectively. The write clock pulses are supplied to input terminal 207 by write clock generator 63; and the WRITE ENABLE signal is supplied to input terminal 209 by control unit 67. It will be appreciated that, depending upon the address supplied to input terminals 205 and 205' write address decoder 203 conditions only one of AND gates 212–215 to transmit write clock pulses WCK from AND gate 211.

A read address decoder 204, which is similar to write address decoder 203, is coupled to input terminals 206 and 206' for receiving a 2-bit read address which is generated by control unit 67. The read address decoder includes four separate outputs which are coupled to AND gates 220, 221, 222 and 223, respectively. The remaining input of each of these AND gates is connected in common to an input terminal 210 to receive a READ ENABLE signal which is generated by control unit 67. AND gates 220–223 are coupled to a respective input of each of AND gates 216–219, respectively, and also to output terminals 240–243. The remaining input of each of AND gates 216–219 is connected in common to an input terminal 208 to receive read clock pulses which are generated by read clock generator 65.

AND gates 212 and 216 both are associated with memory unit $M_0$ and are coupled via an OR-gate 224 to a clock input of this memory unit. Similarly, AND gates 213 and 217 both are associated with memory unit $M_1$ and are coupled to the clock input thereof via an OR-gate 225. Also, AND gates 214 and 218 both are associated with memory unit $M_2$ and are coupled to the clock input thereof via an OR-gate 226. Finally, AND gates 215 and 219 both are associated with memory unit $M_3$ and are coupled to the clock input thereof via an OR-gate 227. OR-gates 224–227 also are coupled to output terminals 244–247, respectively.

AND gate 220 also is associated with memory unit $M_0$ and the output of this AND gate is coupled to switches 228 and 229 so as to selectively control the conditions of these switches. As an example, if a binary "1" is produced by AND gate 220, then switch 228 interrupts the normal connection of input terminal 201 to memory unit $M_0$ and feeds back the output of this memory unit to its input. Also, switch 229, which normally is opened, now is closed. Similarly, AND gate 221 is associated with memory unit $M_1$ and is coupled to switches 230 and 231 for controlling the conditions thereof. AND gate 222 is associated with memory unit $M_2$ and is coupled to switches 232 and 233 to control the conditions thereof. Finally, AND gate 223 is associated with memory unit $M_3$ and is coupled to switches 234 and 235 to control the conditions thereof.

In operation, let it be assumed that the 2-bit address which is applied to input terminals 205 and 205' is the address of memory unit $M_2$, and that the 2-bit address which is applied to input terminals 206 and 206' is the address of memory unit $M_0$. Accordingly, write address decoder 203 decodes this 2-bit address to condition AND gate 214. Write clock pulses WCK are supplied to AND gate 211 via input terminal 207; and when control unit 67 determines that a write-in operation can proceed, the WRITE ENABLE signal is applied to input terminal 209 to condition AND gate 211 to supply the write clock pulses to AND gate 214. Thus, write clock pulses are applied through AND gate 214 and OR gate 226 to the clock input of memory unit $M_2$. These write clock pulses also are supplied to output terminal 246 for driving a corresponding memory unit in drop-out condition memory 58, as will be described. Hence, digitized samples which are supplied to input terminal 201 from the A-D converter are clocked into memory unit $M_2$. Since the capacity of each memory unit is assumed to be equal to two line intervals, memory unit $M_2$ is addressed to store two successive line intervals therein.

At the same time that memory unit $M_2$ is conditioned for a write-in operation, read address decoder 204 decodes the 2-bit address supplied to input terminals 206 and 206' by control unit 67 to condition AND gate 220. Control unit 67 determines that, since a different memory unit is addressed for a read-out operation than is addressed for a write-in operation, the read-out operation can proceed. Hence, the READ ENABLE signal is applied to input terminal 210, thereby energizing AND gate 220 to close switch 229 and change over switch 228. This interrupts the connection from input terminal 201 to memory unit $M_0$, and the output of this memory unit is fed back to the input thereof. In addition, when AND gate 220 is energized, an output is provided at output terminal 240 for the purpose of reading out the contents of a corresponding memory unit in drop-out condition memory 58, as will be described.

Energized AND gate 220 also conditions AND gate 216 to apply the read clock pulses supplied thereto from input terminal 208 through OR-gate 224 to the clock input of memory unit $M_0$ and also to the clock input of a corresponding memory unit in the drop-out condition memory. Since memory unit $M_0$ is supplied with clock pulses, the contents thereof are shifted. Thus, a line of digitized video signals is read out of this memory unit and is supplied to output terminal 202 via switch 229. The read-out line of video signals also is fed back via switch 228 and thus is rewritten into memory unit $M_0$. At the same time, the line of digitized video signals which is supplied to input terminal 201 is written into memory unit $M_2$ in response to the write clock pulses which are applied to the clock input therof via OR-gate 226 and AND gate 214.

After the contents of memory unit $M_0$ are read out therefrom, control unit 67 supplies the next successive read address to read address decoder 204. Consequently, the foregoing read-out operation now is performed with respect to memory unit $M_1$.

Similarly, after two lines of digitized video signals are stored in memory unit $M_2$, control unit 67 supplies different write address to write address decoder 203. Accordingly, the foregoing write-in operation next is carried out with respect to the next successive memory unit $M_3$.

Since different memory units are selected for write-in and read-out operations, it is appreciated that both operations can be performed simultaneously. The control unit monitors the addresses of the memory units which are selected for the write-in and read-out operations and prevents the possibility of addressing a common memory unit simultaneously for both a write-in and a read-out operation. In the event that a memory unit which is being addressed for a write-in operation is about to be addressed for a read-out operation, the read address is not changed, thereby avoiding simultaneous addressing of the same memory unit; but, rather, the presently addressed memory unit is addressed once again to have the contents thereof re-read. This is why the output of each memory unit is fed back thereto during a read-out operation. Hence, it may be appreciated that the main memory should be provided with at least threee memory units to avoid the possibility of simultaneously addressing the same memory unit for both a write-in and a read-out operation. It is preferred that four such memory units, as illustrated herein, be provided.

Drop-Out Condition Memory 58 and Drop-Out Compensator 60

Figure 4:
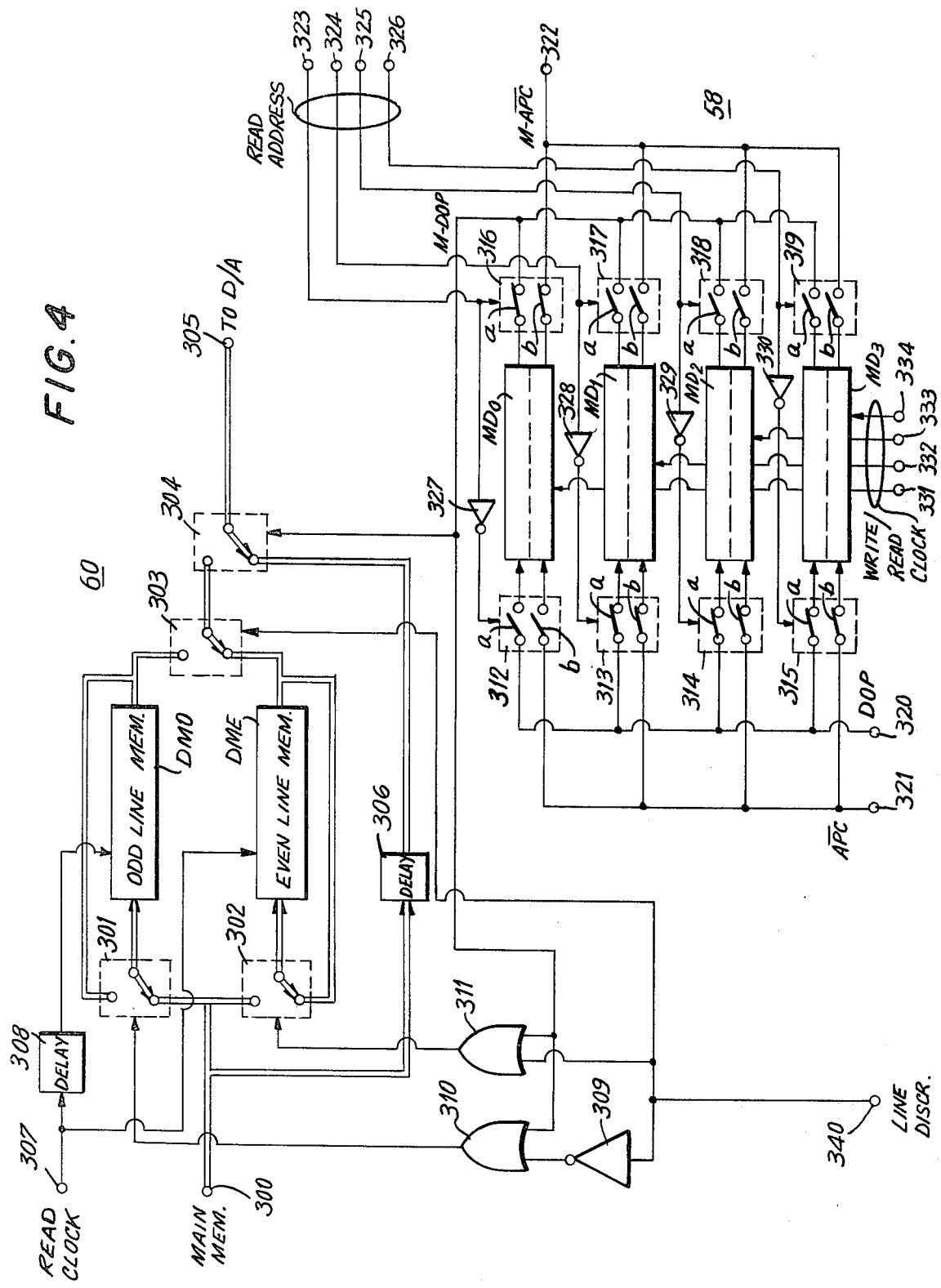
FIG. 4 is a block diagram of the drop-out compensating circuitry used in the illustrated time base error corrector.

Drop-out condition memory 58 and drop-out compensator 60 are shown in the partial block, partial logic diagram of FIG. 4. As mentioned above, drop-out condition memory 58 is adapted to store drop-out indications which represent those picture elements in received lines of video signals that have dropped out. To this effect, the drop-out condition memory is comprised of memory units $MD_0$, $MD_1$, $MD_2$ and $MD_3$. It is seen that the same number of memory units are provided in drop-out condition memory 58 as are provided in main memory 59. Furthermore, each of memory units $MD_0$–$MD_3$ has a storage capacity equal to two lines, that is, a capacity such that drop-out indications that may occur at any picture element for each of two successive lines can be stored therein. Each of memory units $MD_0$–$MD_3$ is adapted to store an indication that drop-out has occurred in the video information portion of a line interval, and also to store an indication that drop-out has occurred in the synchronizing information portion of the line interval. For example, if no drop-out has occurred in a picture element, a binary "0" may be stored in the storage location in the memory unit corresponding to that picture element; and a binary "1" may be stored in that storage location if a drop-out condition has been detected. In the preferred embodiment, each of memory units $MD_0$–$MD_3$ is comprised of two separate storage sections for storing drop-out indications that occur during the video information portion and that occur during the synchronizing information portion, respectively. Each section may be formed as a multi-stage shift register having a number of stages equal to the number of samples which are derived during two successive line intervals. Thus, each shift register may include 640×2 stages. Alternatively, the section of each memory unit that stores the indication that drop-out has occurred in the synchronizing information portion of a line interval can have a storage capacity for storing only two bits, one bit representing the occurrence (or non-occurrence) of drop-out in the synchronizing information portion of one line interval and the other bit representing the occurrence (or non-occurrence) of drop-out in the synchronizing information portion of the following line interval. However, in order to simplify the overall write-in and read-out operations of memory units $MD_0$–$MD_3$, it is preferred that each memory unit be formed of two multi-bit shift registers, as mentioned above.

Each memory unit $MD_0$–$MD_3$ has its input connected to a write-in switching circuit and its output connected to a read-out switching circuit, these switching circuits being diagrammatically illustrated herein as having movable contacts. Specifically, the inputs of memory units $MD_0$–$MD_3$ are connected to write-in switching circuits 312–315, respectively, and the outputs of memory units $MD_0$–$MD_3$ are connected to read-out switching circuits 316–319, respectively. Each switching circuit has a a contact and a b contact. The a contacts of the write-in switching circuits are, when closed, connected to the sections of the respective memory units wherein indications of drop-out in the video information portion of the line intervals are stored. Contacts a of the read-out switching circuit are coupled to the outputs of these respective sections. Contacts b of the write-in switching circuits are, when closed, connected to those sections of the memory unit in which the indications that drop-out has occurred in the synchronizing information portion of the line intervals are stored; and contacts b of the read-out switching circuits are connected to the outputs of these sections. Contacts a of write-in switching circuits 312–315 are connected in common to an input terminal 320 for receiving a signal DOP representing the occurrence of a drop-out condition, as detected by drop-out detector 55, in a sampled picture element of the incoming line of video signals. Contacts b of write-in switching circuits 312–315 all are connected in common to an input terminal 321 for receiving the signal $\overline{APC}$ which, as will be described, is produced by the APC section of write clock generator 63 in the event that drop-out has occurred during the synchronizing information portion of the incoming line of video signals.

Contacts a of read-out switching circuits 316–319 all are connected in common to drop-out compensator 60 for supplying a read-out drop-out indication, referred to herein as a M-DOP signal. Contacts b of the read-out switching circuits all are connected in common to an output terminal 322 for supplying the read out signal $\overline{\text{M-APC}}$ which, as will be described below, is applied to velocity error memory 64.

Input terminals 323–326 of drop-out condition memory 58 are connected to output terminals 240–243, respectively, of main memory 59 for receiving the decoded 2-bit read addresses which are produced by AND gates 220–223, described above. Thus, when the read address selects main memory unit $M_0$, a corresponding address signal, such as a binary "1", is received at input terminal 323. Similarly, if any of main memory units $M_1$, $M_2$ or $M_3$ are addressed for a read-out operation, a binary "1" is applied to a corresponding one of input terminals 324, 325 and 326, respectively. Input terminals 323–326 are connected directly to the control inputs of read-out switching circuits 316–319, respectively, and are connected via inverters 327–330 to the control inputs of write-in switching circuits 312–315, respectively. In each of the write-in and read-out switching circuits, contacts a and b are closed when a binary "1" is supplied to the control input, and these contacts are opened when a binary "0" is supplied thereto. Normally, only one main memory unit is selected for a read-out operation and, therefore, a binary "1" is supplied to only one of input terminals 323–326, the remaining input terminals being supplied with a binary "0". This means that contacts a and b of only one of read-out switching circuits 316–319 are closed, the remaining read-out switching circuits being provided with opened contacts. Conversely, only one of write-in switching circuits 312–315 is provided with opened contacts a and b; the remaining ones of these write-in switching circuits being provided with closed contacts. Thus, if main memory unit $M_0$ is addressed for a read-out operation, a binary "1" is supplied to input terminal 323, resulting in the closing of contacts a and b of read-out switching circuit 316 and the simultaneous opening of contacts a and b of write-in switching circuit 312. Similarly, if main memory unit $M_1$ is addressed for read-out operation, a binary "1" is supplied to input terminal 324, resulting in the closing of contacts a and b of read-out switching circuit 317 and the opening of switching contacts a and b of write-in switching circuit 313. A similar operation occurs in the event that main memory units $M_2$ or $M_3$ are addressed for a read-out operation.

Each of memory units $MD_0$–$MD_3$ is provided with a clock input, similar to the clock inputs of aforedescribed main memory units $M_0$–$M_3$. Input terminals 331–334 are connected to the clock inputs of memory units $MD_0$–$MD_3$, respectively, and these input terminals are further connected to output terminals 244–247, respectively, of main memory unit 59 for receiving write clock pulses and read clock pulses that may be produced by aforedescribed OR gates 224–227. Thus, depending upon which of memory units $MD_0$–$MD_3$ is supplied with clock pulses, the contents of such memory units are shifted therethrough, thereby enabling drop-out indications to be written therein and to be read therefrom.

The operation of drop-out condition memory 58 is best understood by describing it in conjunction with the operation of drop-out compensator 60. Before describing this operation, the illustrated embodiment of the drop-out compensator will be discussed.

As is known, in the NTSC system, the phase of the chrominance subcarrier in odd line intervals differs from the phase of the chrominance subcarrier in even line intervals. For example, during one frame interval, the phase of the chrominance subcarrier in odd line intervals may have a 0° phase, while the phase of the chrominance subcarrier in the even line intervals may have a 180° phase. During the next frame interval, the phase of the chrominance subcarrier in the odd line intervals may be 180°, while the phase of the chrominance subcarrier in the even line intervals may be 0°. In accordance with one advantageous feature of the present invention, in the event of drop-out in a picture element of one line, the picture element that is positioned in the same relative location in the immediately preceding line is substituted therefor. However, as is clear from the foregoing discussion, the chrominance subcarrier in that preceding line has a different phase such that the substitution will result in unmatched phases, thereby degrading the quality of the video picture which ultimately is reproduced. This problem is avoided by drop-out compensator 60 shown in FIG. 4.

The illustrated drop-out compensator is comprised of an odd line memory unit DMO and an even line memory unit DME, these memory units being selectively connected to an input terminal 300 via change-over switches 301 and 302, respectively. Each of memory units DMO and DME is adapted to store a line of picture elements (640×8 bits) which is read out of main memory 59. Accordingly, input terminal 300 is connected to output terminal 202 (FIG. 3) of main memory 59. Change-over switches 301 and 302 are operable in response to switch control signals supplied to the respective control inputs thereof such that when an odd line of video signals is read out of the main memory, change-over switch 301 couples input terminal 300 to memory unit DMO so that this odd line is stored in the odd line memory unit, and when an even line of video signals is read out of the main memory, change-over switch 302 couples input terminal 300 to memory unit DME so that this even line is stored in the even line memory unit. When one of the memory units is connected via its associated change-over switch to input terminal 300, the other change-over switch operates to feed back the output of the other memory unit to the input thereof. The control input of change-over switch 301 is connected to an OR gate 310, and the control input of change-over switch 302 is connected to an OR gate 311. Each of these OR gates includes one input connected in common to receive the M-DOP signal which is read out of any one of memory units $MD_0$–$MD_3$ of drop-out condition memory 58. The other input of OR gate 310 is connected to an input terminal 340 via an inverter 309 to receive a line discriminating signal. The other input of OR gate 311 is connected directly to input terminal 340. The line discriminating signal is supplied by control unit 67 and alternates between, for example, a binary "0" and a binary "1" when odd and even lines, respectively, are read out of main memory 59.

The outputs of memory units DMO and DME, in addition to being fed back via change-over switches 301 and 302, respectively, also are coupled to a change-over switch 303. This change-over switch includes a control input connected directly to input terminal 340 for receiving the line discriminating signal, and operates in a manner opposite to the operation of change-over switches 301 and 302. That is, when change-over switch 301 is in the condition whereby memory unit DMO is coupled to input terminal 300 for receiving the odd line read out of main memory 59, change-over switch 303 couples the output of memory unit DME to further apparatus so as to supply the preceding even line of video signals to such apparatus. When change-over switches 301 and 302 are changed over so that an incoming even line of video signals which is read out of the main memory is supplied to memory unit DME, the preceding odd line of video signals is read out of memory unit DMO via change-over switch 303.

The output of change-over switch 303 is coupled to output terminal 305 and thence to D/A converter 61, via yet another change-over switch 304. This change-over switch also is coupled to input terminal 300 and, in its normal condition, transmits the successive picture elements which are read out of the main memory to output terminal 305. Change-over switch 304 further includes a control input connected to receive the M-DOP signal that is read out of any memory units $MD_0$–$MD_3$, whereupon this change-over switch changes its condition so as to transmit the picture element or elements read out of one or the other of memory units DMO and DME and supplied thereto by change-over switch 303.

Memory units DMO and DME each includes a clock input coupled to input terminal 307 to receive the read clock pulses which are supplied thereto from main memory unit 59 (FIG. 3) when the odd and even line intervals are read out of the main memory unit. These read clock pulses are transmitted by AND gate 248 (FIG. 3) when a read-out operation of the main memory unit is performed. Thus, the same read clock pulses are supplied to the main memory as are supplied to the odd and even line memory units included in drop-out compensator 60. When an odd line interval is read out of the main memory, a so-called odd line clock pulse signal is applied to write the read out picture elements into odd line memory unit DMO; and when an even line interval is read out of the main memory, a so-called even line clock pulse signal is applied to write the read out picture elements into even line memory unit DME.

Delay circuits 306 and 308 are provided to insure that, in the event of drop-out compensation, that is, in the event that a picture element stored in memory unit DMO or in memory unit DME is substituted for a dropped out picture element in the line of video signals which then is being read out of main memory 59, the phase of the substituted picture element matches the phase of the dropped out picture element (i.e., the phase of the line when then is being read out of the main memory). Delay circuit 308 is connected to the clock input of odd line memory unit DMO so as to delay, by a predetermined time, for example, three clock pulse intervals, or 280 nsecs, the read clock pulses which are used to read out the contents of the odd line memory unit. This means that when an even line of video signals is being read out of main memory 59, the even line clock pulses are delayed so that the reading out of the immediately preceding odd line of video signals from odd line memory unit DMO is correspondingly delayed.

Delay circuit 306 is provided for a similar purpose and, as shown in FIG. 4, is connected between input terminal 300 and change-over switch 304 so as to provide a delay of, for example, three clock pulses intervals, or 280 nsecs., to the picture elements which are read out of the main memory.

The operation of the illustrated drop-out condition memory and drop-out compensation circuit now will be described. It is recalled that, as video signals are reproduced by the VTR with which the time base corrector of this invention is used, drop-out detector 55 detects those portions of the reproduced video signal which are dropped out. These detected drop-out conditions which occur during the video information portion of the video signal are represented by the drop-out signal DOP which is applied to input terminal 320 in synchronism with the writing of sampled picture elements into main memory 59. For example, if sample #10 in a line interval is dropped out, then at the time that a binary word for example #10 is written into the main memory, the drop-out signal DOP (which has been assumed to be a binary "1") is written into one of memory units $MD_0$–$MD_3$. Similarly, if sample #25 in the line interval then being written into the main memory is dropped out, the drop-out signal DOP is written into a corresponding one of the drop-out condition memory units. Thus, drop-out signals DOP will be stored in those locations of the respective memory units $MD_0$–$MD_3$ which correspond to the locations in associated lines of video signals in which the picture elements had been dropped out.

Consistent with the foregoing example discussed with respect to the main memory shown in FIG. 3, let it be assumed that memory unit $M_2$ is addressed for a write-in operation. It is recalled that write clock pulses are supplied to the write clock input of memory unit $M_2$ by OR gate 226. These write clock pulses are supplied at output terminal 246 (FIG. 3) to be received at input terminal 333 (FIG. 4) and supplied to the clock input of memory unit $MD_2$. Consequently, if any drop-out indications are provided while picture elements are being written into memory unit $M_2$, these drop-out indications are written into memory unit $MD_2$ as drop-out signals DOP, these drop-out signals being stored in locations in memory unit $MD_2$ which correspond to the locations in memory unit $M_2$ in which the picture elements have dropped out.

Concurrently with the write-in operation of the main and drop-out condition memories, read-out operations also are performed. It had been assumed above that the picture elements stored in memory unit $M_0$ are read out therefrom. In this regard, change-over switches 228 and 229 (FIG. 3) are controlled by AND gate 220 such that the picture elements stored in memory unit $M_0$ can be read out therefrom. When AND gate 220 thus addresses memory unit $M_0$ for read-out operation, a binary "1" is applied at output terminal 240 and is coupled therefrom to input terminal 323 (FIG. 4). This binary "1" closes contacts a and b of read-out switching circuit 316 and, via inverter 327, opens contacts a and b of write-in switching circuit 312. The contacts of the remaining write-in switching circuits remain closed and the contacts of the remaining read-out switching circuits remain open, as illustrated. In addition, the read clock pulses which had been supplied via AND gate 216 and OR gate 224 to the clock input of memory unit $M_0$ (FIG. 3) are supplied via output terminal 244 to input terminal 331 (FIG. 4), and thence to the clock input of memory unit $MD_0$. Thus, as the picture elements stored in memory unit $M_0$ are read out therefrom, the dropout signals DOP stored in memory unit $MD_0$ likewise are read out in synchronism therewith.

The picture elements which are read out from memory unit $M_0$ are supplied to input terminal 300 of dropout compensator 60. Let it be assumed that the line interval then being read out of the main memory is an odd line. The presence of this odd line is represented by a binary "0" line discriminating signal which is applied to input terminal 340 from control unit 67. This binary "0" is inverted by inverter 309 and supplied as a binary "1" to the control input of change-over switch 301, thereby connecting odd line memory unit DMO to input terminal 300. The odd line of video signals then being read out of the main memory is written into memory unit DMO by the odd line read clock pulses which are supplied to input terminal 307 by AND gate 248 (FIG. 3). These odd line read clock pulses are delayed by three clock pulse intervals, or 280 nsec., by delay circuit 308 so as to shift the phase of the picture elements written into odd line memory unit DMO with respect to the picture elements which then are supplied to input terminal 300. The sampling rate at which picture elements are produced by A/D converter 57 is equal to three times the chrominance subcarrier ($3f_{sc}$), and the odd line read clock pulses which are used to read the odd line of video signals out of the main memory also have a repetition rate of $3f_{sc}$.

The binary "0" line discriminating signal which is supplied to input terminal 340 conditions change-over switch 302 to feed back the output of even line memory unit DME to the input thereof. Thus, as the odd line of video signals is written into memory unit DMO by the odd line read clock pulses, the content of even line memory unit DME, which consists of the immediately preceding even line of video signals, is recirculated by these odd line read clock pulses. At the same time, the odd line discriminating signal conditions change-over switch 303 to connect the output of memory unit DME to change-over switch 304. Hence, the immediately preceding even line interval, which is being read out of memory unit DME, is supplied to change-over switch 304.

Since the even lines of video signals are out of phase with the odd lines of video signals, and because of the fact that the sampling rate of the A/D converter is three times the chrominance subcarrier frequency, each sample, or picture element, of an even line interval is phase-shifted with respect to a corresponding sample, or picture element, of an odd line interval. This phase shift is equal to about 140 nsec. Let it be assumed that the picture elements of an even line interval lead the corresponding picture elements of an odd line interval. Hence, the even line picture elements are phase advanced by 140 nsec with respect to the odd line picture elements. Therefore, the even line read clock pulses are phase advanced by 140 nsec with respect to the odd line read clock pulses. Now, by reading out the even line of video signals from even line memory unit DME with the odd line read clock pulses, the output from memory unit DME is delayed by 140 nsec. But the odd line of video signals which is being read out of the main memory is delayed in delay circuit 306 by three clock pulses, or 280 nsec. Thus, the video signals which are being read out of even line memory unit DME to change-over switch 304 are phase advanced by 140 nsec with respect to the odd line of video signals which are being read out of the main memory and supplied to this change-over switch. If a picture element read out of the memory unit DME is inserted into this odd line of video signals, it will be phase advanced with respect thereto. This phase condition is corrected, in the event of drop-out compensation, by output processing stage 62, to be described.

As mentioned above, the contents of memory unit $MD_0$ in drop-out condition memory 58 are read out therefrom in synchronism with the reading out of picture elements from main memory 59. If a stored dropout signal DOP is read out of memory unit $MD_0$, this drop-out signal is supplied to the control input of change-over switch 304 and, via OR gates 310 and 311, to the control inputs of change-over switches 301 and 302. Change-over switch 304 responds to this drop-out signal M-DOP to connect change-over switch 303 to output terminal 305. Consequently, the dropped out picture element which then is being read out of main memory 59 is not supplied to output terminal 305. Instead, this drop-out picture element is replaced by the picture element then being read out from even line memory unit DME, that is, the picture element which occupies the same relative position in the immediately preceding, even line interval. Also, the read out dropout signal M-DOP operates change-over switches 301 and 302 to feed back the respective picture elements then being read out therefrom so as to avoid the writing in of a drop-out picture element from the main memory unit. At the completion of the read out drop-out signal M-DOP, change-over switch 304 returns to its normal condition, as illustrated, and change-over switch 301 again connects input terminal 300 to odd line memory unit DMO.

If an even line interval is being read out of the main memory, the line discriminating signal is a binary "1" to operate change-over switch 302 to connect input terminal 300 to even line memory unit DME and to operate change-over switch 303 to connect the output of odd line memory unit DMO to change-over switch 304. In addition, this line discriminating signal is inverted by inverter 309 to operate change-over switch 301 to connect the output of memory unit DMO back to its input. Hence, the picture elements contained in the even line of video signals are written into even line memory unit DME at the even line read clock rate. The preceding odd line of video signals which had been stored in odd line memory unit DMO now is read out therefrom at the even line read clock rate, and is supplied to change-over switch 304.

As mentioned previously, the even line read clock pulses are phase advanced by 140 nsec. with respect to the odd line read clock pulses. These even line clock pulses are supplied to odd line memory unit DMO by delay circuit 308 which delays these clock pulses by 280 nsec. Hence, the effective delay at which the odd line of video signals is read out of memory unit DMO is 280 nsec. (delay of delay circuit 308) minus 140 nsec. (advance of even line read clock pulses), or 140 nsec. with respect to the even line of video signals being read out of the main memory. But this odd line of video signals is delayed in delay circuit 306 by 280 nsec. Thus, the video signals which are being read out of odd line memory unit DMO to change-over switch 304 are phase advanced by 140 nsec. with respect to the even line of video signals which are supplied to this change-over switch from the main memory. If a picture element read out of memory unit DMO is inserted into this even line of video signals, it will be phase advanced with respect thereto. This phase condition is corrected, in the event of drop-out compensation, by output processing stage 62, as will be described.

If a picture element then being read out of the main memory has dropped out, the drop-out signal M-DOP representative thereof is read out of memory unit $MD_0$ and is supplied to change-over switch 304, whereupon the dropped out picture element is replaced by the corresponding picture element which had been present in the immediately preceding line interval. Also, and as described before, change-over switches 301 and 302 respond to this read out drop-out signal M-DOP to disconnect input terminal 300 from both the odd line and the even line memory units, thereby preventing the drop-out picture element from being written into either of these memory units.

Thus, it is seen that drop-out compensator 60 functions to replace a dropped-out picture element with a picture element disposed in the same relative position in the immediately preceding line interval. Furthermore, and with the cooperation of the output processing stage, this substitution, or drop-out compensation, is effected without disturbing the phase relationship of the line of video signals, even though the phase of the immediately preceding line is shifted with respect to the phase of the line then being read out of the main memory.

In the event that a drop-out condition is detected during the synchronizing information portion of an incoming video signal, the $\overline{APC}$ signal is written into the one memory unit $MD_0$–$MD_3$ which then is being addressed for a write-in operation. When the line of video signals containing this drop-out condition is read out of the main memory, this indication is read out of drop-out condition memory 58 as the signal M-$\overline{APC}$. As will be described below, this M-$\overline{APC}$ signal is used in a velocity error compensation operation.

D/A Converter 10

Figure 5:
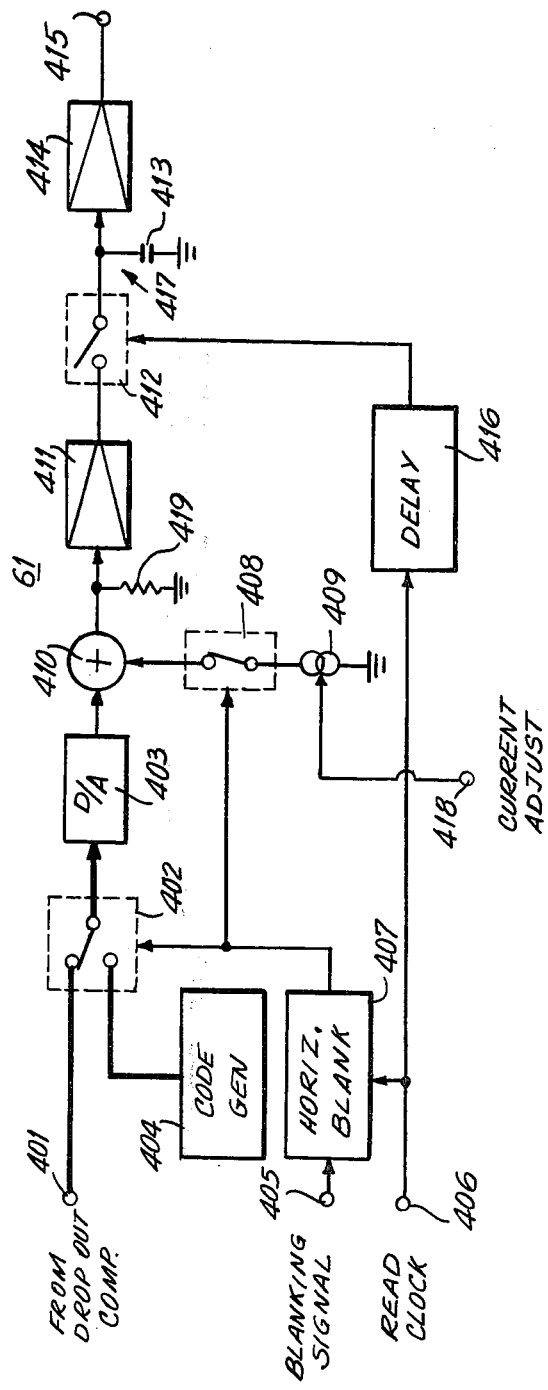
FIG. 5 is a block diagram of the digital-to-analog converter which is used with the illustrated time base error corrector.

Turning now to FIG. 5, a block diagram of D/A converter 61 is illustrated as comprising a change-over switch 402, a D/A converter 403, a code generator 404, a horizontal blanking circuit 407, an adding circuit 410 and a sample-and-hold circuit 417. Change-over switch 402 is diagrammatically depicted as a mechanical switch having a fixed contact coupled to an input terminal 401 which, in turn, is supplied with read out digitized samples from drop-out compensator 60 (FIG. 1). Another fixed contact of change-over switch 402 is coupled to code generator 404, the latter being adapted to generate a constant digital code representing the pedestal level of the video signal. The movable contact of the change-over switch is coupled to D/A converter 403 and is selectively engageable with either of the fixed contacts thereof so as to supply either the video signal which is read out from the drop-out compensator or the pedestal level code from the code generator to the D/A converter. The condition of switch 402, which normally connects input terminal 401 to D/A converter 403, is changed over by horizontal blanking circuit 407 to couple code generator 404 to the D/A converter in the presence of a horizontal blanking signal. Accordingly, horizontal blanking circuit 407 may comprise a gating circuit having an input coupled to input terminal 405 to receive the horizontal blanking signal which is generated by synchronizing signal generator 66 (FIG. 1), and another input coupled to input terminal 406 to receive a read clock pulse. The read clock pulse is used to synchronize the timing of the horizontal blanking signal in horizontal blanking circuit 407.

D/A converter 403, which may comprise any conventional digital-to-analog converter, is coupled to one input of adding circuit 410, the other input thereof being coupled through a switch 408 to a constant current generator 409. Switch 408, diagramatically depicted herein as an electromechanical switch, includes a switch control input coupled to horizontal blanking circuit 407 and is adapted to be closed in response to the horizontal blanking signal generated thereby. When closed, switch 408 supplies the constant current generated by constant current generator 409 to adding circuit 410. The constant current level produced by constant current generator 409 is determined by a manually adjustable current control signal which is supplied thereto from an input terminal 418. When switch 408 is closed, the magnitude of the constant current which is supplied to adding circuit 410 from constant current generator 409 serves to adjust the pedestal level which initially is determined by code generator 404 and D/A converter 403.

The output of adding circuit 410, which is provided across resistor 419, is amplified by amplifier 411 and supplied to sample-and-hold circuit 417. The sample-and-hold circuit is depicted as being comprised of a switch 412 which is selectively closed to sample the video signal supplied thereto by amplifier 411 in response to a delayed read clock pulse. To this effect, a delay circuit 416 is coupled between input terminal 406 and the sampling control input of sampling switch 412. Capacitor 413 is provided at the output of switch 412 for the purpose of storing the sampled video signal. The video signal stored across capacitor 413 then is supplied through an amplifier 414 to an output terminal 415.

Figure 6:
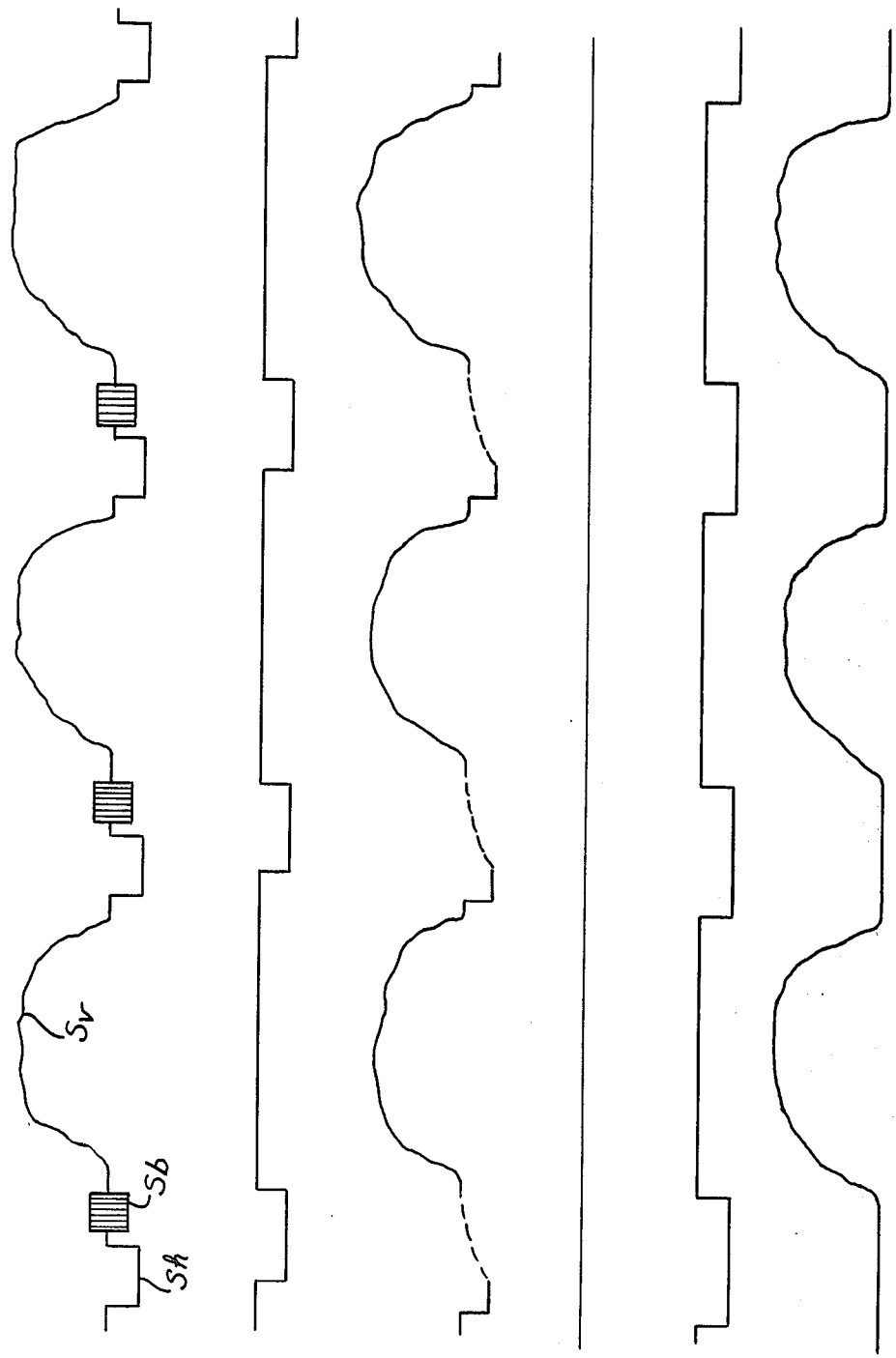
FIGS. 6A–6E are waveform diagrams which are useful in understanding the operation of the digital-to-analog converter shown in FIG. 5.

The operation of the illustrated D/A converter 61 now will be described with reference to FIGS. 6A–6E which are waveform diagrams representing the operation of portions of the elements shown in FIG. 5. FIG. 6A represents a reconstituted composite color video signal having a video information portion $S_v$, and a synchronizing information portion containing a horizontal synchronizing pulse $S_h$ and a burst signal $S_b$. This color video signal, which is similar to the incoming color video signal supplied to the time base correcting apparatus by the VTR, is digitized and stored in main memory 59. During the write-in operation of the main memory, control unit 67 generates a WRITE ENABLE signal having the waveform shown in FIG. 6B. It is appreciated that the relatively low level portion of the WRITE ENABLE signal inhibits a portion of the horizontal synchronizing pulse $S_h$ and the burst signal $S_b$ from being written into the main memory. But all of the video information included in the composite color video signal, plus a portion of the horizontal synchronizing pulse, is written into main memory 59. Hence, during a read-out operation, only that portion which had been written into the main memory is read out therefrom. FIG. 6C represents, in analog form, the video signal which is read out from the main memory and which, in the absence of drop-out, is supplied to input terminal 401 and, through switch 402, to D/A converter 403. It may be appreciated that the waveform shown in solid lines in FIG. 6C is produced by D/A converter 403 and is supplied to adding circuit 410.

Synchronizing signal generator 66 generates a horizontal blanking pulse train, which is similar to that shown in FIG. 6D. The timing of this horizontal blanking pulse train is synchronized in horizontal blanking circuit 407 with the read clock pulses generated by read clock generator 65 so as to have the waveform identical to that shown in FIG. 6D. That is, the waveform in FIG. 6D is the re-timed horizontal blanking pulse. It is appreciated that the horizontal blanking pulses shown in FIG. 6D also are synchronized with the video signal which is read out by the read clock pulses from main memory 59 and then is reconverted back into analog form by D/A converter 403. During each horizontal blanking interval at the output of horizontal blanking circuit 407, that is, during the interval that the signal shown in FIG. 6D is relatively low, change-over switch 402 supplies the predetermined pedestal level code from code generator 404 to D/A converter 403. Thus, the reconverted analog video signal which is supplied to adding circuit 410 has the waveform shown in FIG. 6E wherein video information portions are separated from each other by the horizontal blanking interval.

At the time that the horizontal blanking interval in the video signal shown in FIG. 6E is supplied to adding circuit 410, switch 408 is closed to apply the constant current of adjustable magnitude to the adding circuit. This constant current serves to shift the pedestal level, that is, the blanking interval which is present between successive video information portions in the waveform of FIG. 6E, either upwardly or downwardly, depending upon the current adjustment signal supplied to input terminal 418. Thus, the output of adding circuit 410, which has the waveform of FIG. 6E, includes a properly set pedestal level. This pedestal level is adjustable relative to the video signal information level.

In many instances, the reconverted analog video signal produced by D/A converter 403 includes transient pulses. The purpose of sample-and-hold circuit 417 is to eliminate these transient pulses from the reconverted video signal. Delay circuit 416 shifts the sampling time of the sample-and-hold circuit by a small amount, less than a read clock interval, whereby the transient pulses included in the reconstituted analog video signal are not sampled. Consequently, the analog video signal which is stored across capacitor 413 is substantially free of unwanted noise. Amplifier 414 then functions as a buffer amplifier to supply this reconstituted analog video signal to output terminal 415.

Output Processing Stage 62

Figure 7:
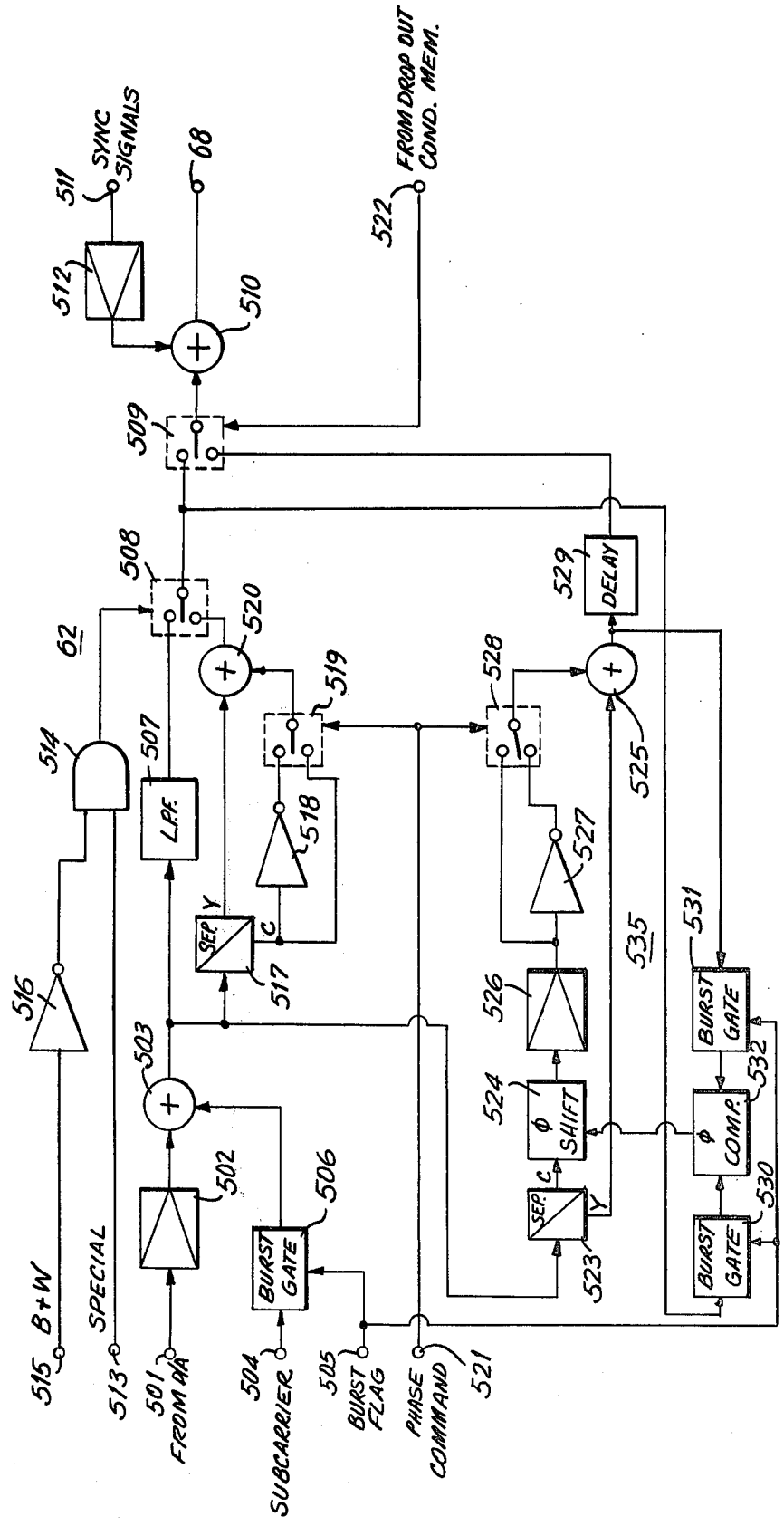
FIG. 7 is a block diagram of the output processing stage used in the illustrated time base error corrector.

FIG. 7 illustrates a block diagram of one embodiment of output processing stage 62, including a low-pass filter 507, a change-over switch 508, a burst adder 503, a synchronizing signal adder 510, and a drop-out processing circuit 535. The purpose of output processing stage 62 is to insert the usual burst signal and horizontal and vertical synchronizing pulses, as well as the equalizing pulses, into the video signal which is reconverted back into analog form by the D/A converter shown in FIG. 5. Accordingly, low-pass filter 507, which is adapted to filter out higher frequency noise, is coupled to input terminal 501 via an amplifier 502 and burst adder 503 and is adapted to receive the reconverted analog video signal produced at, for example, output terminal 415 of FIG. 5. Burst adder 503 is adapted to insert the usual burst signal into the horizontal blanking interval of the reconverted analog video signal and, as shown, is coupled to a burst gate 506. The burst gate includes one input coupled to an input terminal 504 for receiving a subcarrier signal generated by read clock generator 65, and another input coupled to input terminal 505 to receive a burst flag signal generated by synchronizing signal generator 66 for gating the subcarrier signal supplied during the interval of the burst flag.

The output of burst adder 503, which appears as the reconverted analog video signal having the burst signal added therein, is supplied through low pass filter 507 and change-over switches 508 and 509 to synchronizing signal adder 510. The synchronizing signal adder is adapted to insert the usual horizontal and vertical synchronizing pulses and equalizing pulses into the reconverted analog video signal and, to this effect, is supplied with these usual synchronizing signals from an input terminal 511 through a buffer amplifier 512. The synchronizing signals which are applied to input terminal 511 are generated by sychronizing signal generator 66.

A branch circuit is coupled to the output of burst adder 503 and is adapted to supply the reconverted analog video signal with the re-inserted burst signal to synchronizing signal adder 510 by change-over switch 508 in the event that the VTR with which the time base error correcting apparatus is used is operated in its special mode. For example, if the VTR operates in its slowmotion, stop or fast-motion modes of playback, there is the possibility that the phase of the subcarrier which is supplied through burst gate 506 to burst adder 503 is not proper with respect to the phase of the chrominance subcarrier in the played back video signal. The branch circuit functions to insure proper phase coincidence, and is comprised of a signal separator 517, adapted to separate the luminance and chrominance components from the composite color video signal, an inverter 518, a change-over switch 519 and an adder 520. Inverter 518 is coupled to receive the separated chrominance component from signal separator 517 so as to provide an inverted, or oppositely-phased, chrominance component at its output. Change-over switch 519, illustrated diagrammatically herein as an electromechanical switch, is controlled by a phase command signal applied to input terminal 521 by suitable apparatus (not shown) so as to couple either inphase, or positive, polarities of the chrominance component directly from signal separator 517, or out-of-phase, or negative polarities, of the chrominance component from inverter 518 to adder 520. If the VTR with which the present time base corrector is used operates in its stop mode, for example, the same field of video signals is scanned a consecutive number of times, this means that in each frame interval the phase of the chrominance subcarrier may be 0° in all odd line intervals and 180° in all even line intervals. But the NTSC standard requires that this phase condition change at each frame interval. Change-over switch 519 is controlled by the phase command signal applied to input terminal 521 to carry out this change for compatibility with the NTSC standard. Adder 520 serves to recombine the luminance and properly phased chrominance components, and to supply these recombined components through change-over switch 508 and through change-over switch 509 to synchronizing signal adder 510.

Normally, change-over switch 508 couples low-pass filter 507 to the synchronizing signal adder. However, when the VTR is operated in one of its special playback modes, change-over switch 508 couples the branch circuit to the synchronizing signal adder. The control over change-over switch 508 is effected by an AND gate 514 having one input coupled to an input terminal 513 and another input coupled through an inverter 516 to an input terminal 515. Input terminal 513 is adapted to receive a SPECIAL signal when the VTR is operated in its slow-motion, stop or fast-motion modes. If the played back video signal is a composite color video signal, then a binary "0" is supplied to input terminal 515, this binary "0" being inverted to a binary "1" to condition AND gate 514. This conditioned AND gate changes over change-over switch 508 from coupling low-pass filter 507 to synchronizing signal adder 510 to the condition wherein the branch circuit is coupled to the synchronizing signal adder in the event that the SPECIAL signal is applied to input terminal 513. However, this change-over operation is not needed in the event that the reproduced video signal is a monochrome signal. Accordingly, if such a monochrome signal is played back, a binary "1" is applied to input terminal 515, this binary "1" being inverted so as to disable AND gate 514. That is, even though a SPECIAL mode of operation of the VTR is selected, if the played back video signal is a black-and-white television signal, change-over switch 508 admits of its normal condition whereby low-pass filter 507 is coupled thereby to synchronizing signal adder 510. The SPECIAL signal is produced by write clock generator 63 and the monochrome signal is produced by synchronizing separator 72, as will be described.

The output of synchronizing signal adder 510 is coupled to an output terminal 68 so as to provide a time base corrected video signal in accordance with NTSC standards.

Change-over switch 509 is operative in its normal condition to couple the output from change-over switch 508 to synchronizing signal adder 510, and in its controlled condition to couple the output from drop-out processing circuit 535 to the synchronizing signal adder. Change-over switch 509 includes a control input connected to an input terminal 522 to receive, as a control signal, an output M-DOP from drop-out condition memory 58. This control signal changes over change-over switch 509 from its normal condition to its controlled condition in the event that the video signal then being read out of the main memory contains drop-out.

Drop-out processing circuit 535 is comprised of a signal separator 523, similar to aforementioned signal separator 517 and adapted to separate the chrominance and luminance components from the composite color video signal supplied to burst adder 503, a phase-shift circuit 529 connected to receive the chrominance component separated by signal separator 523 and adapted to adjust the phase of the chrominance subcarrier, an inverter 527, a change-over switch 528 and an adder 525. An amplifier 526 couples the phase-shifted chrominance signal from phase-shift circuit 524 to inverter 527 and to change-over switch 528, these latter circuits performing substantially the same operation as aforedescribed inverter 518 and change-over switch 519. In the interest of brevity, further description of these circuits is not provided. Suffice it to say that the output of adder 525, which serves to recombine the luminance and chrominance components, contains properly phased chrominance components in the event that the VTR operates in its special (e.g. still) mode. Thus, if the video signal reproduced by the VTR is an NTSC color signal, and if drop-out occurs therein, the phase of the chrominance component thereof during the special playblack mode is, nevertheless, matched to the NTSC standard. This phase-matched video signal provided by added 525 is supplied to change-over switch 509 by a delay circuit 529 for the purpose of equalizing the time of this video signal relative to the video signal which normally is supplied through low-pass filter 507. That is, delay circuit 529 accounts for the inherent system time delay of this video signal relative to the video signal which normally is supplied through low-pass filter 507. In addition, delay circuit 529 imparts a delay of 140 nsec. to those picture elements which had been substituted for dropped-out picture elements in drop-out compensator 60. It is recalled that such substituted picture elements are advanced by 140 nsec. with respect to the line interval in which they are inserted. Thus, in the event of drop-out, change-over switch 509 is operated to supply a properly phased, properly timed video signal from drop-out processing circuit 535 to synchronizing signal adder 510.

The purpose of phase-shift circuit 524 is to ensure that the phase of the chrominance subcarrier supplied by drop-out processing circuit 535 is equal to the phase of the chrominance subcarrier that is supplied to synchronizing signal adder 510 via change-over switch 508. That is, phase-shift circuit 524 functions to equalize different delays that might be present in the two circuits to which the inputs of change-over switch 509 are connected. This is attained by a phase control circuit comprised of burst gates 530 and 531 and phase comparator 532. Burst gates 530 and 531 both are supplied with the burst flag signal received at input terminal 505. Burst gate 530 is coupled to the output of change-over switch 508 to receive the color video signal transmitted therethrough from either low-pass filter 507 (during a normal playback mode) or adder 520 (during a special playback mode). Burst gate 531 is coupled to the output of adder 525 to receive the color video signal supplied by drop-out processing circuit 535. The outputs of burst gates 530 and 531 are connected to phase comparator 532 which operates to compare the phases of the burst signals extracted by these burst gates. Any phase differential therebetween is applied as a phase shift signal to phase-shift circuit 524 which shifts the phase of the chrominance subcarrier in the video signal provided by the drop-out processing circuit. Hence, the phase of the chrominance subcarrier supplied by drop-out processing circuit 535 is made equal to the phase of the chrominance subcarrier that is supplied either by low-pass filter 507 or by adder 520. This maintains good color fidelity in the video picture which ultimately is reproduced from the video signals at output terminal 68, even in the event of drop-out.

SYNCHRONIZING SEPARATOR 72

Figure 8:
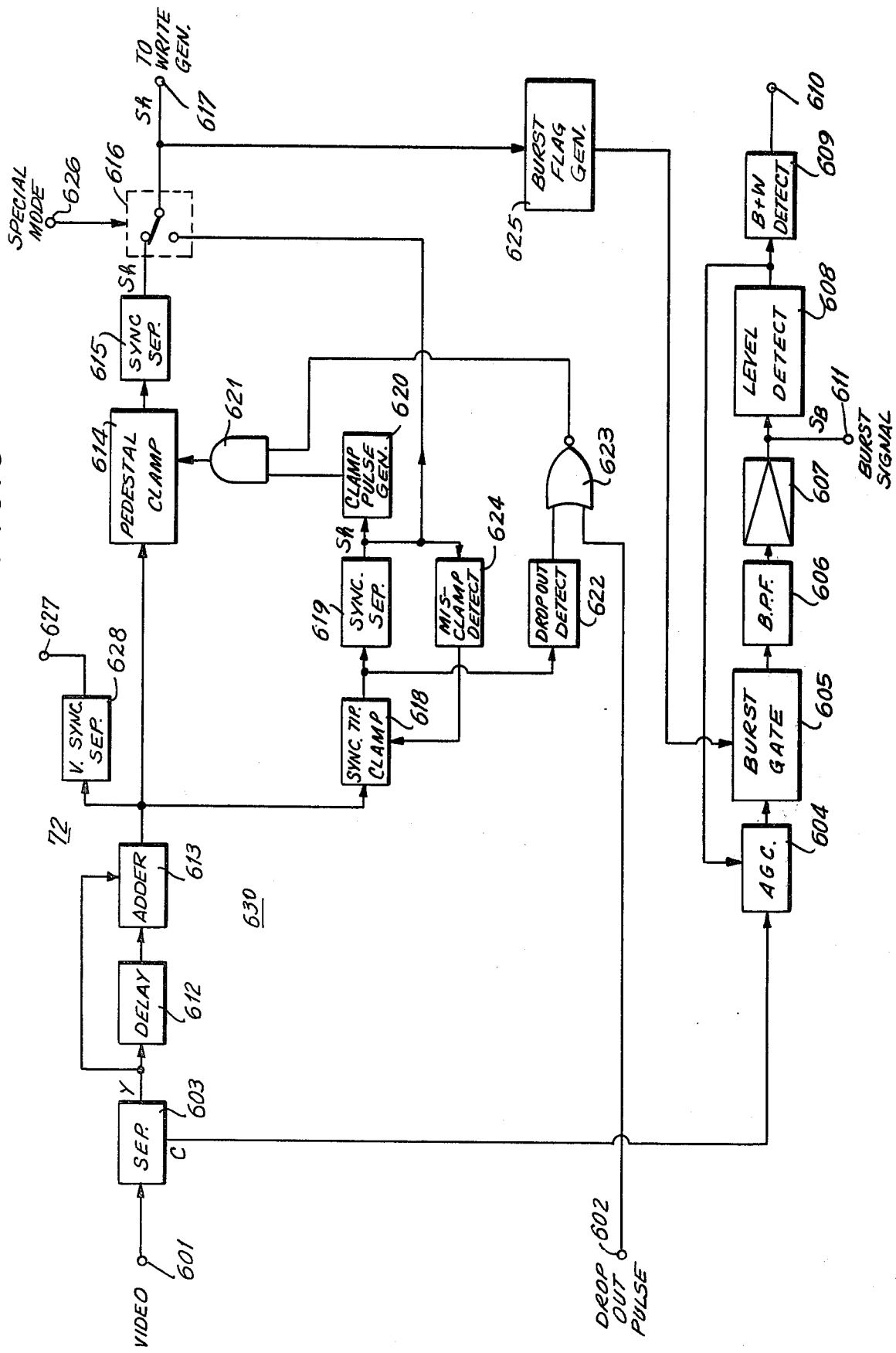
FIG. 8 is a block diagram of the synchronizing separator used in the illustrated time base error corrector.

The synchronizing separator is illustrated in FIG. 8 as comprising a signal separator circuit 603, a noise filter, or eliminating circuit 630, a pedestal clamping circuit 614, a synchronizing separator 615, a change-over switch 616, a burst flag generator 625 and a burst gate 605. Signal separator circuit 603 is coupled to input terminal 601 and is adapted to receive the composite video signal supplied thereto by input stage 56 (FIG. 1) and to separate this video signal into its luminance and chrominance components, respectively. Noise filter 630 is coupled to receive the luminance component from signal separator circuit 603, and the noise filter includes a delay circuit 612 and an adder 613. The delay circuit is adapted to delay the luminance component and to supply the delayed luminance component to adder 613 whereat the delayed component is added to the presently received luminance component. This has the effect of providing a higher signal-to-noise (S/N) ratio to the luminance component.

Adder circuit 613 is coupled to pedestal clamp circuit 614 and, in addition, to vertical synchronizing separator 628. The vertical synchronizing separator is adapted to separate the usual vertical synchronizing signals from the luminance component and to apply these vertical synchronizing signals to an output terminal 627.

Pedestal clamp circuit 614 functions to clamp the received luminance component supplied from noise filter 630 to the pedestal level so as to facilitate separating the horizontal synchronizing pulse $S_h$ from the clamped luminance signal. Synchronizing separator 615, which may comprise a clipping circuit, or the like, is coupled to pedestal clamp circuit 614 and separates the horizontal synchronizing pulse $S_h$ from the luminance signal. The output of synchronizing separator 615 is coupled through change-over switch 616 to an output terminal 617 so as to supply the separated horizontal synchronizing pulse $S_h$ to the write clock generator 63 and, in addition, to control unit 67.

The separated horizontal synchronizing pulse $S_h$ at the output of change-over switch 616 also is supplied to burst flag generator 625, whereby the usual burst flag pulse is produced. The output of burst flag generator 625 is coupled to burst gate 605, this burst gate having another input coupled to receive the separated chrominance component from signal separator circuit 603 via AGC circuit 604. Thus, the burst flag supplied to burst gate 605 by burst flag generator 625 is adapted to separate the burst signal $S_B$ from the chrominance component.

The output of burst gate 605 is coupled via a band pass filter 606 and an amplifier 607 to an output terminal 611 whereat the separated burst signal $S_B$ is provided. This separated burst signal is supplied to the write clock generator for phase-locking the memory write clock pulses thereto. These separated burst signals additionally are coupled to a level detector 608 and then to a black-and-white detector 609. Level detector 608 is adapted to detect the level of the separated burst signals and to feed back an indication of this detected burst signal level to AGC circuit 604 as a gain-controlling signal therefor. Hence, the combination of AGC circuit 604, burst gate 605 and level detector 608 functions as an automatic gain controlling circuit for maintaining a substantially constant gain, and thus signal level, for the burst signal. Black-and-white detector 609 is adapted to sense the absence of a burst signal and, therefore, to provide an indication at its output terminal that the received video signal, in the absence of the burst signal, is a black-and-white signal. This black-and-white indication may be supplied to, for example, control unit 67, whereby the black-and-white signal which is supplied to input terminal 515 (FIG. 7), described above, is derived.

Pedestal clamp circuit 614 is controlled by an AND gate 621, this AND gate having one input which normally is conditioned by a binary "1" supplied thereto by a NOR gate 623, and another input which is supplied with a clamping pulse produced by clamping pulse generator 620. The clamping pulse generator is controlled by a sync tip clamping circuit 618, the latter having an input coupled to receive the luminance signal from noise filter 630, and a synchronizing separator circuit 619 having an input coupled to sync tip clamping circuit 618 and an output coupled to clamping pulse generator 620. Sync tip clamping circuit 618 is adapted to detect the synchronizing signal included in the luminance signal, and to clamp onto the detected synchronizing signal. The clamped signal, supplied from sync tip clamping circuit 618, has the horizontal synchronizing pulse separated therefrom by synchronizing signal separator 619. Clamp pulse generator 620 is adapted to generate a pulse signal in response to the horizontal synchronizing pulse which is separated by synchronizing separator circuit 619. The pulse generated by clamp pulse generator 620 is supplied through AND gate 621 to pedestal clamp circuit 614 so as to energize this circuit to clamp the received luminance signal to the proper pedestal level. It is appreciated that pedestal clamp circuit 614 thus is energized during the horizontal blanking interval so as to clamp the luminance signal to the pedestal level at the proper time, thereby enabling synchronizing separator 615 to separate the horizontal synchronizing pulse $S_h$.

The output of sync tip clamping circuit 618 additionally is coupled to a drop-out detector 622 which produces a binary "1" when drop-out is detected in the clamped signal produced at the output of the sync tip clamp. The output of drop-out detector 622 is coupled to one input of NOR gate 623, this NOR gate including another input which is coupled to an input terminal 602 to receive a drop-out pulse from, for example, drop-out detector 55 (FIG. 1).

The output of synchronizing separator circuit 619 also is fed back to sync tip clamping circuit 618 via a mis-clamp detector 624. The mis-clamp detector comprises, for example, a retriggerable monostable multivibrator whose time constant is equal to about 1.5H (1.5 times a horizontal line interval). Sync tip clamping circuit 618 includes an adjustable time constant which is controlled by mis-clamp detector 624. In the event that synchronizing separator circuit 619 fails to separate a horizontal synchronizing pulse from the clamped signal supplied thereto, mis-clamp detector 624 reduces the time constant of the sync tip clamping circuit to about one to several H so as to speed up its recovery time.

In operation, the incoming video signal which is played back by the VTR and which passes through input stage 56 is supplied to input terminal 601. Signal separator circuit 603 separates this video signal into its luminance component Y and into its chrominance component C. The luminance component Y is passed through noise filter 630, and vertical synchronizing separator 628 separates the usual vertical synchronizing pulses from the luminance component Y.

The luminance component additionally is supplied to pedestal clamp 614 and to sync tip clamping circuit 618. The sync tip clamping circuit normally clamps to the horizontal synchronizing pulse included in the luminance component Y, and the clamped signal is supplied to synchronizing separator 619. Accordingly, the horizontal synchronizing pulse $S_h$ is separated from the clamped signal, and this separated horizontal synchronizing pulse is supplied to clamp pulse generator 620 which, in turn, generates a clamping pulse in response to the horizontal synchronizing pulse, that is, during the horizontal blanking interval. AND gate 621 normally is conditioned to transmit this clamping pulse to pedestal clamp 614, whereby the luminance component Y is properly clamped to the pedestal level during the horizontal blanking interval. Hence, synchronizing separator 615 is enabled to separate the horizontal synchronizing pulse $S_h$ easily from the pedestal-clamped luminance component. This separated horizontal synchronizing pulse $S_h$ is supplied from synchronizing separator 615 to output terminal 617.

In addition, the separated horizontal synchronizing pulse $S_h$ is supplied to burst flag generator 625 which generates a burst flag pulse that is supplied to burst gate 605. The separated chrominance component C, after having its gain suitably adjusted by AGC circuit 604, has the burst signal $S_B$ included therein separated therefrom by burst gate 605. The separated burst signal $S_B$ then is filtered and amplified and supplied to output terminal 611. The burst signal also is level-detected for controlling the gain of AGC amplifier 604. In the absence of a burst signal, for example, when a black-and-white video signal is played back from the VTR, detector 609 applies a black-and-white signal to output terminal 610.

In the event that the horizontal synchronizing pulse included in the incoming video signal is dropped out, sync tip clamping circuit 618 will attempt to clamp onto a noise signal in the absence of the horizontal synchronizing pulse. Consequently, a synchronizing pulse $S_h$ will not be produced by synchronizing separator 619. This means that clamp pulse generator 620 will not generate a clamping pulse, and pedestal clamp circuit 614 will not be properly activated. Therefore, a horizontal synchronizing pulse $S_h$ will not be detected by synchronizing separator 615. Furthermore, since sync tip clamping circuit 618 attempts to clamp onto a noise signal, drop-out detector 622 detects that horizontal synchronizing pulse has dropped out and supplies a binary "1" to NOR gate 623. This binary "1" is inverted by the NOR gate so as to de-energize AND gate 621.

It is recalled that mis-clamp detector 624 is comprised of a retriggerable monostable multivibrator. Whenever a horizontal synchronizing pulse $S_h$ is produced by synchronizing separator 619, this monostable multivibrator is triggered so as to supply a binary "1" to sync tip clamping circuit 618. Accordingly, if a horizontal synchronizing pulse is detected during each horizontal blanking interval, a constant binary "1" is supplied to the sync tip clamping circuit. Now, when a horizontal synchronizing pulse is not detected by synchronizing separator 619, the monostable multivibrator included in mis-clamp detector 624 returns to its binary "0" state. This signal, when supplied to sync tip clamping circuit 618, speeds up its recovery time so as to accurately clamp onto the next horizontal synchronizing pulse which is supplied thereto from signal separator circuit 603. That is, in the event of a drop-out in the horizontal synchronizing pulse, sync tip clamping circuit 618 is rapidly prepared for another clamping operation so as to rapidly and accurately clamp onto the next horizontal synchronizing pulse following this drop-out.

Furthermore, in the event that drop-out detector 55 detects a dropped out condition, a binary "1" is supplied from input terminal 602 to NOR gate 623, whereupon the NOR gate disables AND gate 621. Thus, when drop-out detector 55 detects this dropped out condition, pedestal clamp circuit 614 and synchronizing separator circuit 615 are prevented from erroneously operating upon noise and, therefore, an erroneous horizontal synchronizing pulse is prevented from being supplied to output terminal 617. Thus, it is appreciated that AND gate 621 functions to prevent a pedestal clamping operation in the presence of a drop-out condition.

Change-over switch 616 includes a switch control input coupled to an input terminal 626 for receiving a SPECIAL control signal in the event that the VTR is operated in one of its special playback modes, e.g. slow motion, still or quick-motion. When such a SPECIAL playback mode is selected, change-over switch 616 connects the output of synchronizing separator 619 to output terminal 617 and, therefore, interrupts the connection of pedestal clamp circuit 614 and synchronizing separator circuit 615 to the output terminal. This insures a more accurate indication of the horizontal synchronizing pulse during these SPECIAL modes of operation.

WRITE CLOCK GENERATOR 63

Write clock generator 63 is formed of an automatic frequdncy control (AFC) section 63A and an automatic phase control (APC) section 63B. The AFC section is shown in block diagram form in FIG. 9, while the APC section is shown in block diagram form in FIG. 14. The purpose of the AFC section is to generate a high frequency timing signal which is frequency-synchronized with the incoming horizontal synchronizing pulse $S_h$ supplied to output terminal 617 by the synchronizing separator shown in FIG. 8.

Figure 9:
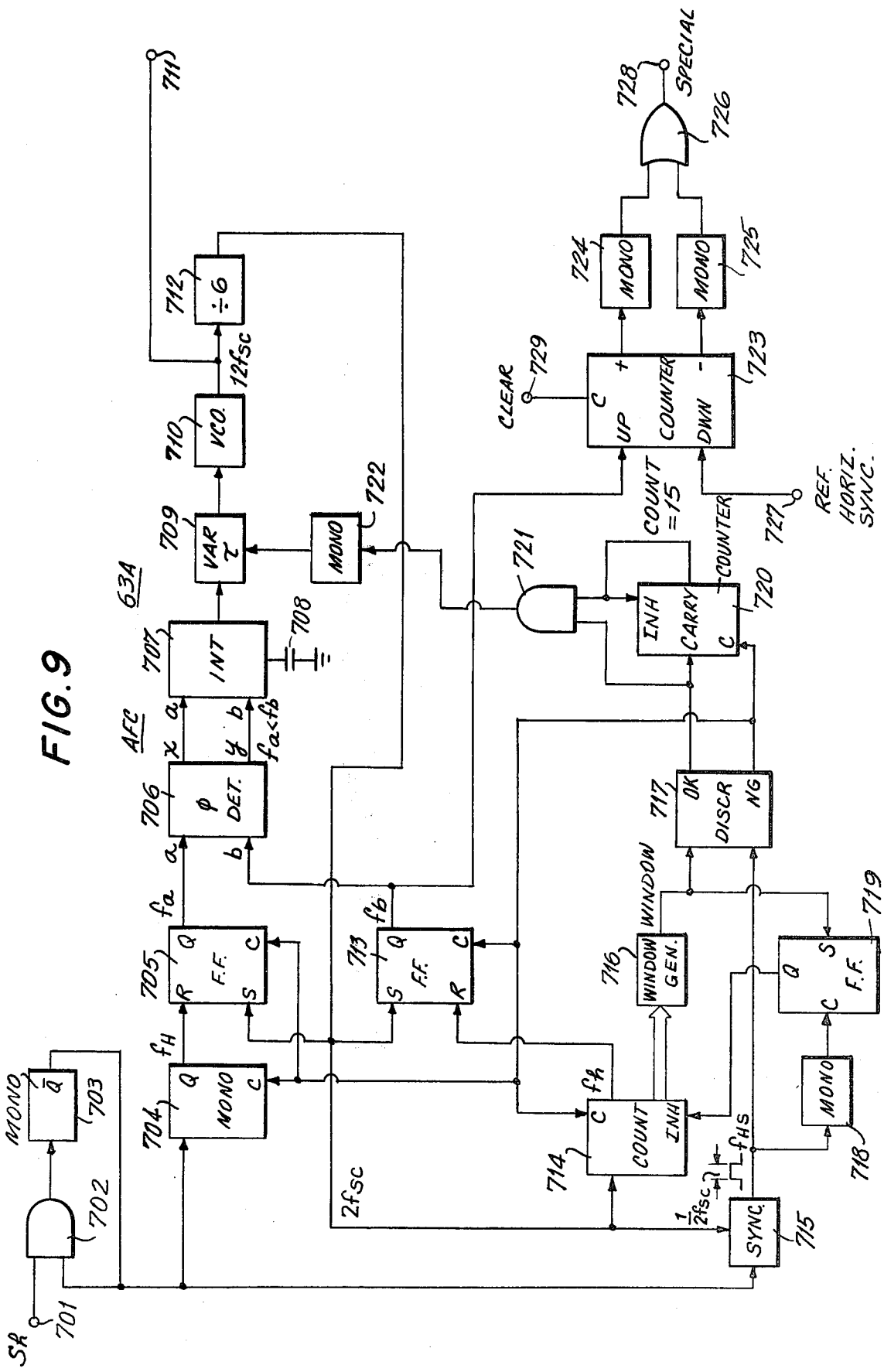
FIG. 9 is a block diagram of the automatic frequency control circuit incorporated into the write clock generator used in the illustrated time base error corrector.

The AFC section shown in FIG. 9 includes a monostable multivibrator 703, flip-flop circuit 705, phase detector 706, integrator 707, voltage-controlled oscillator (VCO) 710, counter 714, window generator 716, discriminator 717 and flip-flop circuit 719. Monostable multivibrator 703 has its input terminal coupled to an AND gate 702, the AND gate having one input coupled to an input terminal 701 for receiving the separated horizontal synchronizing pulse $S_h$, and its other input connected to the $\overline{Q}$ output of the monostable multivibrator. The purpose of this connection between AND gate 702 and monostable multivibrator 703 is to generate pulses which are triggered only in response to the horizontal synchronizing pulses and not in response to equalizing pulses. That is, the connection of AND gate 702 and monostable multivibrator 703 serves to eliminate, or filter out, the equalizing pulses which are included in the incoming video signal.

The output of monostable multivibrator 703 is coupled to a monostable multivibrator 704 whose Q output is, in turn, connected to the reset input R of flip-flop circuit 705. Monostable multivibrator 704 is adapted to produce a pulse signal $f_H$ of predetermined duration, in synchronism with the received horizontal synchronizing pulses $S_h$. Flip-flop circuit 705, which is reset and set in response to the negative transition in the signals applied to its reset input R and to its set input S, respectively, has its Q output connected to input a of phase detector 706.

VCO 710, which has a center frequency equal to about twelve times the chrominance subcarrier frequency, generates a high frequency timing pulse $12f_{sc}$, the frequency of this timing pulse being controlled by a control voltage applied to the VCO. The output of VCO 710 is coupled to a frequency divider 712 which serves to divide the frequency of the timing pulse by a factor of six. Hence, divider 712 produces a divided timing pulse $2f_{sc}$, and the output of this divider is connected to the set input S of flip-flop circuit 705. The output of divider 712 is further connected to counter 714, wherein the divided timing pulse $2f_{sc}$ is counted, and also to synchronizing circuit 715 which serves to produce a synchronized horizontal sync pulse $f_{HS}$. Still further, divided timing pulse $2f_{sc}$ also is coupled to the set input S of flip-flop circuit 713, the reset input R thereof being coupled to an output of counter 714.

The Q output of flip-flop circuit 713 generates a pulse signal $f_b$ which is applied to the b input of phase detector 706 whereat it is compared in phase to the pulse signal $f_a$ supplied to input a of the phase detector by flip-flop circuit 705. Phase detector 706 includes two outputs x and y, respectively. A signal whose pulse width is proportional to the phase difference between pulses $f_a$ and $f_b$ is produced at output x in the event that the frequency of pulses $f_a$ is greater than the frequency of pulses $f_b$. Similarly, a signal whose pulse width is proportional to the phase difference between pulses $f_a$ and $f_b$ is produced at output y in the event that the frequency of pulses $f_a$ is less than the frequency of pulses $f_b$. Outputs x and y are coupled to inputs a and b, respectively, of an integrator 707, the latter being provided with an integrating capacitor 708. The integrator is adapted to generate an output voltage which is proportional to the pulse width of the signal supplied either to its input a or to its input b. That is, the output of integrator 707 is a voltage which is proportional to the phase difference between pulses $f_a$ and $f_b$.

An adjustable time constant circuit 709 has its input coupled to the output of integrator 707 for receiving the phase difference voltage produced by the integrator. The adjustable time constant circuit includes a control input coupled to a monostable multivibrator 722 which functions to change the time constant of the adjustable time constant circuit in the event that VCO 710 is not frequency-locked to the incoming horizontal synchronizing pulse $S_h$. The output of adjustable time constant circuit 709 is applied as a control voltage to VCO 710. That is, the phase difference voltage produced by integrator 707 is supplied through the adjustable time constant circuit as the control voltage. It is appreciated that, depending upon the time constant of the adjustable time constant circuit, the oscillating frequency of VCO 710 will vary as the phase difference signal produced by integrator 707 varies, but this change in the VCO oscillating frequency will lag the change in the phase difference voltage by a delay determined by adjustable time constant circuit 709. The output of VCO 710 ($12f_{sc}$) is supplied to an output terminal 711 and is used in the APC section of the write clock generator.

As aforesaid, counter 714 is adapted to count the divided timing pulses $2f_{sc}$. When a predetermined number of these divided timing pulses is counted, counter 714 generates an output pulse $f_H$ which has a repetition frequency equal to the expected horizontal synchronizing frequency. This output pulse $f_H$ is applied to the reset input R of flip-flop circuit 713. In addition, the count of counter 714, which is a digital count, for example, a binary count, is supplied in parallel to window generator 716. The window generator comprises a decoding circuit for determining when the count of counter 714 is within a preset counting range from, for example, A to B. A window pulse is generated by window generator 716 when the count of counter 714 is within this range. The output of the window generator is coupled to discriminator 717 and, additionally, to the set input S of flip-flop circuit 719.

Discriminator 717 is adapted to sense when the horizontal synchronizing pulse $S_h$ included in the incoming video signal occurs within the window pulse generated by window generator 716. As will be appreciated, the window pulse generated by the window generator represents an approximate range within which the horizontal synchronizing pulse is expected. If the incoming horizontal synchronizing pulse does, in fact, occur within this range, then it also ocurs within the locking range of the illustrated AFC section. Discriminator 717 thus is adapted to determine whether the incoming horizontal synchronizing pulse falls within the locking, or pull-in range of the AFC section. Accordingly, another input of the discriminator is coupled to synchronizing circuit 715 and is adapted to receive the synchronized, or re-timed horizontal synchronizing pulse $f_{HS}$. Discriminator 717 includes a first output, designated as the OK output, which is provided with a binary "1" when the re-timed horizontal synchronizing pulse $f_{HS}$ falls within the window pulse generated by window generator 716. The discriminator also includes another output, designated as the NG output, which is provided with a binary "1" when the re-timed horizontal synchronizing pulse $f_{HS}$ falls outside of the window pulse. The OK output of the discriminator is coupled to one input of an AND gate 721 and, in addition, to an input of a counter 720. The NG output of the discriminator is coupled in common to the clear input C of each of monostable multivibrator 704, flip-flop circuits 705 and 713 and counter 714. Thus, when a binary "1" is provided at the NG output of discriminator 717, monostable multivibrator 704, flip-flop circuits 705 and 713 and counter 714 all are reset to their initial or quiescent states.

Counter 720 is adapted to detect when VCO 710 is synchronized to the incoming horizontal synchronizing pulse $S_h$. This synchronized condition is detected when a predetermined number of incoming horizontal synchronizing pulses fall within the window pulse generated by window generator 716. Thus, counter 720 is adapted to count each binary "1" provided at the OK output of discriminator 717 and to produce a counter output signal when a predetermined count has been reached. As a numerical example, it is assumed that the VCO 710 is synchronized with the incoming horizontal synchronizing pulse when fifteen successive horizontal synchronizing pulses fall within the window pulse produced by window generator 716. Accordingly, when the count of fifteen is reached thereby, counter 720 produces a carry output binary "1". This carry output is coupled to another input of AND gate 721 and, in addition, to an inhibit input of the counter so as to prevent the count of fifteen therein from being incremented further. The clear input C of counter 720 is coupled to the NG output of discriminator 717. Thus, counter 720 will be cleared, or reset to its initial count of, for example, zero, whenever an incoming horizontal synchronizing pulse $S_h$ occurs outside of the window pulse produced by window generator 716. Of course, once counter 720 is reset, another fifteen consecutive incoming horizontal synchronizing pulses must occur within the window pulse before it can be determined that VCO 710 is synchronized with the incoming horizontal synchronizing pulses.

The output of AND gate 721 is coupled to retriggerable monostable multivibrator 722. The retriggerable monostable multivibrator is coupled to adjustable time constant circuit 709 and is adapted to reduce the time constant of this circuit in the event that VCO 710 is not synchronized with the incoming horizontal synchronizing pulses. Accordingly, if the monostable multivibrator is triggered to its unstable state, the time constant exhibited by adjustable time constant circuit 709 is relatively high. This means that if the VCO is synchronized with the incoming horizontal synchronizing pulses, more than a mere transient disturbance is needed to interrupt this synchronized relation. However, once VCO 710 "falls out of sync", then monostable multivibrator 722 returns to its stable state, whereby the time constant of adjustable time constant circuit 709 is reduced so as to accelerate the lock-on time for the VCO. That is, VCO 710 follows changes in the output of integrator 707 more rapidly.

The illustrated AFC section also includes a monostable multivibrator 718 coupled to the output of synchronizing circuit 715, this monostable multivibrator circuit in turn being coupled to the clear input C of flip-flop circuit 719. The Q output of flip-flop circuit 719 is coupled to an inhibit input of counter 714. The combination of monostable multivibrator 718 and flip-flop circuit 719 functions to inhibit counter 714 from continuing its counting operation in the event that flip-flop circuit 719 is set. The set input of this flip-flop circuit is coupled to the output of window generator 716, whereby the flip-flop circuit is adapted to be set in response to the negative transition in the window pulse. Monostable multivibrator 718 is adapted to be triggered to its quasi-stable state in response to the negative transition of the synchronized horizontal synchronizing pulse $f_{HS}$, and when so triggered, flip-flop circuit 719 is cleared and, furthermore, is disabled from responding to a negative transition applied to its set input S while the monostable multivibrator is in its quasi-stable state.

The AFC section also includes a 4-bit counter 732, monostable multivibrator 724 and 725 and an OR gate 726, all adapted to produce a SPECIAL output signal when the VTR is operated in one of its SPECIAL playback modes. Counter 723 is an UP/DOWN counter having a count-up input coupled to the Q output of flip-flop circuit 713 so as to count pulses $f_b$, and a count-down input coupled to an input terminal 727 to receive a reference horizontal synchronizing pulse supplied thereto by synchronizing signal generator 66 (FIG. 1). Counter 723 additionally is provided with a clear input C coupled to an input terminal 729 to receive a clear signal which is constituted by a clock signal of a relatively low frequency. As an example, a clock pulse is applied to input terminal 729 every 0.5 seconds.

Counter 723 includes a positive carry output terminal coupled to monostable multivibrator 724 and a negative carry output terminal coupled to monostable multivibrator 725. These monostable multivibrators are of the retriggerable type, and both are coupled to respective inputs of OR gate 726. In the event that either of these monostable multivibrators is triggered, a binary "1" is supplied by OR gate 726 to output terminal 728 as the SPECIAL playback signal. Since counter 723 is a 4-bit counter, it exhibits a maximum count of sixteen. If the count of counter 723 exceeds this count in a positive direction, that is, if sixteen pulses $f_b$ are supplied for each reference horizontal synchronizing pulse, then monostable multivibrator 724 is triggered. On the other hand, if a negative count of sixteen is reached by counter 723, for example, if sixteen or more reference horizontal synchronizing pulses are supplied thereto for each pulse $f_b$, then monostable multivibrator 725 is triggered.

The operation of the AFC section shown in FIG. 9 now will be described with reference to the waveform diagrams of FIGS. 10-13. Horizontal synchronizing pulses $S_h$, which have been separated from the incoming video signal by synchronizing separator 72, are supplied to input terminal 701. These horizontal synchronizing pulses are shown in FIG. 10A, and as also shown therein, equalizing pulses may be present during, for example, the vertical blanking interval of the video signal. At each negative transition of a horizontal synchronizing pulse, AND gate 702 supplies a binary "0" to monostable multivibrator 703. When this "0" is produced, that is, at the negative transition in the output of AND gate 702, monostable multivibrator 703 is triggered to provide an output signal at its $\overline{Q}$ output having the waveform shown in FIG. 10B. Monostable multivibrator 703 remains in its unstable condition for a duration which is greater than one-half of a line interval, as shown. Then, the monostable multivibrator returns to its stable condition, as represented by the relatively higher output signal level in FIG. 10B, awaiting the next negative transition in the incoming horizontal synchronizing pulse. Since the time constant of the monostable multivibrator is greater than one-half of a line interval, it is seen that monostable multivibrator 703 is not responsive to incoming equalizing pulses. Thus, the monostable multivibrator serves to eliminate the effect of equalizing pulses from the incoming synchronizing signals.

The $\overline{Q}$ output of monostable multivibrator 703, as shown in FIG. 10B, is reproduced in FIG. 11A. The negative transition in this $\overline{Q}$ output triggers monostable multivibrator 704 to produce a pulse $f_H$, as shown in FIG. 11B. It is appreciated that pulse $f_H$ has a repetition rate equal to the horizontal synchronizing rate, and exhibits a positive transition in time-coincidence with the negative transition in the incoming horizontal synchronizing pulse. The negative transition of pulse $f_H$ resets flip-flop circuit 705 to produce the negative pulse $f_a$, as shown in FIG. 11G. Thus, pulse $f_a$ is produced at a predetermined time (i.e., the duration of pulse $f_H$) following the occurrence of an incoming horizontal synchronizing pulse $s_H$. Pulse $f_a$ is applied to input a of phase detector 706, and represents the time of occurrence of an incoming horizontal synchronizing pulse.

VCO 710 supplies timing pulses $12f_{sc}$ to frequency divider 712, the latter generating divided timing pulses $2f_{sc}$, as shown in FIG. 11C. These divided timing pulses are counted by counter 714 and, additionally, are used by synchronizing circuit 715 to produce a synchronized horizontal synchronizing pulse $f_{HS}$, as shown in FIG. 11D. The synchronized horizontal synchronizing pulse $f_{HS}$ is produced in response to the first negative transition in divided timing pulses $2f_{sc}$ following the occurrence of the horizontal synchronizing pulse $S_h$, and extends for a duration equal to one complete cycle of the divided timing pulse.

Counter 714 counts the divided timing pulses $2f_{sc}$ until a predetermined count is reached. When this predetermined count is attained, window generator 716 produces an output signal, i.e., the window pulse, as shown in FIG. 11E. This output signal is present until counter 714 reaches another, higher predetermined count, at which time the window pulse produced by window generator 716 terminates, as shown in FIG. 11E. It may be appreciated that the window pulse is present for a number of cycles of the divided timing pulse $2f_{sc}$, and normally recurs at a frequency equal to the horizontal synchronizing frequency. This window pulse is supplied to discriminator 717 to condition the discriminator to detect the horizontal synchronizing pulse $f_{HS}$.

In accordance with the example described herein, it is assumed that the incoming horizontal synchronizing pulse S$_h$ falls within the pull-in range of the illustrated AFC section. Consequently, the synchronized horizontal synchronizing pulse f$_{HS}$ is produced during the duration of the window pulse. This is shown by FIGS. 11D and 11E. Discriminator 717 detects the occurrence of the synchronized horizontal synchronizing pulse f$_{HS}$ during the duration of the window pulse to produce an output signal, for example, a binary "1" at its OK output. This means that a binary "0" is produced at the NG output of the discriminator and is supplied to the clear input C of each of monostable multivibrator 704, flip-flop circuits 705 and 713 and counter 714, having no effect thereon.

At some predetermined time following the termination of the window pulse, counter 714 is further incremented to yet another predetermined count, resulting in an output f$_h$ which is applied to the reset input of flip-flop circuit 713. As a consequence thereof, this flip-flop circuit is reset to supply the negative-going pulse f$_b$ to input b of phase detector 706, as shown in FIG. 11F. In the illustrated example, it is assumed that counter 714 reaches its predetermined count to produce pulse f$_h$ in advance of the termination of pulse f$_H$ by monostable multivibrator 704. Thus, as shown in FIGS. 11F and 11G, pulse f$_b$ leads pulse f$_a$ by some amount. Depending upon whether the frequency of pulses f$_a$ is greater than or less than the frequency of pulses f$_b$, an output pulse having a duration proportional to the phase differential between pulses f$_a$ and f$_b$ is provided either at output x or at output y of phase detector 706, as shown in FIG. 11H. This pulse duration is integrated by integrator 707, as shown by FIG. 11I, and the integrated voltage, which is an error voltage related to the phase differential between the timing pulses 12f$_{sc}$ and the incoming horizontal synchronizing pulse S$_h$, is supplied through adjustable timing circuit 709 to VCO 710. This control voltage adjusts the frequency of the VCO in a direction whereby the phase differential between pulses f$_a$ and f$_b$ is cancelled.

At the next negative transition in the divided timing pulses 2f$_{sc}$ following the resetting of flip-flop circuits 705 and 713, these flip-flop circuits are set, as shown in FIGS. 11G and 11F, respectively. The AFC section thus is prepared for a subsequent comparison of the timing of VCO 710 with the incoming horizontal synchronizing pulse. If the next horizontal synchronizing pulse S$_h$ falls within the pull-in range of the illustrated AFC section, that is, if the next horizontal synchronizing pulse occurs during the duration of the window pulse, another binary "1" is produced at the OK output of discriminator 717.

As each binary "1" is produced at the OK output of discriminator 717, it is counted by counter 720. When a count of, for example, fifteen is attained thereby, a binary "1" carry output is supplied to condition AND gate 721 to transmit to monostable multivibrator 722 the binary "1" which is produced at the OK output of discriminator 717. At the same time, this carry output inhibits counter 720 from being incremented further. AND gate 721 now is energized to trigger monostable multivibrator 722. The monostable multivibrator, when in its triggered or quasistable state, increases the time constant of adjustable time constant circuit 709. This means that transient variations in the error voltage produced by integrator 707 will not pass through the time constant circuit and, therefore, will not disturb the synchronized condition of VCO 710.

Monostable multivibrator 722 is retriggerable and has a time constant of about 150H. This means that if, because of an abrupt time base error, an incoming horizontal synchronizing pulse S$_h$ does not occur during the generated window pulse, resulting in a binary "1" at the NG output of discriminator 717, and further resulting in clearing counter 720, the time constant of adjustable time constant circuit 709 nevertheless remains at its relatively higher value for a duration of 150 line intervals. Consequently, the AFC section is provided with 150 line intervals in which to synchronize VCO 710 with the incoming horizontal synchronizing pulses. That is, during this 150 line interval, fifteen successive horizontal synchronizing pulses must occur during fifteen window pulses in order to retrigger monostable multivibrator 722. If resynchronization cannot be attained during this 150 line interval, the time constant of adjustable time constant circuit 709 is reduced to enable VCO 710 to follow rapidly changes in the error voltage produced by integrator 707.

Let it be assumed that the incoming horizontal synchronizing pulse S$_h$ occurs in advance of the window pulse, wherein pulse f$_H$ (FIG. 12B), which is initiated upon the occurrence of the incoming horizontal synchronizing pulse, precedes the expected window pulse shown in broken lines in FIG. 12E. At the first negative transition in the divided timing pulses 2f$_{sc}$ following pulse f$_H$, synchronizing circuit 715 generates the synchronized horizontal synchronizing pulse f$_{HS}$, as shown in FIG. 12D. This synchronized horizontal synchronizing pulse is detected by discriminator 717 as occurring prior to the occurrence of the expected window pulse whereupon the discriminator generates a binary "1" pulse output at its NG output, as shown in FIG. 12F. This pulse output from discriminator 717 clears monostable multivibrator 704, as shown by the negative transition in pulse f$_H$ in FIG. 12B, and also clears flip-flop circuit 705 to reset this flip-flop circuit, whereby pulse f$_a$ is produced, as shown in FIG. 12G. Furthermore, the NG pulse produced by discriminator 717 clears flip-flop circuit 713, whereby pulse f$_b$ (FIG. 12H) is produced, and also clears counter 714 to reset the count thereof to an initial value.

Since flip-flop circuits 705 and 713 are cleared substantially simultaneously, pulses f$_a$ and f$_b$ are initiated at the same time. Thus, phase detector 706 detects no phase differential between the pulses f$_a$ and f$_b$; and integrator 707 does not change the value of the integrated error signal produced thereby. Consequently, the frequency of VCO 710 is not disturbed. This is preferred wherein, as in the present example, the incoming horizontal synchronizing pulse is in advance of the window pulse and thus occurs outside the pull-in range of the AFC section.

Flip-flop circuits 705 and 713 remain cleared, or reset, for the duration of the NG pulse (FIG. 12F). After the termination of this NG pulse, flip-flop circuits 705 and 713 are returned to their set conditions in response to the first negative transition in the divided timing pulse 2f$_{sc}$, as shown in FIGS. 12G and 12H, respectively.

Figure 13A:
Figure 13C:
Figure 13D:
Figure 13E:

If the incoming horizontal synchronizing pulse S$_h$ occurs at a time following the window pulse, as represented by the waveforms of FIG. 13, synchronized horizontal synchronizing pulse f$_{HS}$ (FIG. 13D) is applied to discriminator 717 subsequent to the termination of the window pulse (FIG. 13E). Here again, discriminator 717 produces the NG pulse (FIG. 13G) which clears monostable multivibrator 704 so as to terminate pulse $f_H$ (FIG. 13B), and also clears flip-flop circuits 705 and 713 so as to initiate pulses $f_a$ and $f_b$ (FIGS. 13H and 13I). In addition, the NG pulse produced by discriminator 717 clears counter 714 to an initial count. At the completion of the NG pulse, flip-flop circuits 705 and 713 are enabled to respond to the next negative transition in the divided timing pulse $2f_{sc}$ to be set thereby, as shown in FIGS. 13H and 13I. Since pulses $f_a$ and $f_b$ are produced by the NG pulse in time coincidence, phase detector 706 does not detect any phase differential therebetween, and integrator 707 does not alter the integrated error signal supplied thereby to VCO 710.

Figure 13F:
Figure 13G:
Figure 13H:
Figure 13I:
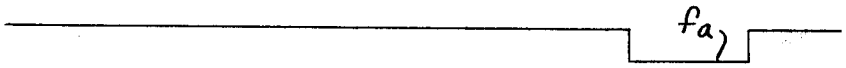

If the window pulse is produced prior to the occurrence of the incoming horizontal synchronizing pulse $S_h$, it is preferred to prevent the count of counter 714 from being further incremented until it can be cleared by the NG pulse. This prevents pulse $f_h$ from being produced by counter 714, which pulse could reset flip-flop circuit 713 prior to the clearing thereof by the NG pulse. It is appreciated that if pulse $f_h$ is inhibited, then it would not be possible for pulse $f_b$ to occur in phase advance of pulse $f_a$, thus avoiding a false phase differential in pulses $f_a$ and $f_b$ from being supplied to phase detector 706. To this effect, the negative transition in the window pulse is supplied to flip-flop circuit 719 so as to set this flip-flop circuit, as shown in FIG. 13F. Once set, flip-flop circuit 719 inhibits counter 714 from further incrementing its count. When synchronized horizontal synchronizing pulse $f_{HS}$ is initiated, monostable multivibrator 718 is triggered so as to clear, or reset, flip-flop circuit 719, as shown in FIG. 13F. It is seen that at the time that flip-flop circuit 719 is cleared, the NG pulse is produced by discriminator 717 to clear counter 714.

Thus, the frequency of VCO 710 is not disturbed in the event that the incoming horizontal synchronizing pulse $S_h$ occurs at some time outside of the window pulse produced by window generator 716, i.e., outside the pull-in range of the AFC section.

Although flip-flop circuit 719 is effective to inhibit counter 714 in response to the negative transition in the window pulse when the incoming horizontal synchronizing pulse $S_h$ occurs at some time following the window pulse, this flip-flop circuit is not so triggered in the event that the horizontal synchronizing pulse occurs during the duration of the window pulse. Referring to FIG. 11D, when synchronized horizontal synchronizing pulse $f_{HS}$ is produced, monostable multivibrator 718 is triggered. This monostable multivibrator has a time constant which is greater than the duration of the window pulse. Hence, even if the synchronized horizontal synchronizing pulse $f_{HS}$ is produced at about the same time that the window pulse is produced, monostable multivibrator 718 nevertheless will maintain flip-flop circuit 719 in its cleared state even when the window pulse terminates, as shown in FIG. 11E. This inhibits the flip-flop circuit from being set in response to the negative transition in the window pulse. Consequently, flip-flop circuit 719 is prevented from applying an inhibit signal to counter 714 when the incoming horizontal synchronizing pulse $S_h$ occurs within the duration of the window pulse.

It should be appreciated that if the incoming horizontal synchronizing pulse occurs in advance of the expected window pulse, as shown by the waveforms of FIGS. 12A–12H, then it is not necessary to inhibit flip-flop circuit 719 from being set in response to the negative transition in the window pulse. This is because discriminator 717 applies the NG pulse to clear counter 714 before the counter has had sufficient time to reach the predetermined count which initiates the window pulse. Since the counter is cleared, the window pulse never is produced.

Thus, it is seen that when VCO 710 is in substantial synchronization with the incoming horizontal synchronizing pulse $S_h$, that is, when this horizontal synchronizing pulse occurs during the duration of the window pulse, an OK pulse is produced by discriminator 717. After a predetermined number of OK pulses are produced, for example, fifteen OK pulses, counter 720 enables AND gate 721 to gate the OK pulse to monostable multivibrator 722, whereupon the time constant of adjustable time constant circuit 709 is increased. This prevents the synchronized VCO from losing synchronization in response to transient disturbances, such as drop-out, guardband noise, and the like. That is, it is relatively more difficult for VCO 710 to become unlocked once this synchronized condition is attained.

Figure 14:
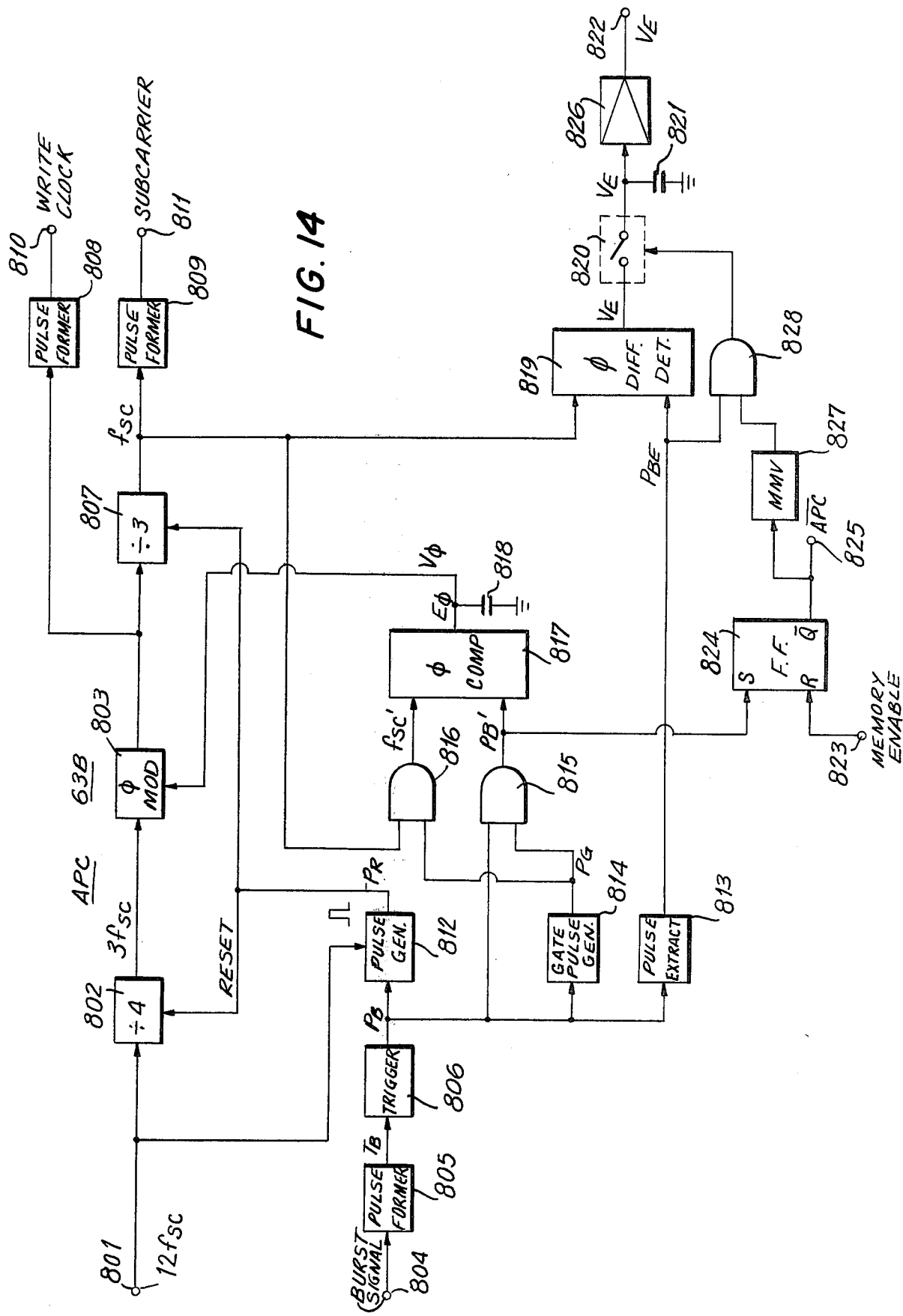
FIG. 14 is a block diagram of the automatic phase control circuitry incorporated into the write clock generator used in the illustrated time base error corrector.

The synchronized timing pulses $12f_{sc}$ produced by VCO 710 and applied to output terminal 711 of the AFC section are supplied to an input terminal 801 of APC section 63B which is illustrated in FIG. 14. The APC section includes a frequency divider 802, a phase modulator 803, another frequency divider 807, a pulse former 805, a trigger circuit 806, a gate pulase generator 814, AND gates 815 and 816 and a phase comparator 817. Frequency divider 802 is coupled to input terminal 801 and is adapted to divide the frequency of timing pulses $12f_{sc}$ by a factor of four. The output of divider 802 is coupled to phase modulator 803, this phase modulator being responsive to a control signal, such as a control voltage, applied thereto, for modulating the phase of divided timing pulses $3f_{sc}$. The output of phase modulator 803 is coupled to frequency divider 807 which is adapted to divide the frequency of the phase-modulated timing pulses by a factor of three. The output of divider 807 is coupled to a pulse forming circuit 809, which serves to shape the pulses $f_{sc}$, and also to AND gate 816.

Pulse forming circuit 805 is coupled to an input terminal 804 and is adapted to receive the burst signal $S_B$ separated from the incoming video signal by synchronizing separator 72 (FIG. 1) and to generate a trigger pulse $T_B$ in response to the received burst signal. The output of pulse forming circuit 805 is coupled to trigger circuit 806 which is responsive to trigger pulse $T_B$ to pass the received burst signal. The output of the trigger circuit is coupled to gate pulse generator 814 and, in addition, to an input of AND gate 815. Furthermore, the output of the trigger circuit also is coupled to a pulse generator 812, the latter having an input coupled to input terminal 801 for receiving the timing pulses $12f_{sc}$ and being adapted to generate a reset pulse $P_R$ having a duration equal to the duration of a timing pulse in response to a burst pulse which passes through trigger circuit 806. Pulse generator 812 has its output coupled in common to frequency dividers 802 and 807 to reset these frequency dividers.

Gate pulse generator 814 may include a monostable multivibrator and is adapted to generate a gating pulse of predetermined duration in response to the completion of one cycle of the burst pulses supplied thereto by trigger circuit 806. The output of the gate pulse generator is connected in common to AND gates 815 and 816 and serves to condition these AND gates to gate the respective signals which are supplied thereto by trigger circuit 806 and by frequency divider 807. AND gates 815 and 816 gate pulse signals to phase comparator 817 which is adapted to determine the phase differential between these gated pulses. A pulse signal $E_\phi$ having a pulse width determined by the phase differential between the pulses supplied to the phase comparator is generated thereby, this pulse width signal being integrated by an integrating capacitor 818. The output of capacitor 818 is coupled as a phase modulating voltage $V_\phi$ to phase modulator 803.

The output of AND gate 815 additionally is coupled to the set input S of a flip-flop circuit 824. This flip-flop circuit has its reset input R coupled to an input terminal 823 to receive a MEMORY ENABLE signal produced by control unit 67 (FIG. 1). Whenever this flip-flop circuit admits of its reset state, the $\overline{Q}$ output thereof generates a signal which is supplied to an output terminal 825 as a $\overline{APC}$ signal. As will be explained below, the $\overline{APC}$ signal represents that an automatic phase control operation cannot be attained, that is, the divided timing pulses $3f_{sc}$ cannot be phase-locked to the incoming burst signal.

The operation of the APC section, thus far described, now will be explained with reference to the waveform diagrams shown in FIGS. 15A–15K. The timing pulses $12f_{sc}$ produced by VCO 710 (FIG. 9) are supplied to input terminal 801 and are divided by frequency divider 802, phase modulated by phase modulator 803 and further divided by frequency divider 807 to produce divided, phase-modulated pulses $f_{sc}$ of a frequency equal to the frequency of the incoming burst signal (i.e., 3.58 MHz).

Figure 15A:
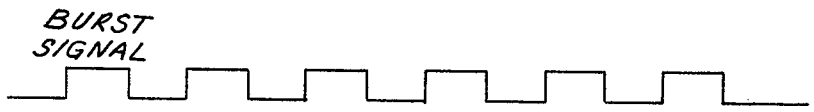
FIGS. 15A–15K are timing waveforms which are useful in understanding the operation of the circuit shown in FIG. 14.
Figure 15B:
Figure 15C:
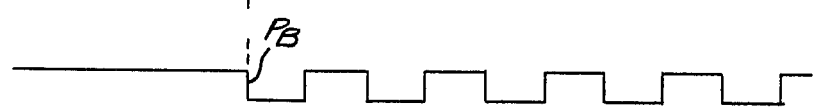
Figure 15D:

The incoming burst signal $S_B$, which is separated from the incoming video signal by synchronizing separator 72 (FIG. 1) is as shown in FIG. 15A. As is conventional, the received burst signal consists of a few cycles, for example, about eight cycles in the NTSC system, of the chrominance subcarrier superimposed onto the back porch of each horizontal synchronizing signal. Thus, as shown in FIG. 15A, the received burst signal is a repetitive signal which occurs for a limited duration during each horizontal line interval. Pulse forming circuit 805 is responsive to the first negative transition in the received burst signal to generate a trigger pulse $T_B$, as shown in FIG. 15B. The pulse forming circuit may comprise a triggerable flip-flop circuit and gating circuit so as to produce only a single trigger pulse $T_B$ having a duration equal to the period of the burst signal during each horizontal line interval. Trigger pulse $T_B$ triggers, or "turns on" trigger circuit 806 at the occurrence of the negative transition therein, thereby enabling trigger circuit 806 to pass the remainder of the received burst signal therethrough. Accordingly, trigger circuit 806 supplies burst pulses $P_B$, shown in FIG. 15C, to pulse generator 812, gate pulse generator 814 and AND gate 815.

The negative transition at the conclusion of the first complete cycle of the burst pulses $P_B$ is used in pulse generator 812 to gate a timing pulse $12f_{sc}$ to frequency dividers 802 and 807 as a reset pulse $P_R$ (FIG. 15D) therefor. This serves to reset the frequency dividers.

Figure 15E:
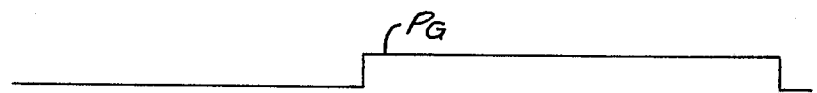
Figure 15F:
Figure 15G:
Figure 15H:
Figure 15I:
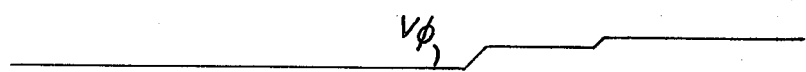
Figure 15J:
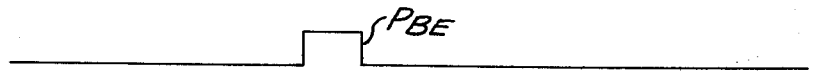

Gate pulse generator 814 is responsive to the negative transition at the conclusion of the first full cycle of burst pulses $P_B$ to generate the gate pulse $P_G$ shown in FIG. 15E. The gate pulse $P_G$ conditions AND gates 815 and 816 to gate burst pulses $P_B$ and pulses $f_{sc}$ to phase comparator 817. The gated burst pulses $P_B'$, shown in FIG. 15F, are assumed herein to lag the gated pulses $f_{sc}'$, the latter pulses being derived from pulses $f_{sc}$, shown in FIG. 15K. Phase comparator 817 detects this phase lagging relationship between gated burst pulses $P_B'$ and gated pulses $f_{sc}'$ to produce an output error pulse $E_\phi$ (FIG. 15H) whose duration is representative of this phase lagging relation. This error pulse $E_\phi$ produced by phase comparator 817 is integrated by integrating capacitor 818 to form an error voltage $V_\phi$ (FIG. 15I) which is used as a phase modulating control voltage by phase modulator 803. It is appreciated that, in the illustrated example, phase modulating voltage $V_\phi$ delays the phase of pulses $3f_{sc}$ produced by frequency divider 802 so as to reduce the phase differential between gated burst pulses $P_B'$ (FIG. 15F) and gated pulses $f_{sc}'$ (FIG. 15G). Phase control voltage $V_\phi$ continues to vary until the output of frequency divider 807 (FIG. 15K) is phase-locked to the received burst signal (FIG. 15A). At that time, the output of phase comparator 817 is zero, and a constant voltage $V_\phi$ is maintained across integrating capacitor 818.

Thus, pulses $f_{sc}$ are seen to be frequency-locked to the incoming horizontal synchronizing pulse $S_h$ and phase-locked to the incoming burst signal $S_B$. These synchronized pulses $f_{sc}$ are supplied through a pulse forming circuit 809 to an output terminal 811 as a SUBCARRIER signal to be utilized by control unit 67, as described in greater detail with respect to FIG. 19. Also, it is appreciated that the output of phase modulator 803 is frequency- and phase-locked to the incoming horizontal and burst signals, respectively. The output of this phase modulator is shaped by a pulse forming circuit 808 and is supplied to an output terminal 810 for use as the write clock pulses by main memory 59, as described above with respect to FIG. 4.

During normal operation of the write clock generator and of control unit 67, a MEMORY ENABLE signal is produced, followed by gated burst pulses $P_B'$, followed by a WRITE START signal. The MEMORY ENABLE signal resets flip-flop circuit 824 to supply the $\overline{APC}$ signal to output terminal 825. However, prior to the occurrence of the WRITE START signal, a gated burst pulse $P_B'$ sets the flip-flop circuit to terminate the $\overline{APC}$ signal. In the event of, for example, drop-out wherein the burst signal is not supplied to input terminal 804, gated burst pulses $\underline{P_B'}$ do not set flip-flop circuit 824 and, therefore, the $\overline{APC}$ signal remains at the time that the WRITE CLOCK signal is produced. Therefore, and with respect to FIG. 3, if an APC operation cannot be performed, the $\overline{APC}$ signal is supplied to input terminal 321 and is written into an addressed one of memory units $MD_0$–$MD_3$ when the write clock pulses are supplied to a corresponding input terminal 331–334.

FIG. 14 also illustrates the velocity error signal generator, which is comprised of a phase difference detector 819, a sample-and-hold circuit formed of sampling switch 820 and holding capacitor 821, an output amplifier 826 and a sampling control circuit formed of monostable multivibrator 827 and AND gate 828. Phase difference detector 819 has one input coupled to receive pulses $f_{sc}$ and another input coupled to a pulse extracting circuit 813. The pulse extracting circuit, which may comprise a gating circuit including a flip-flop circuit, is adapted to extract a single burst pulse $P_{BE}$ which passes through trigger circuit 806 to the phase difference detector and, in addition, is supplied through AND gate 828 for use as the sampling signal to close sampling switch 820. The output of sampling switch 820 is coupled to capacitor 821 which, in turn, is coupled through output amplifier 826 to an output terminal 822.

Monostable multivibrator 827 has its input connected to the $\bar{Q}$ output of flip-flop circuit 824 and is adapted to be triggered to its quasi-stable state in response to the $\overline{APC}$ signal. This monostable multivibrator has a time constant that is greater than the delayed time at which the extracted burst pulse $P_{BE}$ follows the MEMORY ENABLE signal. The output of monostable multivibrator 827 is applied to AND gate 828 as an enabling signal therefor. In the absence of this enabling signal due to drop-out of the synchronizing information portion of the video signal, the extracted burst pulse $P_{BE}$ is not supplied to close sampling switch 820.

Figure 15K:

In operation, the phase of extracted burst pulse $P_{BE}$ (FIG. 15J) is compared to the phase of a corresponding pulse $f_{sc}$ (FIG. 15K). It is appreciated that, since the extracted burst pulse $P_{BE}$ occurs just prior to reset pulse $P_R$, dividers 802 and 807 are not yet reset. This means that the phase of pulse $f_{sc}$ is locked to the phase of the burst signal which had been received during the preceding line interval; but the phase of the extracted burst pulse $P_{BE}$ represents the phase of the presently received burst signal. Therefore, any phase difference between extracted burst pulse $P_{BE}$ and pulse $f_{sc}$ represents the phase drift of the incoming video signal over the entire preceding line interval. It is recalled that this phase difference represents the velocity error of the incoming video signal.

Phase difference detector 819 detects this phase difference between extracted burst pulse $P_{BE}$ and pulse $f_{sc}$ to produce a corresponding velocity error voltage $V_E$. This velocity error voltage is sampled by sampling switch 820, stored across capacitor 821, and supplied to output terminal 822 from which it is transmitted to velocity error memory 64 (FIG. 1).

In the event that drop-out occurs during the synchronizing information portion of a line of video signals, such that the burst signal is not supplied to input terminal 804, it is appreciated that the velocity error for the immediately preceding line as well as the velocity error for the line now being received cannot be detected. For example, assuming that the last line for which a velocity error signal $V_E$ is line LA, the next following line is LB and the third line in succession is LC, then if drop-out occurs during the synchronizing information portion of line LC, velocity error for line LB as well as for line LC cannot be detected. In accordance with an advantageous feature of this invention, the velocity error signal $V_E$ which had been derived for line LA also is used for lines LB and LC. That is, the last-derived velocity error signal is used for velocity error compensation for three successive line intervals. Sampling switch 820 is inhibited from changing the velocity error signal $V_E$ derived for line LA and stored across capacitor 821 until an accurate velocity error can be detected (i.e., until line LD is received).

The manner in which sampling switch 820 is controlled now will be described with reference to the waveforms shown in FIGS. 16A-16E. The MEMORY ENABLE signal applied to input terminal 823 is shown in FIG. 16A. This MEMORY ENABLE signal resets flip-flop circuit 824 to produce the $\overline{APC}$ signal shown in FIG. 16B, whereupon the positive transition in the $\overline{APC}$ signal triggers monostable multivibrator 823 to its quasi-stable state (FIG. 16C) for enabling AND gate 828. As mentioned above, and as can be seen from FIGS. 15F and 15J, the extracted burst pulse $P_{BE}$ (shown also in FIG. 16D) precedes the gated burst pulses $P_B'$ and is transmitted through AND gate 828 as a sampling pulse (FIG. 16E) before flip-flop circuit 824 is set. FIG. 16B illustrates the termination of the $\overline{APC}$ signal in response to the gated burst pulses, but this does not affect the enabling signal (FIG. 16C) supplied to the AND gate by monostable multivibrator 827. Thus, the velocity error voltage $V_E$ associated with the immediately preceding line (for example, line LA) is sampled and stored for velocity error compensation when line LA subsequently is read out from main memory 59.

It is appreciated that the extracted burst pulse $P_{BE}$ shown in FIG. 16D, although derived from the synchronizing information portion of line LB, is used to detect the velocity error in line LA. Let it now be assumed that, because of drop-out in the synchronizing information portion in the next following line LC, a burst pulse $P_{BE}$ cannot be extracted. This "missing" burst pulse is represented by the encircled pulse $P_{BE}$ in FIG. 16D. Furthermore, because of this drop-out, gated burst pulses $P_B'$ are not produced to set flip-flop circuit 824 and, therefore, the $\overline{APC}$ signal (FIG. 16B) is not terminated. Since burst pulse $P_{BE}$ is missing, a sampling pulse is not applied to sampling switch 820 at this time and, consequently, the velocity error of the immediately preceding line is not detected. Capacitor 821 continues to store the velocity error voltage derived from line LA.

If it is assumed that no drop-out occurs during the synchronizing information portion of line LD, then a burst pulse $P_{BE}$ will be extracted, and also, gated burst pulses $P_B'$ will be produced to set flip-flop circuit 824 and terminate the $\overline{APC}$ signal (FIG. 16B). However, since the enabling signal is produced by monostable multivibrator 827 only in response to the commencement of the $\overline{APC}$ signal, no enabling signal is applied to AND gate 828 at the time that the burst pulse $P_{BE}$ associated with line LD is extracted. Consequently, once again a sampling pulse is not applied to sampling switch 820; and the velocity error of the preceding line interval LC is not detected. The velocity error voltage derived from line LA still is stored across capacitor 821, this voltage being used for velocity error compensation for the three consecutive lines LA, LB and LC.

It is further assumed that no drop-out occurs during the synchronizing information portion of the next following line LE. Thus, a burst pulse $P_{BE}$ will be extracted and gated burst pulses $P'_B$ will be produced. This means that the velocity error of the preceding line LD can be detected; and sampling switch 820 is operated to sample the velocity error voltage $V_E$ derived for line LD. This new velocity error voltage is stored across capacitor 821 in place of the previously stored velocity error voltage which had been derived from line LA.

Velocity Error Memory 64

Figure 17:
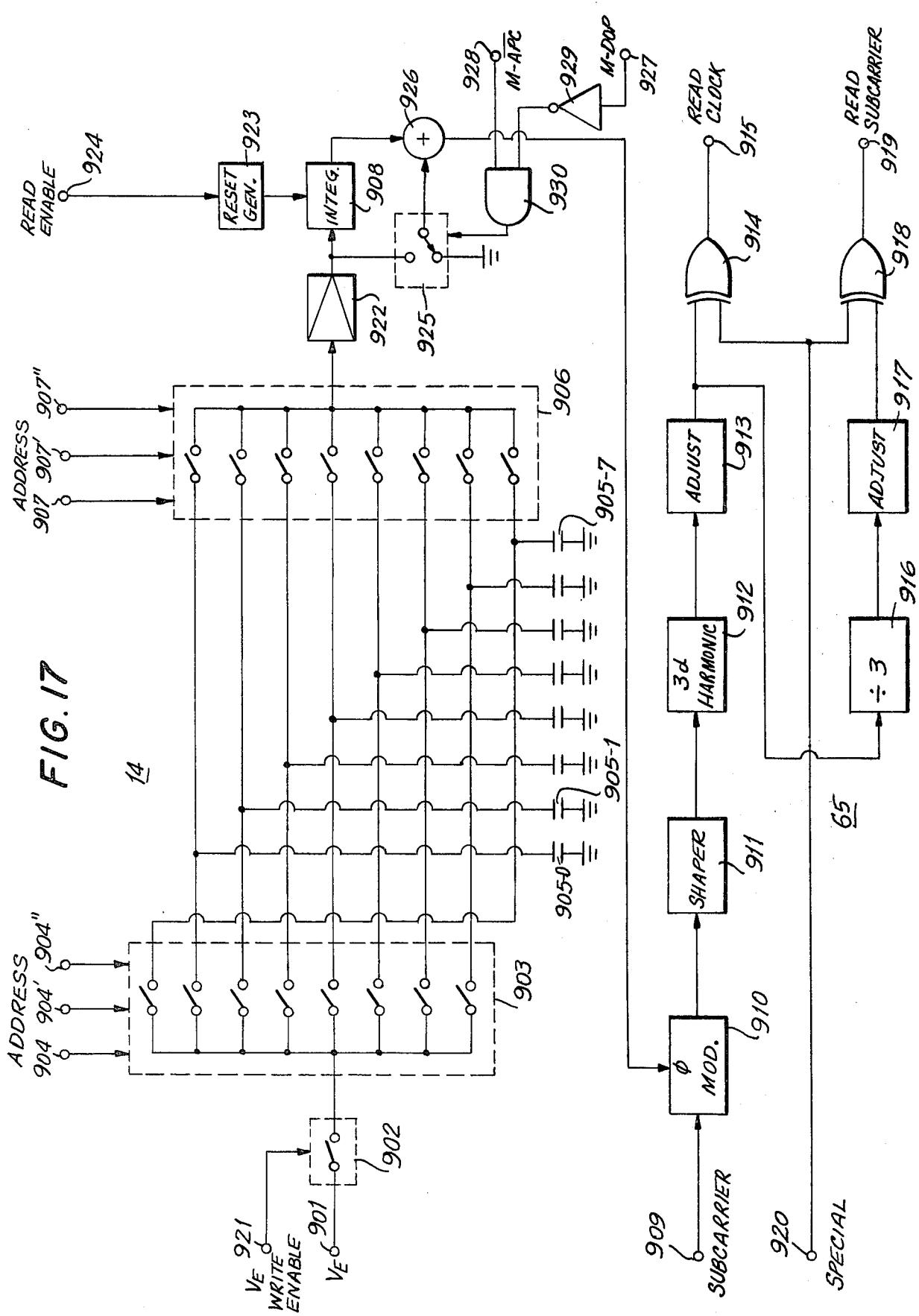
FIG. 17 is a block diagram of the velocity error memory, velocity error compensator and read clock generator which are used in the illustrated time base error corrector.

The velocity error signal $V_E$, produced at output terminal 822 in FIG. 14, is supplied to the velocity error memory shown in FIG. 17. The velocity error memory is comprised of a plurality of capacitors 905-0, 905-1, . . . 905-7, a write-in circuit 903 and a read-out circuit 906. It is recalled that, in main memory 59, described in detail with respect to FIG. 3, each memory unit $M_0$-$M_3$ is capable of storing two lines of video signals. Thus, a total of eight lines of video signals can be stored. Each of capacitors 905-0 to 905-7 to adapted to store a velocity error signal $V_E$ which is associated with the line of video signals that is stored in a corresponding portion of memory units $M_0-M_3$. For example, capacitor 905-0 may be adapted to store the velocity error signal which is associated with the line of video signals that in stored in the first section of memory unit $M_0$ (such as an odd line), while capacitor 905-1 may be adapted to store the velocity error signal which is associated with the line of video signals that is stored in the second section of memory unit $M_0$ (such as an even line). Similarly, capacitor 905-2 may be adapted to store the velocity error signal which is associated with the line of video signals that is stored in the first section of memory unit $M_1$, while capacitor 905-3 may be adapted to store the velocity error signal which is associated with the line of video signals that is stored in the second section of memory unit $M_1$. The remaining capacitors are similarly related to memory units $M_2$ and $M_3$.

An input terminal 901 is adapted to be supplied with the velocity error signal $V_E$ produced at output terminal 822 of the velocity error signal generator shown in FIG. 14. Input terminal 901 is coupled via switch 902 to write-in circuit 903. Switch 902 includes a control input coupled to input terminal 921 for receiving a velocity error WRITE ENABLE signal which is generated by control unit 57 (FIG. 1).

Write-in circuit 903 is diagrammatically represented herein as a plurality of switches, each switch being adapted to be closed in response to a respective 3-bit address supplied to the write-in circuit. Accordingly, write address inputs 904, 904' and 904" are provided to receive the 3-bit write-in address which is produced by control unit 57. Depending upon the particular address that is produced, a corresponding one of the write-in switches is closed. It is recalled that the velocity error signal $V_E$ is produced at the end of a line of video signals (or, more accurately, at the beginning of the next line of video signals). Accordingly, the capacitor that is selected by the write-in address which is supplied to address terminals 904, 904' and 904" actually is the capacitor that, during a read-out operation, is associated with the preceding line. For example, when line LB is received, the velocity error signal for preceding line LA is produced, and write-in circuit 903 selects the capacitor that is associated with line LA. This insures that the velocity error signal which is received at input terminal 901 is stored in the correct capacitor associated with the line of video signals which had just been received and which already has been written into the main memory.

Read-out circuit 906 is diagramatically represented as being similar to write-in circuit 903 and is shown as being comprised of a plurality of switches, each being coupled to a respective capacitor 904-0 to 904-7, and each being adapted to be closed in response to a particular 3-bit read-out address which is supplied to read address terminals 907, 907' and 907". This read-out address is generated by control unit 57 and also is supplied to main memory 59 for reading out the stored picture elements therefrom.

The velocity error of a line of video signals may be approximated by a linear function. That is, the velocity error may be assumed to increase linearly from a zero error at the beginning of the line to a maximum error at the end of the line. Since the velocity error signals $V_E$ stored in capacitors 905-0 to 905-7 are DC levels, this linear relationship may be approximated by integrating each velocity error signal that is read out of an addressed capacitor. In this regard, the output of read-out circuit 906 is coupled to an integrator 908 via a buffer amplifier 922. The output of integrator 908 is supplied through an adder 926 to read clock generator 65, to be described. Integrator 908 is a resettable integrator and includes a reset input connected to a reset generator 923, the latter being adapted to generate a reset pulse in response to a READ ENABLE signal applied thereto from an input terminal 924. This READ ENABLE signal is produced by control unit 57.

When a line of digitized picture elements is read out of an addressed memory unit in main memory 59, the velocity error signal $V_E$ stored across an associated capicitor 905-0 to 905-7 is read out by read out circuit 906. At the same time, the READ ENABLE signal is supplied to reset generator 923, whereupon integrator 908 is reset to an initial condition. It may be assumed that this initial condition corresponds to a zero voltage. Then, the read out velocity error signal $V_E$ is supplied to integrator 908 and is integrated thereby. The voltage level of this integrated signal increases linearly from the initial (or zero) level toward the maximum level which is equal to the DC velocity error voltage. This linearly increasing, integrated voltage is supplied to read clock generator 65 and is used for phase-modifying the chrominance subcarrier which is generated by synchronizing signal generator 66. When the next line of digitized picture elements is read out of the main memory, another reset pulse is generated to reset integrator 908, and the velocity error signal $V_E$, which is associated with the read out line, is read out of a corresponding capacitor 905-0 to 905-7 and is integrated by the integrator.

Change-over switch 925, AND gate 930 and inverter 929 are provided to adjust the integrated velocity error signal in the event that drop-out occurs during the synchronizing information portion of a line of video signals. Change-over switch 925 includes one input connected to the output of amplifier 922 for receiving the read out velocity error signal $V_E$ and another input connected to a reference potential, such as ground. The output of this change-over switch is coupled to adder 926. AND gate 930 includes one input connected to an input terminal 928 for receiving the M-$\overline{APC}$ signal which may be read out of an addressed memory unit $MD_0-MD_3$ of drop-out condition memory 58, and another input connected via inverter 929 to an input terminal 927 for receiving the M-DOP signal which also may be read out of an addressed memory unit $MD_0-MD_3$.

The manner in which the integrated velocity error signal is modified in the event of drop-out of the synchronizing information portion of a line of video signals now will be described with reference to the waveforms shown in FIGS. 18A–18D. FIG. 18A represents the detected velocity error in each incoming line of video signals. It is assumed that there is no drop-out in the synchronizing information portion of line LA or of line LB, but that there is drop-out in the synchronizing information portion of line LC. It is recalled that, because of this drop-out condition, the velocity error of line LB as well as the velocity error of line LC cannot be detected. Also, because of this drop-out condition, an APC operation cannot be carried out for line LC. In FIG. 18A, the sawtooth waveform associated with line LA represents the detected velocity error while the sawtooth waveforms assocaited with lines LB and LC represent undetected, or incorrect, velocity errors. Since the velocity error of line LB is not detected, and thus cannot be corrected, it is seen that the velocity error of line LC is cumulative thereto. Assuming that there is no drop-out of the synchronizing information portion of each of lines LD and LE, the velocity errors of these lines can be detected and corrected.

FIG. 18B represents the synchronizing and video information portions of successive lines LA, LB, LC, . . . of video signals. Drop-out is assumed to occur at the burst signal in the synchronizing information portion of line LC, and a segment of the video information portion of this line also is assumed to be dropped out, all as represented by the vertical lines in FIG. 18B. It is recalled that, in accordance with the drop-out compensating technique disclosed above, the dropped out segment in the video information portion of line LC is replaced by a segment in the corresponding location in immediately preceding line LB. Since these lines are adjacent each other, the information represented by the replacing portion is a close approximation of the information which had been lost because of drop-out.

When line LA is read out of main memory 59, the velocity error signal $V_E$ of this line is read out of the velocity error memory. This velocity error signal $V_E$ is integrated by integrator 908 and is used to modify the chrominance subcarrier so as to compensate for this velocity error. Since the actual velocity errors in each of lines LB and LC cannot be detected because of the drop-out which occurs during the synchronizing information portion of line LC, the velocity error signal $V_E$ which had been derived for line LA is used as an approximation of the velocity error for line LB and also for line LC, as described above. When line LB is read out of main memory 59, this velocity error signal $V_E$ is read out of the velocity error memory and supplied to integrator 908. FIG. 18C represents the integrated velocity error signal which is used for line LB.

When line LC is read out of the main memory, the READ ENABLE signal is supplied to reset generator 923, whereby integrator 908 is reset. However, since the velocity error of line LC is cumulative to the velocity error of line LB, the integrated velocity error signal for line LC should not be reset to its initial level but, rather, should continue to increase linearly as shown by the solid line in FIG. 18C. To complement the resetting of integrator 908 at the commencement of the reading out of line LC, the M-$\overline{APC}$ signal, which then is read out of an addressed memory unit $MD_0$–$MD_3$ of the velocity error condition memory is supplied to AND gate 930. At this time, an M-DOP signal is not read out of this addressed memory unit. Hence, AND gate 930 is energized to supply a control signal to change-over switch 925, whereby this switch is changed over from its normal condition, wherein its output terminal is connected to the reference potential, to its active condition, wherein its output terminal is connected to amplifier 922. Consequently, change-over switch 925 supplies the velocity error signal $V_E$ which then is being read out of the velocity error memory to adder 926. This results in adding a DC level equal to the velocity error voltage $V_E$ to the integrated velocity error voltage produced by integrator 908. That is, change-over switch 925 is operated to add an offset voltage to the integrated velocity error signal. This offset voltage is equal to the DC level of the velocity error signal and is represented by the vertical broken line shown in FIG. 18C. Thus, it is seen that, when drop-out occurs in the synchronizing information portion of a line of video signals, the integrated velocity error signal is not reset to zero but, instead, continues to increase linearly. Thus, even though the actual velocity error of lines LB and LC cannot be detected, the velocity error signal derived from line LA is used as an approximation of the velocity errors of lines LB and LC so as to compensate for these errors when lines LB and LC are read out of the main memory.

Let it now be assumed that, during the read out of line LC, a drop-out condition in the video information portion thereof is read out of the addressed memory unit in drop-out condition memory 58. Accordingly, the M-DOP signal is applied as a binary "1" to input terminal 927, this signal being inverted to a binary "0" to disable AND gate 930. This, in turn, terminates the control signal applied to change-over switch 925, whereupon the change-over switch is operated to connect its output to the reference potential. In this condition of the change-over switch, the offset voltage which had been supplied to adder 926 now is removed therefrom. As shown in FIG. 18C, the integrated velocity error signal during this portion of line LC is reduced, and is equal to the integrated velocity error signal which had been produced during the preceding line LB. This is necessary because a portion of the preceding line LB is substituted for the drop-out portion in line LC. That is, portion LB″, which occupied the same relative location in line LB as the dropped-out portion in line LC, is substituted for the dropped-out portion. The integrated velocity error signal produced during the reading out of line LC must be adjusted to be equal to the integrated velocity error signal that had been produced during the reading out of that portion of line LB which replaces the dropped-out portion of line LC. That is, the velocity error compensation of line LC must be matched to the velocity error compensation of line LB for that portion of line LC that is replaced in accordance with the drop-out compensation technique of the present invention. It may be appreciated that if this modification in the integrated velocity error signal is not made, the velocity error compensation during the drop-out interval in line LC will not match the replacing portion LB″. This deficiency is avoided by disabling AND gate 930 during the drop-out interval of the video information of line LC.

At the conclusion of this drop-out interval, the M-DOP signal terminates, and AND gate 930 once again is energized to control change-over switch 925 for supplying the offset voltage to adder 926, as shown in FIG. 18C. This operation of AND gate 930 during the interval that line LC is read out is represented by the waveform of FIG. 18D. Of course, if no drop-out condition had been present during the video information portion of line LC, replacement portion LB″ would not have been necessary, and AND gate 930 would not have been disabled during this drop-out interval. That is, the negative-going discontinuity in the linearly increasing integrated velocity error signal shown in FIG. 18C would have been avoided.

Since the M-$\overline{APC}$ signal is not present when line LD is read out of the main memory, AND gate 930 is not energized. Furthermore, the velocity error of line LD can be detected and corrected accurately.

It is seen that the DC velocity error voltage level which is produced for one line interval also is used for the next successive two line intervals in the event that the velocity errors of those successive line intervals cannot be detected. Furthermore, the integrated velocity error signal which is used to compensate the reading out of the first line interval also is used for the next following second and third line intervals, except that an offset voltage is added to this integrated velocity error signal at the commencement of the reading out of the third line interval. This is because the actual velocity error of the third line interval, in the absence of correction of the velocity error of the second line interval, is cumulative.

Read Clock Generator 65

Returning to FIG. 17, a block diagram of one embodiment of read clock generator 65 is illustrated as comprising phase modulator 910, shaping circuit 911, harmonic generator 912, frequency divider 916 and exclusive-OR gates 914 and 918. Phase modulator 910 is coupled to an input terminal 909 to receive a subcarrier which is generated by synchronizing signal generator 66. The phase modulator is adapted to modulate the phase of this subcarrier with the integrated velocity error signal produced by adder 926, and shown in FIG. 18C, in order to cancel, or compensate, the velocity error which is present in the incoming video signal which had been played back by the VTR.

The phase-modulated subcarrier produced by phase modulator 910 is supplied to shaping circuit 911 which is adapted to shape the phase-modulated subcarrier into a pulse signal having a duty cycle of 50%. It is appreciated that such a pulse signal has a fundamental frequency $f_{sc}$ equal to the subcarrier frequency, and also includes odd harmonics thereof. Harmonic extracting circuit 912 is coupled to shaping circuit 911 and is adapted to extract the third harmonic from the shaping circuit. As an example, harmonic extracting circuit 912 may comprise a band-pass filter capable of extracting a signal whose frequency is equal to 3 $f_{sc}$. This extracted signal, which is the third harmonic of the chrominance subcarrier, is shaped by adjusting circuit 913 to form a pulse signal having a duty cycle of 50% and a frequency equal to 3 $f_{sc}$. This shaped pulse signal is supplied to exclusive-OR gate 914 and, in addition, to frequency divider 916. This frequency divided pulse signal has a frequency equal to the frequency of the chrominance subcarrier $f_{sc}$, and is supplied to another adjusting circuit 917 which, in turn, supplies a pulse signal having a duty cycle of 50% and a frequency equal to the chrominance subcarrier frequency $f_{sc}$ to exclusive-OR gate 918.

Exclusive-OR gates 914 and 918 include additional inputs which are connected in common to an input terminal 920. Input terminal 920 is adapted to receive a SPECIAL signal in the event that the VTR is operated in one of its SPECIAL playback modes. It may be appreciated that exclusive-OR gates 914 and 918 essentially invert the polarity of the read clock and read subcarrier signals which are produced thereby and supplied to output terminals 915 and 918, respectively. The read clock signals, which are phase modulated to compensate for velocity errors, are used to address main memory 59 and to read out digitized video signals therefrom.

Control Unit 67

Referring now to FIG. 19, control unit 67 is shown as being comprised of a write control section and a read control section. The write control section is comprised of a start pulse generator 1005, a counter 1007, a flip-flop circuit 1015, a monostable multivibrator 1017 and a 2-bit counter 1021. Start pulse generator 1005, which may comprise a gating circuit, includes inputs coupled to input terminals 1001 and 1002 which receive the horizontal synchronizing pulse $S_h$ from the synchronizing separator shown in FIG. 8 and the subcarrier signal produced by the APC section of the write clock generator shown in FIG. 14, respectively. The start pulse generator additionally is coupled to an input terminal 1011 which receives the write clock signal produced by the APC section shown in FIG. 14. In response to the horizontal synchronizing pulse, the subcarrier and the write clock signal, start pulse generator 1005 is adapted to produce a write start signal at a predetermined time following the reception of the incoming horizontal synchronizing pulse.

The output of start pulse generator 1005, which can be derived at output terminal 1006, is coupled to counter 1007. The counter, which is activated in response to the write start signal produced by the start pulse generator, is adapted to count write clock pulses until a predetermined count is attained. For example, if each line of video signals is digitized as 640 samples, each sample being formed by eight bits, then counter 1007 is adapted to count 640×8 write clock pulses. The output of counter 1007 is coupled to a flip-flop circuit 1015 which is adapted to divide the frequency of the output of counter 1007 by a factor of two. To this effect, flip-flop circuit 1015 may comprise a conventional T-type, or timing input, flip-flop circuit.

The output of flip-flop circuit 1015 is used to trigger a monostable multivibrator 1017, the output of which being connected through an AND gate 1019 to 2-bit counter 1021. Counter 1021 is adapted to count the output pulses produced by monostable multivibrator 1017, and comprises a two stage counter for providing a 2-bit address. The output of counter 1021 is derived at output terminals 1023' and 1023", and additionally is coupled to a comparator 1025. This 2-bit address produced by counter 1021 is used as the write address and is supplied to write address decoder 203 described hereinabove with respect to FIG. 3. It may be appreciated that this 2-bit address is changed for every other output pulse produced by counter 1007. This means that the 2-bit address is changed at alternate line intervals in the incoming video signal. Of course, counter 1007 provides an output pulse at the beginning of each line interval, and the state of flip-flop circuit 1015 thus is changed at each line interval. Hence, the combination of the output of flip-flop circuit 1015 and the output of counter 1021, all of which are provided at output terminals 1023, 1023' and 1023", constitute a 3-bit write address which is used by write-in circuit 903 in velocity error memory 64 (FIG. 17).

The output of counter 1007 additionally is coupled to a monostable multivibrator 1036 which generates a velocity error write enable signal at output terminal 1037. It is this velocity error write enable signal which is used to close write-in switch 902 in velocity error memory 64, shown in FIG. 17.

The read address section shown in FIG. 19 is of similar construction as the write address section and includes a start pulse generator 1008, a counter 1010, a flip-flop circuit 1016, an AND gate 1020 and a 2-bit counter 1022. Start pulse generator 1008, which may be similar to start pulse generator 1005, is coupled to an input terminal 1003 to receive the read subcarrier produced by read clock generator 65 (FIG. 17) and another input coupled to input terminal 1004 to receive the reference horizontal synchronizing pulse produced by synchronizing signal generator 66. In addition, the start pulse generator is coupled to an input terminal 1012 to receive the read clock pulses which are produced by the read clock generator shown in FIG. 17.

Start pulse generator 1008 is adapted to produce a read start signal at a predetermined time following the occurrence of the reference horizontal synchronizing pulse. The read start signal is derived at output terminal 1009 and, in addition, is used to activate counter 1010. This counter is coupled to receive the read clock pulses supplied to input terminal 1012 and is adapted to produce an output pulse when a predetermined count is attained. Consistent with counter 1007, counter 1010 is adapted to produce an output pulse, shown as a read memory enable pulse, when 640 read clock pulses have been counted. That is, the read memory enable pulse is produced at the beginning of a read-out operation for reading out a line of video signals from main memory 59.

Counter 1010 is coupled to flip-flop circuit 1016, which may comprise a T-type flip-flop circuit, adapted to divide the frequency of the read memory enable pulses by a factor of two. That is, the state of the flip-flop circuit changes in response to each read memory enable pulse. The output of flip-flop circuit 1016 is coupled to monostable multivibrator 1018 for triggering the latter. The pulse produced by this monostable multivibrator is coupled through AND gate 1020 to 2-bit counter 1022 which, in turn, has its output coupled to output terminals 1024' and 1024'', respectively, to constitute the 2-bit read-out address which is supplied to the read decoder shown in FIG. 3. Similar to the 2-bit address produced by 2-bit counter 1021, the 2-bit read address changes after each two lines of video signals are read out from the main memory.

The output of flip-flop circuit 1016 additionally is coupled to an output terminal 1024 and comprises the least significant bit in a 3-bit read address. It may be appreciated that this 3-bit address at output terminals 1024, 1024' and 1024'' is supplied to read-out circuit 906 shown in FIG. 17 and is used for establishing the read address for reading out an appropriate velocity error signal.

The output of 2-bit counter 1022 also is coupled to comparator 1026 and, furthermore, to comparator 1025. Comparator 1025 is adapted to compare the 2-bit write-in address produced by counter 1012 with the 2-bit read-out address produced by counter 1022. Similarly, comparator 1026, which is connected to receive the 2-bit output of counter 1021, is adapted to compare the 2-bit write-in address with the 2-bit read-out address, the latter being produced by counter 1022. In the event that the read-out address is equal to the write-in address plus one (R−W+1), there is the possibility that, when counter 1021 is incremented, it may address for a write-in operation the very same memory unit which then is being addressed for a read-out operation. To prevent this possibility, comparator 1025 produces a binary "1" when the read-out address is equal to the write-in address plus one. This binary "1" is inverted by an inverter 1027 and supplied as a binary "0" to disable AND gate 1019. This prevents counter 1021 from being incremented, and thus prevents this counter from generating the very same address as the read-out address counter 1022.

Similarly, comparator 1026 is adapted to detect when the write-in 2-bit address is equal to the read-out 2-bit address plus one. When this condition is detected, comparator 1026 produces a binary "1" which is inverted by inverter 1028 to disable AND gate 1020. This prevents counter 1022 from being incremented to the very same count which then is being produced by counter 1021. Hence, comparator 1026 prevents the read-out address from being made equal to the write-in address. As a consequence of comparators 1025 and 1026, a common memory unit in main memory 59 cannot be simultaneously addressed for a write-in and a read-out operation.

Since the write address section and the read address section of control unit 57, as shown in FIG. 19, are of substantially similar construction, only the operation of the write address section will be described with reference to FIGS. 20A-20F. It is recalled that start pulse generator 1005, which is supplied with the incoming horizontal synchronizing pulse $S_h$ (FIG. 20A), generates a write start signal at a predetermined time following the occurrence of this horizontal synchronizing pulse, in accordance with the subcarrier and write clock pulses which are supplied thereto. This write start pulse is shown in FIG. 20B, and is used to activate counter 1007 to count successive write clock pulses. When counter 1007 attains a count of 640, the WRITE MEMORY ENABLE pulse, shown in FIG. 20C, terminates. This pulse is generated again when the next write start pulse is produced. Thus, during the positive duration of the illustrated WRITE MEMORY ENABLE pulse, main memory 59 can be addressed for a write-in operation.

At the negative transition in the WRITE MEMORY ENABLE pulse, that is, when counter 1007 attains a count of 640, flip-flop circuit 1015 is triggered to change state, as shown in FIG. 20D. Thus, it is appreciated that flip-flop circuit 1015 assumes its first state during one line interval, its second state during the next line interval, and so on. When the output of this flip-flop circuit undergoes a negative transition, monostable multivibrator 1017 is triggered to produce the pulse 1017' shown in FIG. 20E. It is this pulse which is gated through AND gate 1019 to increment the count of 2-bit counter 1021. As shown in FIG. 20E, 2-bit counter 1021 is incremented at every other, or alternate, line interval. The contents of 2-bit counter 1021, which serve as the write-in address, are shown in FIG. 20F. Of course, in the event that comparator 1025 produces a binary "1", AND gate 1019 is disabled to prevent a pulse 1017' from incrementing the count of 2-bit counter 1021.

The illustrated control unit shown in FIG. 19 additionally includes R-S flip-flop circuits 1031 and 1034, timing-pulse controlled flip-flop circuits 1029 and 1032, a 2-bit memory 1035, and a 1-bit memory 1039. Timing-pulse controlled flip-flop circuit 1029 has its input coupled to an input terminal 1030 for receiving the reference vertical synchronizing signal produced by synchronizing signal generator 66. This flip-flop circuit is adapted to divide the frequency of the generated reference vertical synchronizing signal by a factor of two, and to apply this frequency-divided signal to the set input S of R-S flip-flop 1031. The reset input R of R-S flip-flop 1030 is coupled to the output of flip-flop circuit 1016 and is adapted to receive a signal therefrom whose frequency is equal to one-half the frequency of the reference horizontal synchronizing signal.

Of similar construction is timing-pulse controlled flip-flop circuit 1032 whose input is coupled to an input terminal 1033 for receiving the incoming, separated vertical synchronizing signal from synchronizing separator 72. The output of flip-flop circuit 1032 is a frequency-divided signal whose frequency is equal to one-half the frequency of the incoming vertical synchronizing signal. This frequency-divided signal is coupled to the set input S of R-S flip-flop 1034. The reset input R of this R-S flip-flop circuit is coupled to the output of flip-flop circuit 1015 for receiving a periodic pulse signal whose frequency is equal to one-half the frequency of the incoming horizontal synchronizing pulse, as shown in FIG. 20D. The output of R-S flip-flop 1034 is coupled to a 2-bit memory 1035 and also to 1-bit memory 1039, and is adapted to gate into the 2-bit memory the 2-bit write-in address which then is being produced by counter 1021 and to gate into the 1-bit memory the state of flip-flop circuit 1015. The output of 1-bit memory 1039 is coupled to flip-flop circuit 1016 to supply the stored bit to this flip-flop circuit. The output of R-S flip-flop 1031 is coupled to counter 1022, for energizing this counter to receive the contents of 2-bit memory 1035, and also to the clear inputs of flip-flop circuits 1016 and 1032. A line discriminating signal, produced by the VTR, for example, is supplied from input terminal 1038 to the clear input of flip-flop circuit 1015.

In operation, flip-flop circuit 1031 is set in response to every alternate reference vertical synchronizing pulse, and is reset in response to the output of flip-flop circuit 1016 which follows this vertical synchronizing pulse. Hence, the output of R-S flip-flop 1031 is a pulse whose duration is about one horizontal line interval, and this pulse occurs in synchronism with every other reference vertical synchronizing pulse. Similarly, R-S flip-flop 1034 is set in response to each alternate incoming vertical synchronizing pulse, and is reset in response to the output of flip-flop circuit 1015. Accordingly, R-S flip-flop 1034 produces an output pulse whose duration is about one horizontal line interval, which pulse is generated in synchronism with the incoming vertical synchronizing pulse.

The pulse produced by R-S flip-flop 1034 gates the address then being produced by counter 1021 into 2-bit memory 1035, and also gates the least significant bit of the write address generated by flip-flop circuit 1015 into 1-bit memory 1039. Upon the subsequent occurrence of the pulse produced by R-S flip-flop 1031, the contents of the 2-bit memory are gated into counter 1022 and the contents of the 1-bit memory is gated into flip-flop circuit 1016 for use in the 3-bit read-out address. Thus, the write-in address which is produced at the time that an incoming vertical synchronizing signal is received is used as the read-out address at the time that the reference vertical synchronizing signal is received. It may be appreciated that this properly determines the vertical positioning of the video signal which is derived at the output of the time base error correcting apparatus to be in alignment with the vertical position of the video signal which is played back from the VTR. That is, at the beginning of each frame of a corrected video signal, the same address location in main memory 59 is read out as was written in at the start of that frame for the incoming video signal. Hence, and with respect to a displayed television picture, the top (or bottom) of that picture is properly positioned in the vertical direction.

While the present invention has been particularly shown and described with reference to a preferred embodiment thereof, it should be readily apparent to those of ordinary skill in the art that various changes and modifications in form and details can be made without departing from the spirit and scope of the invention. It is intended that the appended claims be interpreted as including all such changes and modifications.

What is claimed is:
1. Time-base error correcting apparatus for correcting time-base errors in a video signal, comprising:
main memory means for storing picture elements in successive line intervals of said video signal;
write-in means for writing the picture elements of each line interval into said main memory means at a write-in clock rate synchronized with the timing information contained in said video signal;
read-out means for reading said stored picture elements of each line interval out of said main memory at a substantially constant reference read-out clock rate;
drop-out detecting means for detecting drop-out conditions in said video signal written into said main memory means, including drop-out conditions in the video information portion and in the synchronizing information portion of said video signal;
drop-out condition memory means for storing representations of detected drop-out conditions in synchronism with the writing in and reading out of said picture elements of each line interval into and from said main memory means, respectively, such that if a picture element is dropped out, a representation that said picture element has dropped out is stored in said drop-out condition memory means, and if synchronizing information is dropped out, a representation that said synchronizing information has dropped out is stored in said drop-out condition memory means; and
drop-out compensating means coupled to said main memory means for receiving each picture element of each line interval read out from said main memory means and normally operative to transmit each received picture element, said drop-out compensating means being responsive to a stored representation of a drop-out condition read out of said drop-out condition memory means to replace the picture element then received from said main memory means with a picture element disposed in the same relative position of the immediately preceding line interval.

2. The apparatus of claim 1 wherein said drop-out compensating means comprises memory means for writing therein each received picture element of a given line interval at said reference read-out clock rate and for reading out therefrom at the next following line interval each picture element of said given line interval also at said reference read-out clock rate.

3. The apparatus of claim 2 wherein said memory means comprises an odd-line storage means for storing each said received picture element of an odd line interval received from said main memory means and an even-line storage means for storing each said received picture element of an even line interval received from said main memory means; write switch means operative to supply each received picture element to said odd-line storage means when an odd-line interval is read out of said main memory means and to supply each received picture element to said even-line storage means when an even-line interval is read out of said main memory means; read switch means operative to supply each picture element read out of said odd-line storage means when an even-line interval is read out of said main memory means and to supply each picture element read out of said even-line storage means when an odd-line interval is read out of said main memory means; and substitution switch means normally operative to transmit each picture element received from said main memory means and operative in response to said stored representation of a drop-out condition read out of said drop-out condition memory means to transmit the picture element then supplied by said read switch means.

4. The apparatus of claim 3 wherein each of said odd-line and even-line storage means includes a recirculating loop for feeding back each picture element that is read out therefrom.

5. The apparatus of claim 3 wherein said video signals are composite color video signals having a chrominance subcarrier of different respective phases during odd and even line intervals; and wherein said drop-out compensating means further comprises phase adjustment means for adjusting the relative phases of the chrominance subcarrier of the video signals supplied to said substitution switch means from said main memory means and the chrominance subcarrier of the video signals supplied to said substitution switch means from said read switch means so as to exhibit the same phase relationship regardless of the particular storage means from which the picture element is supplied to said read switch means.

6. The apparatus of claim 5 wherein each of said odd-line and even-line storage means has a storage capacity of one line interval.

7. The apparatus of claim 2 wherein said main memory means is comprised of a plurality of main memory devices, each operative to store the picture elements contained in at least one line interval; and wherein said drop-out condition memory means is comprised of a like plurality of memory devices for storing said representation of detected drop-out conditions; and further comprising write select means for selecting a single main memory device and a corresponding single drop-out condition memory device into which said picture elements and representations of detected drop-out conditions are written, respectively, and read select means for selecting a different single main memory device and corresponding single drop-out condition memory device from which said stored picture elements and representations of detected drop-out conditions are read, respectively.

8. The apparatus of claim 7 wherein each of said picture elements is represented by a multi-bit binary word and each of said representations of a detected drop-out condition is represented by a bit; and wherein each main memory device has a storage capacity of n multi-bit words and each drop-out condition memory device has a storage capacity of n bits.

9. The apparatus of claim 8 wherein each main memory device has a storage capacity of two line intervals; and wherein each drop-out condition memory device has a storage capacity for storing representations of detected drop-out conditions in each picture element for two line intervals.

10. The apparatus of claim 7 further comprising velocity error detecting means for detecting a velocity error of a line interval in said video signal as a function of the phase difference in the synchronizing information contained in said line interval and the synchronizing information contained in the next following line interval; velocity error memory means for storing the respective velocity errors of each line interval stored in said main memory means; means for reading out the stored velocity error associated with a line interval read out of said main memory means; means for modifying the reading out of said picture elements of a line interval from said main memory means as a function of the read out velocity error associated with that line interval; and means for using the velocity error associated with a given line interval for the next two following line intervals in the event that a drop-out condition is detected as occurring in the synchronizing information portion of the immediately following line interval.

11. The apparatus of claim 10 wherein each of said drop-out condition memory devices includes a section for storing a representation of a detected drop-out condition occurring in the synchronizing information portion of a line interval of said video signal.

12. The apparatus of claim 11 wherein said velocity error is a d.c. signal; wherein said means for modifying the reading out of said picture elements of a line interval from said main memory means includes resettable integrating means resettable to a reference level at the beginning of each line interval read out from said main memory means for integrating said d.c. signal and for using the integrated d.c. signal to modify the reading out of said picture elements from said main memory means; and further comprising means for reading out said section of a drop-out memory device in which is stored said representation of a detected drop-out condition occurring in the synchronizing portion of a line interval concurrently with the reading out of said line interval from said main memory means, whereby said stored representation is read out, and means for adding a d.c. offset level to said integrated d.c. level at the beginning of a read out line interval if said stored representation of a detected drop-out condition occurring in the synchronizing portion of a line interval is read out.

13. The apparatus of claim 12 wherein said d.c. offset level is the d.c. velocity error signal applied to said integrating means.

14. Time-base error correcting apparatus for correcting time-base errors in a composite color video signal reproduced by a video signal playback device, comprising:

converting means for converting each line interval of reproduced video signals to a plurality of successive digital words, each digital word being a digitized representation of a respective picture element;

main memory means for storing the digitized picture elements of each line interval of said video signals;

a source of write clock pulses synchronized with the frequency and phase of the horizontal synchronizing and burst signals of said reproduced video signals;

write-in means responsive to said write clock pulses for writing said digitized picture elements of each line interval into said main memory means;

a source of read clock pulses;

read-out means responsive to said read clock pulses for reading said digitized picture elements of each line interval out of said main memory means;

drop-out detecting means for detecting drop-out conditions in the video information and synchronizing information portions of said reproduced video signals;

drop-out condition memory means for storing indications of the relative locations in each line interval of drop-out conditions that have occurred in said line interval and also for storing indications of the occurrence of drop-out conditions in the synchronizing information portion of respective ones of a plurality of line intervals, said indications being read out in synchronism with the reading out of said digitized picture elements from said main memory means;

drop-out compensating means for receiving each digitized picture element read out of said memory means and, if a drop-out indication is concurrently read out from said drop-out condition memory means, for replacing that digitized picture element with the digitized picture element in the same relative location in the immediately preceding line interval;

velocity error detecting means for detecting a velocity error in each line interval of said reproduced video signal and for producing a velocity error signal unless a drop-out condition has occurred in the synchronizing information portion of that line interval or the immediately following line interval;

velocity error storage means for storing in a storage location associated with the digitized picture elements of a line interval stored in said main memory means the velocity error signal for that line interval and, in the event that the occurrence of a drop-out condition has prevented the velocity error from being detected for that line interval, for storing the velocity error signal which also had been stored for the preceding line interval; and modifying means for reading out a stored velocity error signal when the associated line interval of digitized picture elements is read out of said main memory means and for modifying the read clock pulses with the read out velocity error signal to compensate the velocity error for that line interval.

15. The apparatus of claim 14 wherein said velocity error storage means stores the velocity error signal associated with one line interval for the next two successive line intervals following said one line interval in the event that the occurrence of a drop-out condition has prevented the velocity error from being detected for the line interval immediately following said one line interval.

16. The apparatus of claim 14 wherein each stored velocity error signal is a d.c. level; and wherein said modifying means comprises integrating means for integrating each read out d.c. level to produce an integrated signal that returns to an initial level at the start of each read out line interval, means for preventing said integrated signal from returning to said initial level when a drop-out condition has been detected in the synchronizing information portion of a read out line interval, and phase modulating means for modulating said read clock pulses with said integrated signal.

17. The apparatus of claim 16 wherein said integrating means comprises a resettable integrator; reset generating means for resetting said integrator at the start of each read out line interval; a source of offset voltage; adding means for adding said offset voltage to said integrated signal; and means for coupling said source of offset voltage to said adding means when a drop-out condition has been detected in the synchronizing information portion of the line interval then being read out.

18. The apparatus of claim 17 further comprising means for uncoupling said source of offset voltage from said adding means when an indication of a drop-out condition in the video information portion of a line interval is read out from said drop-out condition memory means.

19. The apparatus of claim 18 wherein said means for coupling said source of offset voltage to said adding means comprises switch means having a first condition to supply a reference level to said adding means and a second condition responsive to an indication of a drop-out condition in the synchronizing information portion of a line interval being read out from said drop-out condition memory means to supply said offset voltage to said adding means; and wherein said means for uncoupling comprises gate means responsive to said indication of a drop-out condition in the video information portion of a line interval being read out from said drop-out condition memory means to return said switch means to said first condition thereof only for the duration that said indication of a drop-out condition in the video information portion is read out.

20. The apparatus of claim 17 wherein said source of offset voltage comprises the d.c. level read out from said velocity error storage means.

21. The apparatus of claim 14 wherein said drop-out compensating means comprises an even line storage means for storing the digitized picture element in an even line interval read out from said main memory means; an odd line storage means for storing the digitized picture elements in an odd line interval read out from said main memory means; means for reading out the contents of said even and odd line storage means; and switch means normally connected to transmit the digitized picture elements read out from said main memory means and responsive to a drop-out indication read out from said read-out condition memory means to transmit the digitized picture element then being read out from one of said even and odd line storage means.

22. The apparatus of claim 21 wherein each of said even and odd line storage means is a recirculating storage means; and wherein said drop-out compensating means further comprises write-in switch means for supplying the digitized picture elements contained in an even line interval read out from said main memory means to said even line storage means and for supplying the digitized picture elements contained in an odd line interval read out from said main memory means to said odd line storage means, said write-in switch means being responsive to a drop-out indication read out from said drop-out condition memory means for preventing the output then received from said main memory means from being supplied to either of said even and odd line storage means, and read-out switch means for coupling said even line storage means to said switch means when the output from said main memory means are digitized picture elements contained in an odd line interval and for coupling said odd line storage means to said switch means when the output from said main memory means are digitized picture elements contained in an even line interval.

23. The apparatus of claim 22 wherein said video signals are NTSC signals; and wherein said drop-out compensating means further comprises phase adjustment means for adjusting the relative phases of the digitized picture elements supplied to said switch means by said main memory means and by said read-out switch means.

24. The apparatus of claim 23 wherein the storage capacity of each of said even and odd line storage means is equal to one line interval.

25. The apparatus of claim 24 wherein said main memory means is comprised of at least three shift register devices, each having a storage capacity equal to two line intervals to store, in succession, an odd line interval and an even line interval, only one of said shift register devices being selectable to have digitized picture elements written therein and a different one of said shift register devices being selectable to have digitized picture elements read therefrom; and wherein said drop-out condition memory means is comprised of shift register devices equal in number and storage capacity to the shift register devices of said main memory means.

* * * * *